(12) United States Patent
Alexander et al.

(10) Patent No.: US 11,395,559 B2
(45) Date of Patent: Jul. 26, 2022

(54) INFANT BOTTLE SYSTEM

(71) Applicant: Ember Technologies, Inc., Westlake Village, CA (US)

(72) Inventors: Clayton Alexander, Westlake Village, CA (US); Daren John Leith, Agoura Hills, CA (US); Christopher Thomas Wakeham, Solana Beach, CA (US); Mikko Juhani Timperi, San Marcos, CA (US); Martin Gschwandtl, San Francisco, CA (US)

(73) Assignee: Ember Technologies, Inc., Westlake Village, CA (US)

( * ) Notice: Subject to any disclaimer, the term of this patent is extended or adjusted under 35 U.S.C. 154(b) by 373 days.

(21) Appl. No.: 16/540,955

(22) Filed: Aug. 14, 2019

(65) Prior Publication Data

US 2020/0100620 A1    Apr. 2, 2020

Related U.S. Application Data

(63) Continuation of application No. 16/260,856, filed on Jan. 29, 2019, now Pat. No. 10,433,672.

(Continued)

(51) Int. Cl.
*A47J 36/24*      (2006.01)
*F25D 31/00*      (2006.01)

(52) U.S. Cl.
CPC ....... *A47J 36/2438* (2013.01); *A47J 36/2433* (2013.01); *A47J 36/2416* (2013.01); *F25D 31/007* (2013.01); *F25D 2331/803* (2013.01)

(58) Field of Classification Search
CPC .... A47J 27/10–122; A47J 27/21–21075; A47J 36/24–2438; A47J 36/2444–2472
See application file for complete search history.

(56) References Cited

U.S. PATENT DOCUMENTS 730,337 A    6/1903    Bonnefont
1,649,067 A   11/1927   Karlson
(Continued)

FOREIGN PATENT DOCUMENTS

CH     631614      8/1982
CN     1338240 A   3/2002
(Continued)

OTHER PUBLICATIONS

Australian Examination Report regarding Application No. 2016216669, dated Feb. 14, 2019, four pages.
(Continued)

*Primary Examiner* — Michael A Laflame, Jr.
(74) *Attorney, Agent, or Firm* — Knobbe, Martens, Olson & Bear LLP

(57) ABSTRACT

An infant bottle feeding system includes an infant bottle with a chamber that receives a liquid, heating or cooling elements operable to heat or cool liquid in the chamber and sensors operable to sense parameters of the liquid in the chamber. The system optionally includes an electronic base removably attached to a bottom surface of the infant bottle and operable to deliver power to electronics in the infant bottle. The system optionally includes a thermal cover that fits over the infant bottle and releasably couples to the electronic base to enclose the infant bottle, the thermal cover insulating the infant bottle and inhibiting heat loss of the liquid in the chamber. The electronic base delivers power to the heating elements and sensors in the infant bottle only when the infant bottle is on the electronic base. The infant bottle, thermal cover and electronic base define a single travel pack unit when coupled together.

20 Claims, 31 Drawing Sheets

Related U.S. Application Data

(60) Provisional application No. 62/624,657, filed on Jan. 31, 2018.

(56) References Cited

U.S. PATENT DOCUMENTS

| | | |
|---|---|---|
| 1,721,311 A | 7/1929 | Muenchen |
| 2,046,125 A | 6/1936 | Lacy |
| 2,300,891 A | 11/1942 | Hanks |
| 2,505,092 A | 4/1950 | Brewer |
| 2,582,781 A | 1/1952 | Johnson |
| 2,843,719 A | 7/1958 | Hiram |
| 2,992,316 A | 7/1961 | Baumstein |
| 3,064,113 A | 11/1962 | Mani |
| 3,155,260 A | 11/1964 | Widener |
| 3,345,934 A | 10/1967 | Steiner |
| 3,463,140 A | 8/1969 | Rollor |
| 3,603,106 A | 9/1971 | Ryan |
| 3,622,753 A | 11/1971 | Lax |
| 3,676,248 A | 7/1972 | Swartz |
| 3,678,248 A | 7/1972 | Tricault |
| 3,739,148 A | 6/1973 | Ryckman, Jr. |
| 3,766,975 A | 10/1973 | Todd |
| 3,797,563 A | 3/1974 | Hoffmann |
| 3,805,440 A | 4/1974 | Becker |
| 3,892,945 A | 7/1975 | Lerner |
| 3,931,494 A | 1/1976 | Fisher |
| 4,068,115 A | 1/1978 | Mack |
| 4,095,090 A | 6/1978 | Pianezza |
| 4,134,004 A | 1/1979 | Anderson |
| 4,240,272 A | 12/1980 | Tiede |
| 4,442,343 A | 4/1984 | Genuit |
| 4,470,999 A | 9/1984 | Carpiac |
| 4,531,046 A | 7/1985 | Stover |
| 4,537,044 A | 8/1985 | Putnam |
| D296,509 S | 7/1988 | Fuke |
| 4,801,782 A | 1/1989 | Ineson |
| 4,827,107 A | 5/1989 | Peery |
| 4,978,833 A | 12/1990 | Knepler |
| 4,980,539 A | 12/1990 | Walton |
| 4,982,722 A | 1/1991 | Wyatt |
| 4,983,798 A | 1/1991 | Eckler |
| 5,042,258 A | 8/1991 | Sundhar |
| 5,090,209 A | 2/1992 | Martin |
| 5,163,290 A | 11/1992 | Kinnear |
| 5,199,275 A | 4/1993 | Martin |
| 5,208,896 A | 5/1993 | Katayev |
| 5,217,064 A | 6/1993 | Kellow |
| 5,243,684 A | 9/1993 | Edwards |
| 5,274,215 A | 12/1993 | Jackson |
| 5,283,420 A | 2/1994 | Montalto |
| 5,313,787 A | 5/1994 | Martin |
| 5,343,368 A | 8/1994 | Miller |
| 5,388,565 A | 2/1995 | Ou |
| 5,448,809 A | 9/1995 | Kraus |
| 5,497,883 A | 3/1996 | Monetti |
| 5,508,494 A | 4/1996 | Sarris |
| 5,508,600 A | 4/1996 | Myslinski |
| 5,549,035 A | 8/1996 | Wing-Chung |
| 5,550,452 A | 8/1996 | Shirai |
| 5,603,220 A | 2/1997 | Seaman |
| 5,603,858 A | 2/1997 | Wyatt |
| 5,643,485 A | 7/1997 | Potter |
| 5,678,925 A | 10/1997 | Garmaise |
| 5,692,627 A | 12/1997 | Feng |
| 5,731,568 A | 3/1998 | Malecek |
| 5,737,923 A | 4/1998 | Gilley |
| D394,581 S | 5/1998 | Paris |
| 5,771,788 A | 6/1998 | Lee |
| 5,786,643 A | 7/1998 | Wyatt |
| 5,842,353 A | 12/1998 | Kuo-Liang |
| 5,884,006 A | 3/1999 | Frohlich |
| 5,903,133 A | 5/1999 | Amero, Jr. |
| 5,948,301 A | 9/1999 | Liebermann |
| 5,954,984 A | 9/1999 | Ablah |
| 5,959,433 A | 9/1999 | Rohde |
| 6,000,224 A | 12/1999 | Foye |
| 6,005,233 A | 12/1999 | Wyatt |
| 6,013,901 A | 1/2000 | Lavoie |
| 6,020,575 A | 2/2000 | Nagle et al. |
| 6,032,481 A | 3/2000 | Mosby |
| 6,042,720 A | 3/2000 | Reber |
| 6,072,161 A | 6/2000 | Stein |
| 6,075,229 A | 6/2000 | Vanselow |
| 6,089,409 A | 7/2000 | Hart |
| 6,108,489 A | 8/2000 | Frohlich |
| 6,110,159 A | 8/2000 | Tsujita |
| 6,123,065 A | 9/2000 | Teglbjarg |
| 6,140,614 A | 10/2000 | Padamsee |
| 6,141,975 A | 11/2000 | Tatsumi |
| 6,144,016 A | 11/2000 | Garvin |
| 6,158,227 A | 12/2000 | Seeley |
| 6,180,003 B1 | 1/2001 | Reber |
| 6,212,959 B1 | 4/2001 | Perkins |
| 6,232,585 B1 | 5/2001 | Clothier |
| RE37,213 E | 6/2001 | Staggs |
| 6,274,856 B1 | 8/2001 | Clothier |
| 6,279,470 B2 | 8/2001 | Simeray |
| 6,281,611 B1 | 8/2001 | Chen |
| 6,314,867 B1 | 11/2001 | Russell |
| 6,316,753 B2 | 11/2001 | Clothier |
| 6,320,169 B1 | 11/2001 | Clothier |
| 6,350,972 B1 | 2/2002 | Wright |
| 6,353,208 B1 | 3/2002 | Bostic |
| 6,376,803 B1 | 4/2002 | Klinger |
| 6,384,387 B1 | 5/2002 | Owens |
| 6,403,928 B1 | 6/2002 | Ford |
| 6,414,278 B1 | 7/2002 | Frohlich |
| 6,415,624 B1 | 7/2002 | Connors |
| 6,417,498 B1 | 7/2002 | Shields et al. |
| 6,427,863 B1 | 8/2002 | Nichols |
| 6,433,313 B1 | 8/2002 | Owens |
| 6,444,961 B2 | 9/2002 | Clothier |
| 6,543,335 B1 | 4/2003 | Lassota |
| 6,555,789 B2 | 4/2003 | Owens |
| 6,571,564 B2 | 6/2003 | Upadhye |
| 6,584,374 B2 | 6/2003 | Lee |
| 6,634,417 B1 | 10/2003 | Kolowich |
| 6,651,445 B1 | 11/2003 | Clark |
| 6,657,170 B2 | 12/2003 | Clothier |
| 6,662,978 B2 | 12/2003 | Lin |
| 6,664,520 B2 | 12/2003 | Clothier |
| 6,674,052 B1 | 1/2004 | Luo |
| 6,702,138 B1 | 3/2004 | Bielecki |
| 6,703,590 B1 | 3/2004 | Holley, Jr. |
| 6,742,665 B2 | 6/2004 | Augustyn |
| 6,818,867 B2 | 11/2004 | Kressmann |
| 6,852,954 B1 | 2/2005 | Liu |
| 6,864,462 B2 | 3/2005 | Sanoner |
| 6,870,135 B2 | 3/2005 | Hamm |
| 6,921,880 B2 | 7/2005 | Berger |
| 6,953,913 B1 | 10/2005 | Hara |
| 6,968,888 B2 | 11/2005 | Kolowich |
| 7,002,111 B2 | 2/2006 | Bauer |
| 7,022,946 B2 | 4/2006 | Sanoner |
| 7,034,256 B1 | 4/2006 | Phillips |
| 7,059,387 B2 | 6/2006 | Kolowich |
| 7,073,678 B1 | 7/2006 | Dibdin |
| 7,091,455 B2 | 8/2006 | Fung |
| 7,109,445 B2 | 9/2006 | Patterson |
| 7,174,720 B2 | 2/2007 | Kennedy |
| 7,193,190 B2 | 3/2007 | Kissel, Jr. |
| 7,208,707 B2 | 4/2007 | Clothier |
| 7,212,955 B2 | 5/2007 | Kirshenbaum |
| 7,227,108 B2 | 6/2007 | Clothier |
| 7,263,283 B2 | 8/2007 | Knepler |
| 7,276,676 B1 | 10/2007 | Thompson |
| 7,287,386 B2 | 10/2007 | Upadhye |
| 7,287,656 B2 | 10/2007 | Guilford, III |
| 7,414,380 B2 | 8/2008 | Tang |
| 7,419,073 B2 | 9/2008 | Crisp, III |
| 7,431,174 B2 | 10/2008 | Thissen |
| 7,571,830 B2 | 8/2009 | Lin |
| 7,592,084 B2 | 9/2009 | Hoffjann |
| D606,661 S | 12/2009 | Colombo |

(56) References Cited

U.S. PATENT DOCUMENTS

| | | |
|---|---|---|
| 7,659,493 B2 | 2/2010 | Reusche |
| 7,681,754 B1 | 3/2010 | Ross |
| 7,683,572 B2 | 3/2010 | Toya |
| 7,748,223 B2 | 7/2010 | Minoura |
| 7,815,067 B2 | 10/2010 | Matsumoto |
| 7,825,353 B2 | 11/2010 | Shingler |
| 7,836,722 B2 | 11/2010 | Magill |
| 7,861,538 B2 | 1/2011 | Welle |
| 7,872,214 B2 | 1/2011 | Schandel |
| 7,886,655 B1 | 2/2011 | Lassota |
| 7,934,537 B2 | 5/2011 | Kolowich |
| 7,942,145 B2 | 5/2011 | Palena |
| 7,948,209 B2 | 5/2011 | Jung |
| 7,966,927 B2 | 6/2011 | Yoakim |
| 7,997,786 B2 | 8/2011 | Liu |
| 8,045,848 B2 | 10/2011 | Wortley |
| 8,055,310 B2 | 11/2011 | Beart |
| 8,061,149 B1 | 11/2011 | Gowans |
| 8,076,620 B2 | 12/2011 | Maupin |
| 8,146,485 B2 | 4/2012 | Ozanne |
| 8,205,468 B2 | 6/2012 | Hemminger |
| 8,272,532 B2 | 9/2012 | Michaelian |
| 8,274,016 B2 | 9/2012 | Montana |
| 8,280,453 B2 | 10/2012 | Beart |
| 8,319,154 B2 | 11/2012 | Shaikh |
| 8,336,729 B2 | 12/2012 | Kelly |
| 8,400,104 B2 | 3/2013 | Adamczyk |
| 8,448,809 B2 | 5/2013 | Kelly |
| 8,467,669 B2 | 6/2013 | Widanagamage |
| 8,479,941 B2 | 7/2013 | Matsumoto |
| 8,618,448 B2 | 12/2013 | Alexander |
| 8,621,980 B2 | 1/2014 | Bunn |
| 8,759,721 B1 | 6/2014 | Alexander |
| 8,907,796 B2 | 12/2014 | Sweeney |
| 9,035,222 B2 | 5/2015 | Alexander |
| 9,138,097 B2 | 9/2015 | Driel et al. |
| 9,151,545 B2 | 10/2015 | Soukhojak |
| 9,184,427 B2 | 11/2015 | Chuang |
| 9,265,371 B2 | 2/2016 | Glucksman et al. |
| 9,351,600 B2 | 5/2016 | Rime |
| 9,480,363 B2 | 11/2016 | Delattre et al. |
| 9,648,970 B2 | 5/2017 | Lee |
| 9,814,331 B2 | 11/2017 | Alexander |
| 9,839,324 B2 | 12/2017 | Xiao et al. |
| 9,863,695 B2 | 1/2018 | Alexander et al. |
| 9,967,924 B2 | 5/2018 | Heczko |
| 10,182,674 B2 | 1/2019 | Alexander et al. |
| D842,020 S | 3/2019 | Augustyn |
| 2001/0009609 A1 | 7/2001 | Bradenbaugh |
| 2001/0022304 A1 | 9/2001 | Roche |
| 2001/0023866 A1 | 9/2001 | Wang |
| 2002/0023912 A1 | 2/2002 | McGee |
| 2002/0083840 A1 | 7/2002 | Lassota |
| 2002/0104318 A1 | 8/2002 | Jaafar |
| 2002/0129712 A1 | 9/2002 | Westbrook |
| 2002/0162339 A1 | 11/2002 | Harrison |
| 2002/0175158 A1 | 11/2002 | Sanoner et al. |
| 2003/0024250 A1 | 2/2003 | Haas |
| 2003/0029662 A1 | 2/2003 | Piech |
| 2003/0029862 A1 | 2/2003 | Clothier |
| 2003/0066638 A1 | 4/2003 | Qu |
| 2003/0074903 A1 | 4/2003 | Upadhye |
| 2003/0145621 A1 | 8/2003 | Kidwell |
| 2004/0004072 A1 | 1/2004 | Clothier |
| 2004/0006996 A1 | 1/2004 | Butcher |
| 2004/0159240 A1 | 8/2004 | Lyall, III |
| 2004/0167592 A1 | 8/2004 | Grove |
| 2004/0194470 A1 | 10/2004 | Upadhye |
| 2005/0045615 A1 | 3/2005 | Sanoner |
| 2005/0121431 A1 | 6/2005 | Yuen |
| 2005/0242804 A1 | 11/2005 | Hintz |
| 2006/0021513 A1 | 2/2006 | Ide |
| 2006/0023480 A1 | 2/2006 | Plummer |
| 2006/0081599 A1 | 4/2006 | Anderson |
| 2006/0173259 A1 | 8/2006 | Flaherty |
| 2006/0207442 A1 | 9/2006 | Pettersson |
| 2006/0209628 A1 | 9/2006 | Jones |
| 2006/0231109 A1 | 10/2006 | Howell |
| 2006/0261233 A1 | 11/2006 | Williams et al. |
| 2007/0017890 A1 | 1/2007 | Ai-Jadh |
| 2007/0092773 A1 | 4/2007 | Guo |
| 2007/0151457 A1 | 7/2007 | Rabin |
| 2007/0182367 A1 | 8/2007 | Partovi |
| 2007/0223895 A1 | 9/2007 | Flemm |
| 2007/0278207 A1 | 12/2007 | Van Hoy |
| 2007/0279002 A1 | 12/2007 | Partovi |
| 2008/0011077 A1 | 1/2008 | Ramus |
| 2008/0019122 A1 | 1/2008 | Kramer |
| 2008/0022695 A1 | 1/2008 | Welle |
| 2008/0022696 A1 | 1/2008 | Welle |
| 2008/0041233 A1 | 2/2008 | Bunn |
| 2008/0041859 A1 | 2/2008 | Teglbjarg |
| 2008/0087270 A1 | 4/2008 | Shaikh |
| 2008/0121630 A1 | 5/2008 | Simard |
| 2008/0135564 A1 | 6/2008 | Romero |
| 2008/0141681 A1 | 6/2008 | Arnold |
| 2008/0149624 A1 | 6/2008 | Tamura |
| 2008/0179311 A1 | 7/2008 | Koro |
| 2008/0213449 A1 | 9/2008 | Wisner |
| 2008/0251063 A1 | 10/2008 | Palena et al. |
| 2008/0272134 A1 | 11/2008 | Rohe |
| 2009/0049845 A1 | 2/2009 | Mcstravick |
| 2009/0058352 A1 | 3/2009 | Lin |
| 2009/0064687 A1 | 3/2009 | Tuszkiewicz |
| 2009/0071952 A1 | 3/2009 | Kuwabara |
| 2009/0102296 A1 | 4/2009 | Greene |
| 2009/0166350 A1 | 7/2009 | Ho |
| 2009/0184102 A1 | 7/2009 | Parker, Jr. |
| 2009/0230117 A1 | 9/2009 | Fernando |
| 2010/0000980 A1 | 1/2010 | Popescu |
| 2010/0028758 A1 | 2/2010 | Eaves |
| 2010/0089247 A1 | 4/2010 | Yang |
| 2010/0108694 A1 | 5/2010 | Sedlbauer |
| 2010/0125417 A1 | 5/2010 | Hyde |
| 2010/0147014 A1 | 6/2010 | Kim |
| 2010/0158489 A1 | 6/2010 | Siu |
| 2010/0158660 A1 | 6/2010 | Radhakrishnan |
| 2010/0186499 A1 | 7/2010 | Ramus et al. |
| 2010/0251755 A1 | 10/2010 | Lauchnor |
| 2011/0056215 A1 | 3/2011 | Ham |
| 2011/0062149 A1 | 3/2011 | Oriel |
| 2011/0072978 A1 | 3/2011 | Popescu |
| 2011/0108506 A1 | 5/2011 | Lindhorst-Ko |
| 2011/0121660 A1 | 5/2011 | Azancot |
| 2011/0143000 A1 | 6/2011 | Fiset |
| 2011/0152979 A1 | 6/2011 | Driscoll |
| 2011/0155621 A1 | 6/2011 | Lindquist |
| 2011/0174993 A1 | 7/2011 | Blain |
| 2011/0179807 A1 | 7/2011 | Holloway |
| 2011/0180527 A1 | 7/2011 | Abbott |
| 2011/0198255 A1 | 8/2011 | Baumfalk |
| 2011/0259871 A1 | 10/2011 | Li |
| 2011/0265562 A1 | 11/2011 | Li |
| 2012/0061050 A1 | 3/2012 | Petrillo |
| 2012/0064470 A1 | 3/2012 | Delattre |
| 2012/0082766 A1 | 4/2012 | Maupin |
| 2012/0090333 A1 | 4/2012 | Deliamorte, Jr. |
| 2012/0103562 A1 | 5/2012 | Alexander |
| 2012/0118874 A1 | 5/2012 | Williams |
| 2012/0132646 A1 | 5/2012 | England |
| 2012/0138597 A1 | 6/2012 | Quella |
| 2012/0187066 A1 | 7/2012 | Redl |
| 2012/0193999 A1 | 8/2012 | Zeine |
| 2012/0235505 A1 | 9/2012 | Schatz |
| 2012/0235636 A1 | 9/2012 | Partovi |
| 2012/0248096 A1 | 10/2012 | Lee |
| 2012/0255946 A1 | 10/2012 | Kim |
| 2012/0256585 A1 | 10/2012 | Partovi |
| 2012/0258229 A1 | 10/2012 | Mindrup |
| 2012/0312031 A1 | 12/2012 | Olsen |
| 2012/0319500 A1 | 12/2012 | Beart |
| 2013/0016462 A1 | 1/2013 | Howitt |
| 2013/0059259 A1 | 3/2013 | Oldani |
| 2013/0103463 A1 | 4/2013 | Briar |

(56) References Cited

U.S. PATENT DOCUMENTS

| | | |
|---|---|---|
| 2013/0167730 A1 | 7/2013 | Behm |
| 2013/0200064 A1 | 8/2013 | Alexander |
| 2013/0206015 A1 | 8/2013 | Jacoby |
| 2013/0221013 A1 | 8/2013 | Kolowich |
| 2013/0239607 A1 | 9/2013 | Kelly |
| 2013/0247591 A1 | 9/2013 | Demasi |
| 2013/0255824 A1 | 10/2013 | Williams et al. |
| 2013/0275075 A1 | 10/2013 | Johnson |
| 2014/0165607 A1 | 6/2014 | Alexander |
| 2014/0230484 A1 | 8/2014 | Yavitz |
| 2014/0238985 A1 | 8/2014 | Sweeney |
| 2014/0354438 A1 | 12/2014 | Hazen |
| 2015/0024349 A1 | 1/2015 | Bischoff |
| 2015/0122688 A1 | 5/2015 | Dias |
| 2015/0245723 A1 | 9/2015 | Alexander |
| 2015/0335184 A1 | 11/2015 | Balachandran |
| 2016/0183730 A1 | 6/2016 | Bedi |
| 2016/0242598 A1 | 8/2016 | Alexander |
| 2017/0150840 A1 | 6/2017 | Park |

FOREIGN PATENT DOCUMENTS

| | | |
|---|---|---|
| CN | 1502513 A | 6/2004 |
| CN | 2684824 | 3/2005 |
| CN | 2708795 Y | 7/2005 |
| CN | 1748112 A | 3/2006 |
| CN | 1776992 A | 5/2006 |
| CN | 2922666 Y | 7/2007 |
| CN | 101069606 A | 11/2007 |
| CN | 200980833 | 11/2007 |
| CN | 101109795 A | 1/2008 |
| CN | 201042350 Y | 4/2008 |
| CN | 201076180 | 6/2008 |
| CN | 201308643 | 10/2008 |
| CN | 201171801 | 12/2008 |
| CN | 201237271 | 5/2009 |
| CN | 101507261 A | 8/2009 |
| CN | 201303850 Y | 9/2009 |
| CN | 201445353 U | 5/2010 |
| CN | 101721314 | 6/2010 |
| CN | 101820128 A | 9/2010 |
| CN | 201612420 U | 10/2010 |
| CN | 201668739 | 12/2010 |
| CN | 202168958 | 3/2012 |
| CN | 102802294 | 5/2012 |
| CN | 202681700 | 1/2013 |
| CN | 202682376 | 1/2013 |
| CN | 101052368 B | 4/2013 |
| CN | 202919767 U | 5/2013 |
| CN | 203123058 | 8/2013 |
| CN | 102266184 B | 10/2013 |
| CN | 101945599 B | 3/2014 |
| CN | 203468187 U | 3/2014 |
| CN | 103784326 | 5/2014 |
| CN | 102512085 B | 6/2014 |
| CN | 203777334 U | 8/2014 |
| CN | 203874128 U | 10/2014 |
| CN | 203915518 | 11/2014 |
| CN | 203989073 U | 12/2014 |
| CN | 104473771 | 4/2015 |
| CN | 204261058 U | 4/2015 |
| CN | 204352215 U | 5/2015 |
| CN | 204428452 U | 7/2015 |
| CN | 204483720 U | 7/2015 |
| CN | 204501704 U | 7/2015 |
| CN | 103622425 B | 9/2015 |
| CN | 204709427 U | 10/2015 |
| CN | 204766593 U | 11/2015 |
| CN | 204862692 U | 12/2015 |
| CN | 103989380 B | 1/2016 |
| CN | 204931161 U | 1/2016 |
| CN | 204931162 U | 1/2016 |
| CN | 204950604 U | 1/2016 |
| CN | 204972308 U | 1/2016 |
| CN | 205054911 U | 3/2016 |
| CN | 205163676 U | 4/2016 |
| CN | 205459941 U | 8/2016 |
| CN | 205698560 U | 11/2016 |
| CN | 205849824 U | 1/2017 |
| CN | 205849825 U | 1/2017 |
| CN | 205948058 U | 2/2017 |
| CN | 205948059 U | 2/2017 |
| CN | 205994186 U | 3/2017 |
| CN | 206006757 U | 3/2017 |
| CN | 206026710 U | 3/2017 |
| CN | 206044395 U | 3/2017 |
| CN | 206045000 U | 3/2017 |
| CN | 206063431 U | 4/2017 |
| CN | 206102985 U | 4/2017 |
| CN | 206102987 U | 4/2017 |
| CN | 206120763 U | 4/2017 |
| CN | 206167409 U | 5/2017 |
| CN | 206198317 U | 5/2017 |
| CN | 206213740 U | 6/2017 |
| CN | 206252255 U | 6/2017 |
| CN | 206285271 U | 6/2017 |
| CN | 206295458 U | 7/2017 |
| CN | 206355335 U | 7/2017 |
| CN | 206391214 U | 8/2017 |
| CN | 206414170 U | 8/2017 |
| CN | 206424319 U | 8/2017 |
| CN | 206508264 U | 9/2017 |
| CN | 206630471 U | 11/2017 |
| CN | 206642098 U | 11/2017 |
| CN | 206657256 U | 11/2017 |
| CN | 206660148 U | 11/2017 |
| CN | 206687924 U | 12/2017 |
| CN | 206729506 U | 12/2017 |
| CN | 206730162 U | 12/2017 |
| CN | 104958185 B | 1/2018 |
| CN | 105231819 B | 1/2018 |
| CN | 206896527 U | 1/2018 |
| CN | 206934346 U | 1/2018 |
| CN | 206934347 U | 1/2018 |
| CN | 207041678 U | 2/2018 |
| CN | 207137055 U | 3/2018 |
| CN | 207137057 U | 3/2018 |
| CN | 207221113 U | 4/2018 |
| CN | 106419508 B | 5/2018 |
| CN | 207306902 U | 5/2018 |
| CN | 207445226 U | 6/2018 |
| CN | 207506787 U | 6/2018 |
| CN | 106361167 B | 8/2018 |
| CN | 207755561 U | 8/2018 |
| CN | 207821691 U | 9/2018 |
| CN | 207821692 U | 9/2018 |
| CN | 207821693 U | 9/2018 |
| CN | 207855570 U | 9/2018 |
| CN | 105395078 B | 10/2018 |
| CN | 207996308 U | 10/2018 |
| CN | 208030985 U | 11/2018 |
| CN | 208048624 U | 11/2018 |
| CN | 105943402 B | 12/2018 |
| CN | 208211918 U | 12/2018 |
| CN | 105640315 B | 1/2019 |
| CN | 208448168 U | 2/2019 |
| CN | 208461536 U | 2/2019 |
| CN | 208463661 U | 2/2019 |
| CN | 208481024 U | 2/2019 |
| CN | 208481124 U | 2/2019 |
| CN | 208491583 U | 2/2019 |
| DE | 19744526 | 4/1999 |
| DE | 20108363 | 8/2001 |
| DE | 20314416 | 1/2004 |
| DE | 202016007747 U1 | 3/2017 |
| EP | 0332355 | 9/1989 |
| EP | 0722708 | 7/1996 |
| EP | 0895772 | 2/1999 |
| EP | 1338230 B1 | 5/2006 |
| EP | 1722661 B1 | 1/2008 |
| EP | 2165243 A1 | 3/2010 |
| EP | 2001761 | 1/2012 |
| EP | 2288278 B1 | 4/2012 |
| EP | 2308771 | 6/2012 |

(56) References Cited

FOREIGN PATENT DOCUMENTS

| | | | |
|---|---|---|---|
| EP | 2498653 B1 | 1/2015 |
| EP | 3159212 B1 | 4/2017 |
| EP | 3267861 B1 | 1/2018 |
| FR | 2 705 764 | 12/1994 |
| FR | 2737380 | 1/1997 |
| FR | 2 752 504 A1 | 2/1998 |
| FR | 2752377 | 2/1998 |
| FR | 2 753 071 A1 | 3/1998 |
| FR | 2753071 A1 | 3/1998 |
| FR | 2763463 | 11/1998 |
| FR | 2808666 A1 | 11/2001 |
| FR | 2828082 | 2/2003 |
| GB | 735 674 A | 8/1955 |
| GB | 2 390 798 A | 1/2004 |
| GB | 2414922 A | 12/2005 |
| GB | 2439270 | 8/2006 |
| GB | 2441825 | 3/2008 |
| GB | 2498338 B2 | 2/2017 |
| GB | 2541080 B2 | 4/2018 |
| IN | 02555CN2012 A | 5/2013 |
| IN | 03553MU2012 A | 6/2015 |
| IN | 201744034469 A | 4/2018 |
| JP | U-S54-147575 | 4/1953 |
| JP | S63-249519 A | 10/1988 |
| JP | 06-021549 U | 3/1994 |
| JP | H10-146276 U | 6/1998 |
| JP | 11-268777 | 10/1999 |
| JP | 2000-279302 A | 10/2000 |
| JP | 2003-299255 A | 10/2003 |
| JP | A-2004-261493 | 9/2004 |
| JP | 2006-068152 | 3/2006 |
| JP | 2006-102234 A | 4/2006 |
| JP | 2006-166522 A | 6/2006 |
| JP | 2006-345957 | 12/2006 |
| JP | 2007-064557 A | 3/2007 |
| JP | 2007-312932 A | 12/2007 |
| JP | 2008-173464 A | 7/2008 |
| JP | U-3153007 | 7/2009 |
| JP | 2010-527226 A | 8/2010 |
| JP | 2011-171205 | 9/2011 |
| JP | 5127819 | 1/2013 |
| JP | 5481388 | 4/2014 |
| JP | 5742514 B2 | 7/2015 |
| JP | 6223501 B2 | 11/2017 |
| KR | 2011 0080453 | 7/2011 |
| WO | WO 2004/055654 A2 | 7/2004 |
| WO | WO 2008/028329 | 3/2008 |
| WO | WO 2008/065175 | 6/2008 |
| WO | WO 2008/137996 A1 | 11/2008 |
| WO | WO 2008/155538 A2 | 12/2008 |
| WO | WO 2009/138930 A1 | 11/2009 |
| WO | WO 2010/087560 A2 | 8/2010 |
| WO | WO 2010/087560 A3 | 8/2010 |
| WO | WO 2012/104665 | 8/2012 |
| WO | WO 2013 182520 A2 | 12/2013 |
| WO | WO 2013 187763 A1 | 12/2013 |
| WO | WO 2014 138771 A1 | 9/2014 |
| WO | WO 2018/122669 A1 | 7/2018 |

OTHER PUBLICATIONS

BabyBoo Feeding Bottle by Faitron AG, available before Jan. 31, 2018 (https://web.archive.org/web/20170902065935/https:/www.faitron.com./babyboo/) 11 pages.
Chinese Office Action, regarding Application No. 201510869257.5, dated Aug. 30, 2018, 9 pages.
Decision of Rejection dated Apr. 4, 2017 in JP Application No. 2013-537797.
European Office Action dated Sep. 28, 2017, received in European Patent Application No. 14 774 350.4, pp. 5.
European Patent Office Search Report dated Mar. 17, 2016 regarding Application No. 11838764.6-1804, PCT/US2011059014, 7 pages.
European Search Report received in European Patent Application No. 15811173.2, dated Dec. 13, 2017.
First Office Action dated Nov. 23, 2016 in CN Application No. 201480014620.9.
International Preliminary Report on Patentability dated May 7, 2013 in PCT Application No. PCT/US2011/059014.
International Search Report and Written Opinion dated Jul. 2015, Application No. PCT/US15/36304, 18 pages.
International Search Report and Written Opinion dated Jan. 12, 2016 in PCT Application No. PCT/US15/36304.
International Search Report and Written Opinion dated Dec. 9, 2014 in PCT/US2014/019130.
International Search Report and Written Opinion dated Mar. 16, 2012 in PCT/US2011/059014.
Non-final office action dated Aug. 2, 2016 in Japanese Patent Application No. 2013-537797.
Notice of Reason(s) for Rejection dated Aug. 11, 2015 in JP Application No. 2013-53797.
Office Action dated Aug. 7, 2018, received for Japanese Patent Application No. JP 2017-151497, 4 pages.
Office Action dated Jan. 12, 2018, received in Chinese Application No. 201510869257.5.
Office Action in related Chinese Application No. 201180063844.5, dated Dec. 29, 2014.
Office Action received in Japanese Patent Application No. 2017-151497, dated Nov. 21, 2017, 5 pages.
Patent Examination Report No. 1 in related Australian Application No. 2011323416, dated May 15, 2015.
Patent Examination Report No. 2 in related Australian Application No. 2011323416, dated Oct. 20, 2015.
PCT Invitation to Pay Additional Fees dated Apr. 10, 2019, regarding PCT/US2019/015609, 13 pages.
PCT International Search Report and Written Opinion, regarding International Application No. PCT/US2019/015609, dated Jul. 18, 2019, 21 pages.
Second Office Action dated Apr. 10, 2017 in CN Application No. 201510869257.5.
Supplementary European Search Report dated Oct. 18, 2016 in European Patent Application No. 14774350.
European Patent Office Extended European Search Report regarding Application No. EP 21208864.5, dated Feb. 4, 2022, 10 pages.

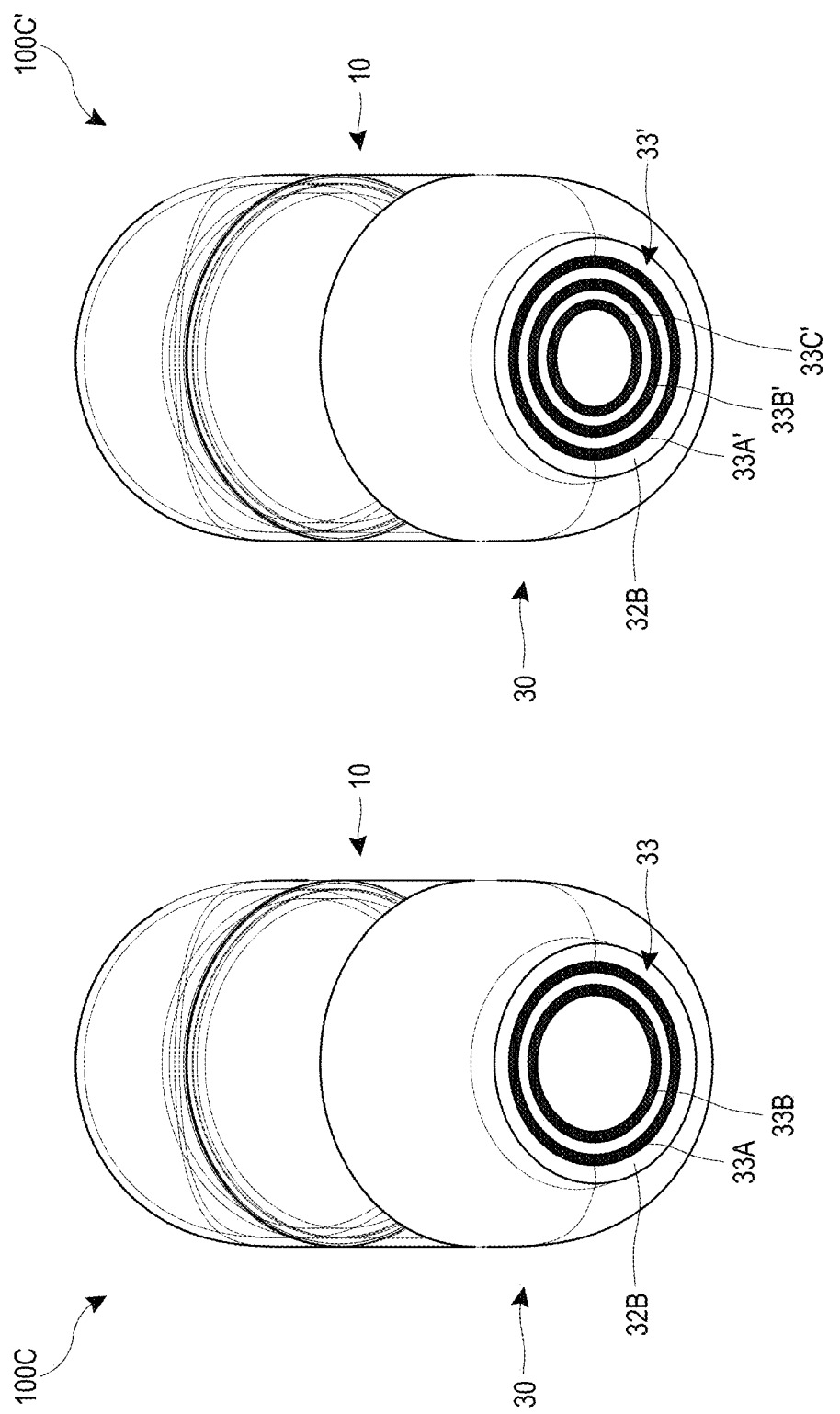

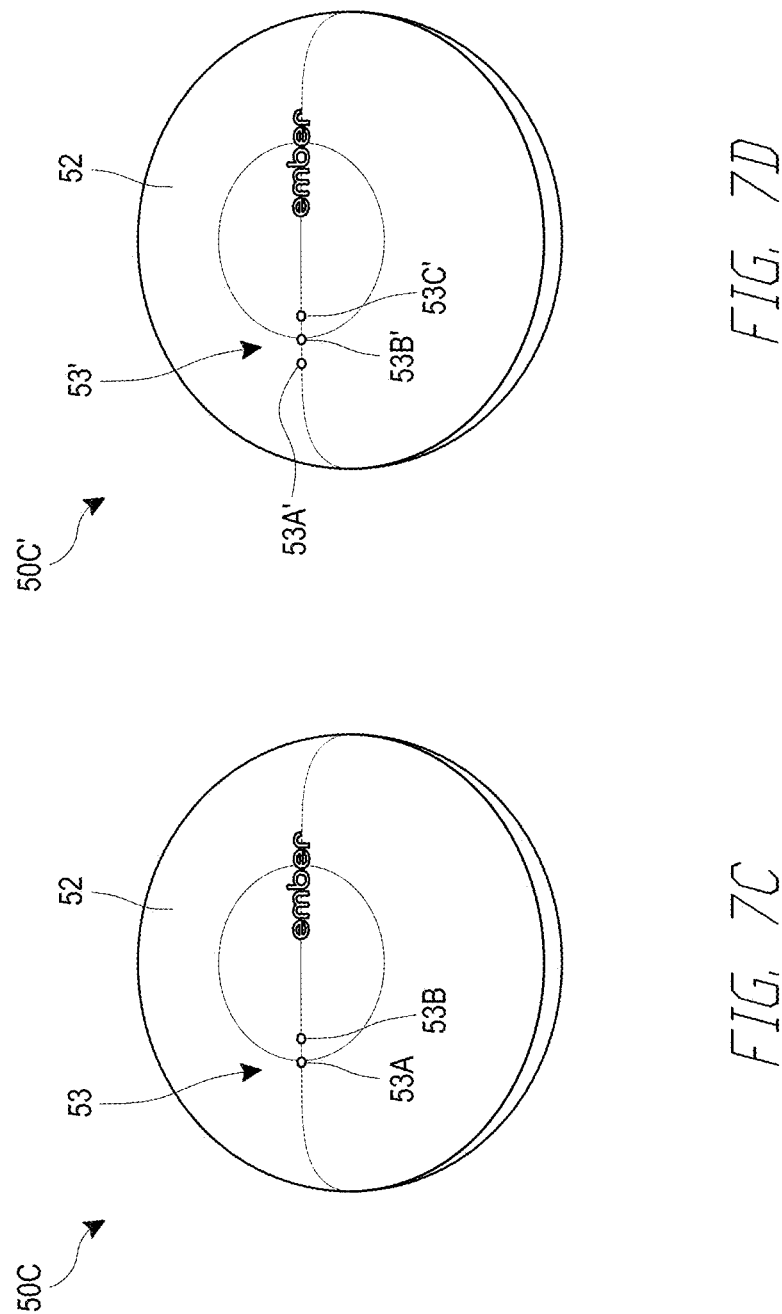

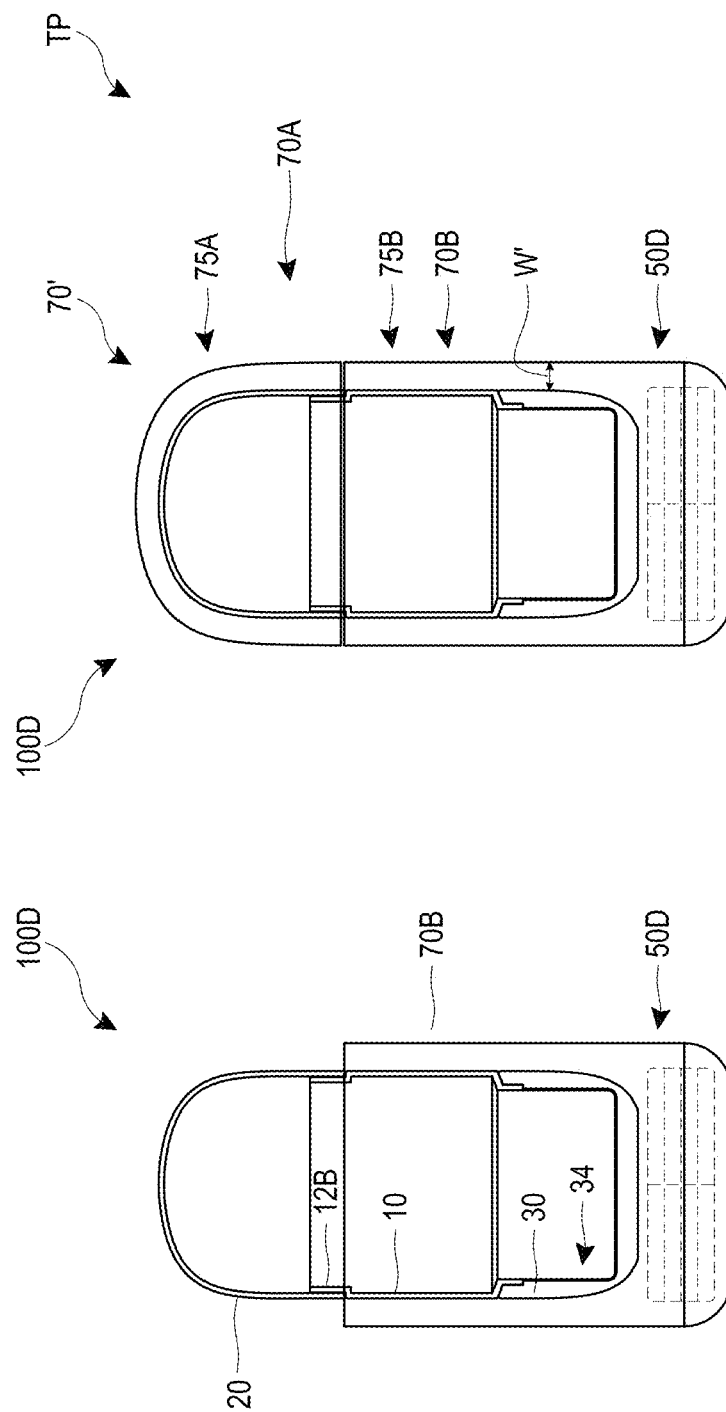

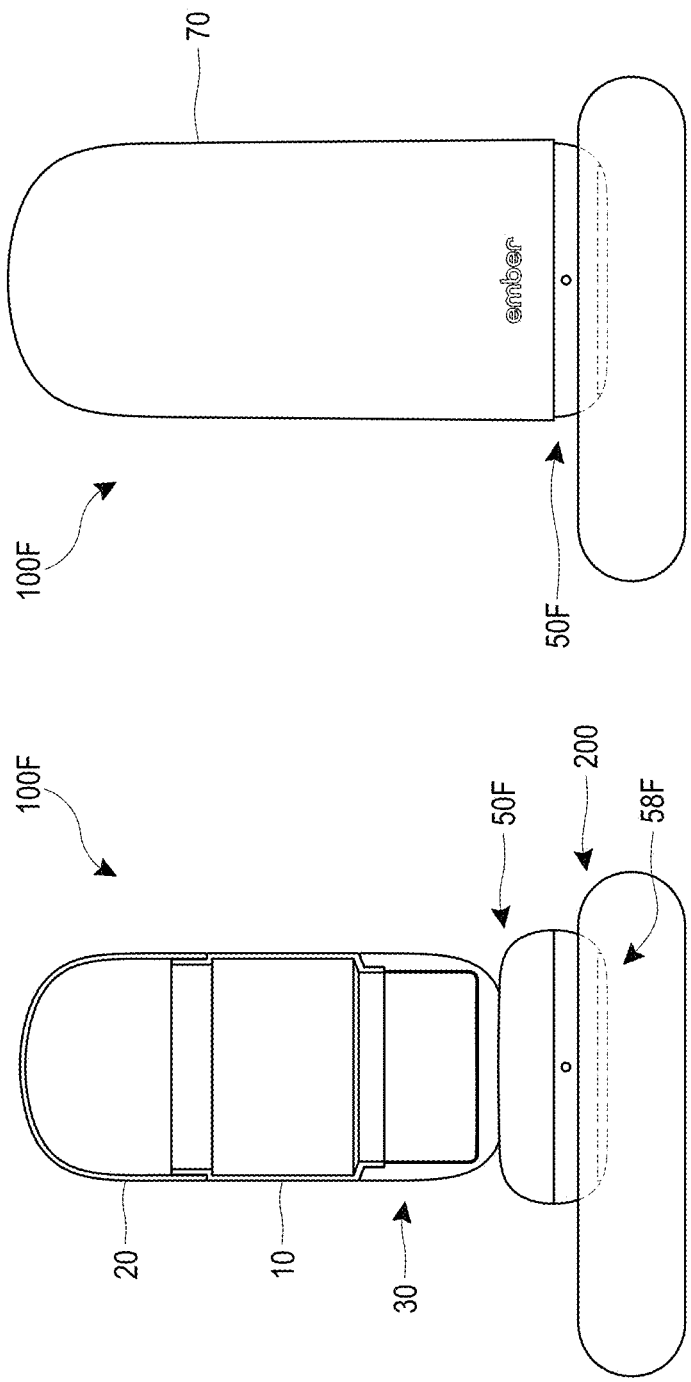

INFANT BOTTLE SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention is directed to an actively heated drinkware container, and more particularly to an actively heated or cooled infant bottle system.

Description of the Related Art

Existing systems for heating milk in infant bottles suffer from various problems that make them difficult to use or inconvenient for use by parents and caregivers in preparing heated milk to feed an infant. Such problems include lack of portability, and the inability to readily heat the milk for consumption by the infant (e.g., during nighttime feedings, while traveling, etc.), and the inability to maintain the milk in a cooled state before the milk is fed to the baby.

SUMMARY

There is a need for an improved infant bottle system (e.g., baby bottle, sippy cup) that does not have the drawbacks of existing systems. In accordance with one aspect of the invention, an improved infant bottle system (e.g., baby bottle, sippy cup) is provided that maintains the contents (e.g., water, milk, breast milk, infant formula, etc.) in the container in a cooled state for an extended period of time (e.g., while traveling or commuting), and that can readily and controllably heat the contents (e.g., water, milk, breast milk, infant formula, etc.) in the container to an appropriate feeding temperature for consumption by the infant.

In accordance with another aspect, a smart infant bottle system is provided that optionally can communicate with mobile electronic devices (e.g., smartphones, tablet computers, laptop computers) to allow easy operation of the infant bottle system and/or collect information associated with the consumption of liquid (e.g., water, milk, breast milk, infant formula, etc.) from the bottle (e.g., time of day of feeding, number of feedings a day, volume of liquid, such as milk, consumed per feeding, etc.). The smart infant bottle system can optionally be programmed to heat (e.g., automatically without user actuation) the liquid (e.g., water, milk, breast milk, infant formula, etc.) at specific time(s) of day (e.g., based on collected data of feeding patterns of infant).

The smart infant bottle system can optionally include a detachable module that includes electronics and one or more power storage elements (e.g., batteries, such as rechargeable batteries), and which can be mechanically coupled to the container to effect an electrical connection between the module and the container to effect communication between electronics in the module and electronics (e.g., one or more sensors) in the container, and effect communication between the one or more power storage elements in the module and one or more heating elements in the container that are operable to heat the liquid (e.g., water, milk, breast milk, infant formula, etc.) in a chamber of the container. Optionally, the module can be detachably coupled to each of a plurality of containers (e.g., to a plurality of infant bottles), thereby allowing use of the module with a plurality of containers. Detaching the module from the container advantageously allows a user to wash the container without risk of damaging the electronics in the module.

In accordance with another aspect, an infant bottle feeding system is provided. The system comprises an infant bottle having a body with a chamber configured to receive a liquid (e.g., water, milk, breast milk, infant formula, etc.) therein. The infant bottle comprises one or more heating elements housed in the body and in thermal communication with the chamber and operable to heat a liquid (e.g., water, milk, breast milk, infant formula, etc.) in the chamber, and one or more sensors in communication with the chamber and operable to sense one or more parameters of the liquid in the chamber. The system also comprises a power base removably attached to a bottom surface of the infant bottle and configured to deliver power to electronics in the infant bottle. The system also comprises a thermal cover configured to fit over the infant bottle and to releasably couple to the power base to completely enclose the infant bottle, the thermal cover configured to insulate the infant bottle and inhibit heat loss of liquid in the chamber. The power base is configured to deliver power to the one or more heating elements and one or more sensors in the infant bottle only when the infant bottle is on the power base, and wherein the infant bottle, thermal cover and power base define a single travel pack unit when coupled together.

In accordance with another aspect, an infant bottle feeding system is provided. The system comprises an electronic base configured to removably support an infant bottle on an upper surface thereof. The electronic base comprises one or more sensors, at least one of the one or more sensors configured to sense a weight of the infant bottle when placed on the electronic base, a transceiver, and circuitry configured to communicate with the one or more sensors and the transceiver. The circuitry is operable to one or more of: record one or both of a start time and start weight of the infant bottle prior to an infant feeding event, record one or both of an end time and end weight of the infant bottle following an infant feeding event, calculate one or both of an elapsed time between the start time and end time and a consumption amount based on a difference between the start weight and end weight, and one or both of store the elapsed time and consumption amount in a memory of the electronic base and wirelessly communicate via the transceiver the elapsed time and consumption amount to one or both of a remote electronic device and a to the cloud-based data storage system for storage and from which data is accessible via a dashboard interface on an electronic device. The system also comprises a thermal cover configured to fit over the infant bottle and to releasably couple to the electronic base to completely enclose the infant bottle between the thermal cover and the electronic base, the thermal cover configured to insulate the infant bottle and inhibit heat loss of liquid in the infant bottle.

In accordance with another aspect, an infant bottle feeding system is provided. The system comprises an infant bottle having a body with a chamber configured to receive a liquid therein. The infant bottle comprises one or more heating elements housed in the body and in thermal communication with the chamber and operable to heat a liquid in the chamber, and one or more sensors in communication with the chamber and operable to sense one or more parameters of the liquid in the chamber. The system also comprises an electronic base removably attached to a bottom surface of the infant bottle and configured to deliver power to electronics in the infant bottle. The system also comprises a thermal cover configured to fit over the infant bottle and to releasably couple to the electronic base to completely enclose the infant bottle, the thermal cover configured to insulate the infant bottle and inhibit heat loss of liquid in the chamber. The electronic base is configured to deliver power to one or both of the one or more heating elements and the one or more sensors in the infant bottle only when the infant bottle is on the electronic base, and wherein the infant bottle, thermal cover and electronic base define a single travel pack unit when coupled together.

BRIEF DESCRIPTION OF THE DRAWINGS

FIG. 7A is a perspective bottom view of an actively heated or cooled drinkware container.

FIG. 7B is a perspective bottom view of an actively heated or cooled drinkware container.

FIG. 7C is a perspective top view of a power base for use with the actively heated or cooled drinkware container of FIG. 7A.

FIG. 7D is a perspective top view of a power base for use with the actively heated or cooled drinkware container of FIG. 7B.

FIG. 8A is a schematic side view of an actively heated or cooled drinkware container.

FIG. 8B is a schematic side view of the actively heated or cooled drinkware container of FIG. 8A with thermal cover cap attached thereto.

FIG. 10A is a schematic side view of an actively heated or cooled drinkware container disposed on a power base, which is disposed on a charging base.

FIG. 10B is a schematic side view of an actively heated or cooled drinkware container disposed on a power base, which is disposed on a charging base.

DETAILED DESCRIPTION

Disclosed herein are drinkware container systems with active temperature control (e.g., actively heated drinkware container systems, actively cooled drinkware container systems, actively heated and cooled drinkware container systems). Though the figures and description of the instant application may refer to the drinkware container system in the context of an infant bottle system (e.g., baby bottle, sippy cup), the features disclosed herein for the drinkware container system also apply to (and can be incorporated in) other drinkware (e.g., cups, mugs, travel mugs) and plateware (e.g., bowls, plates, platters, serving dishes, etc.). Also disclosed herein is a power base or smart base (e.g., electronic base) that can be used with the actively heated or cooled drinkware container. As disclosed herein, the power base or smart base (e.g., electronic base) can also be used with conventional drinkware containers (e.g., with conventional infant bottles, sippy cups, etc.) that do not have any electronics or heating/cooling elements in the containers.

Figure 1:
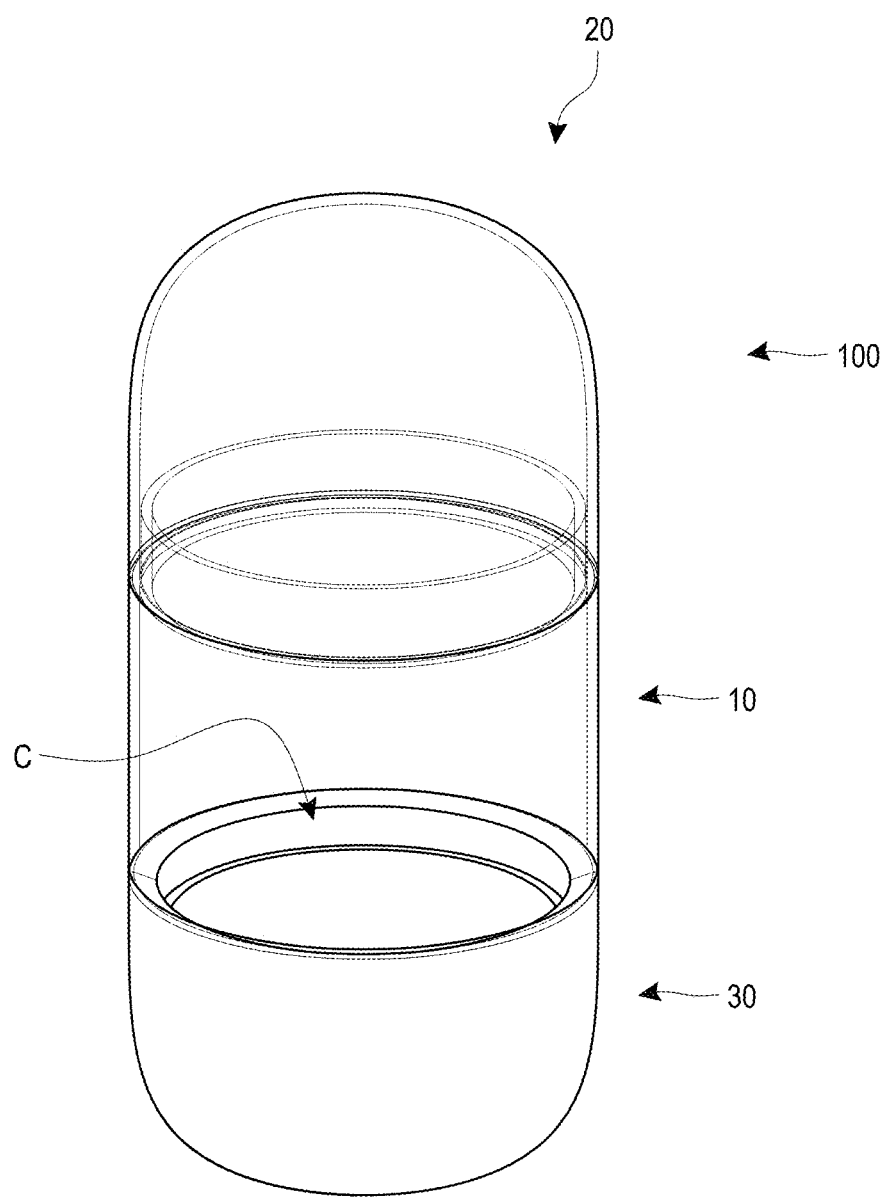
FIG. 1 is a schematic view of an actively heated or cooled drinkware container.
Figure 2:
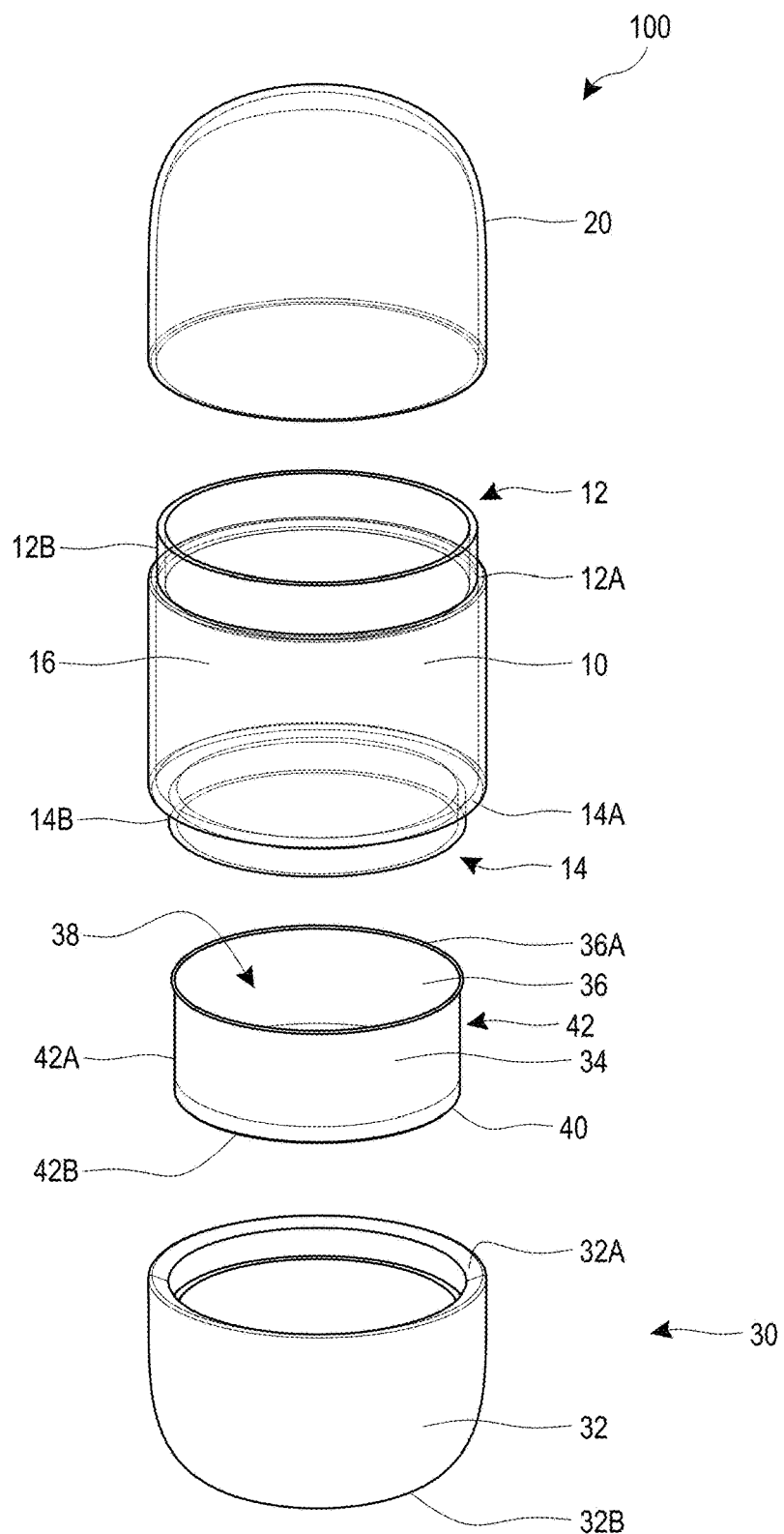
FIG. 2 is a schematic exploded view of the actively heated or cooled drinkware container of FIG. 1.

FIGS. 1-2 shows a drinkware container 100. The container 100 can optionally be an infant feeding bottle (e.g., a baby bottle). The container 100 includes a vessel 10 and optionally includes a lid 20, which can be removably coupled to a proximal end 12 of the vessel 10. Optionally, the vessel 10 can have a proximal portion 12B of reduced diameter that defines a shoulder 12A, where the lid 20 can optionally fit over the proximal portion 12B and optionally contact at least a portion of the shoulder 12A (as shown, for example, in FIG. 3B). The container 100 includes a module 30 attached to a distal end 14 of the vessel 10. Optionally, the vessel 10 can have a distal portion 14B of reduced diameter that defines a shoulder 14A, where the module 30 optionally fits over the distal portion 14B so that a rim 32A of the module 30 optionally contacts at least a portion of the shoulder 14A (as shown, for example, in FIG. 3B).

Though not shown, a seal (e.g., hermetic seal) is optionally disposed between the module 30 and the vessel 10, for example between the proximal portion of the module 30 that fits over the distal portion 14B (e.g., reduced diameter portion) of the vessel 10. The seal advantageously provides a watertight seal between the vessel 10 and the module 30. In one implementation, the seal is an elastomer seal. In another implementation, the seal includes a heat activated film. In another implementation, the seal includes a laser activated adhesive. In another implementation, the seal includes a pressure activated adhesive.

Optionally, the module 30 is removably attached to the distal end of the vessel 10. Alternatively, the module 30 is fixed (e.g., not readily detachable) from the vessel 10. For example, the module 30 can be adhered to the vessel 10 (e.g., with an adhesive, a weld, a press fit connection, etc.). Though not shown in FIG. 1, the container 100 can optionally include a nipple attached to the proximal end of the vessel 10 (similar to the nipple N in FIGS. 4C, 5), which can be covered by the optional lid 20.

The vessel 10 is optionally transparent or translucent (e.g., made of glass, plastic, etc.). Alternatively, the vessel 10 can be opaque. The vessel 10 can define a passage 16 (e.g., open space) between an opening at the proximal end 12 and an opening at the distal end 14. The passage 16 defines at least a portion of the chamber C in the container 100 that holds liquid, as further described below.

With reference to FIG. 2, the module 30 can have a body 32 that extends between the rim 32A (e.g., circumferential rim) at a proximal end of the module 30 and a bottom surface 32B. Optionally, the bottom surface 32B is a distalmost surface of the module 30. The module 30 includes a heat transfer unit 34 that optionally has a circumferential wall 36 and a base 40 that together define a chamber 38 (e.g., the heat transfer unit 34 can be hollow cylindrical or annular). The chamber 38 optionally defines at least a portion of the chamber C in the container 100 that holds liquid (e.g., water, milk, breast milk, infant formula, etc.), which is described further below in connection with FIG. 3B. Optionally, the passage 16 in the vessel 10 along with the chamber 38 of the module 30 together define the chamber C of the container 100 that receives and holds liquid.

One or more heating or cooling elements 42 can optionally thermally communicate with (e.g., thermally contact) at least a portion of the circumferential wall 36 and/or the base 40. As shown in FIG. 2, one or more heating or cooling elements 42A can optionally thermally contact an outer surface of the circumferential wall 36. One or more heating or cooling elements 42B can optionally thermally contact an outer surface of the base 40. As used herein, "thermal communication" or "thermal contact" is not limited to direct contact between the one or more heating or cooling elements 42 and one or both of the circumferential wall 36 and the base 40, and optionally includes indirect contact (e.g., where there is one or more component interposed between the one or more heating or cooling elements 42 and one or both of the circumferential wall 36 and the base 40). Optionally, the one or more heating or cooling elements 42 are one or more (e.g., a plurality of) resistive heaters, such as a plurality of heater wires or one or more heater flex (e.g., flexible heater unit, for example wrapped around outer surface of wall 36). In another implementation, the one or more heating or cooling elements 42 are one or more thermoelectric elements (e.g., Peltier elements).

Figure 3A:
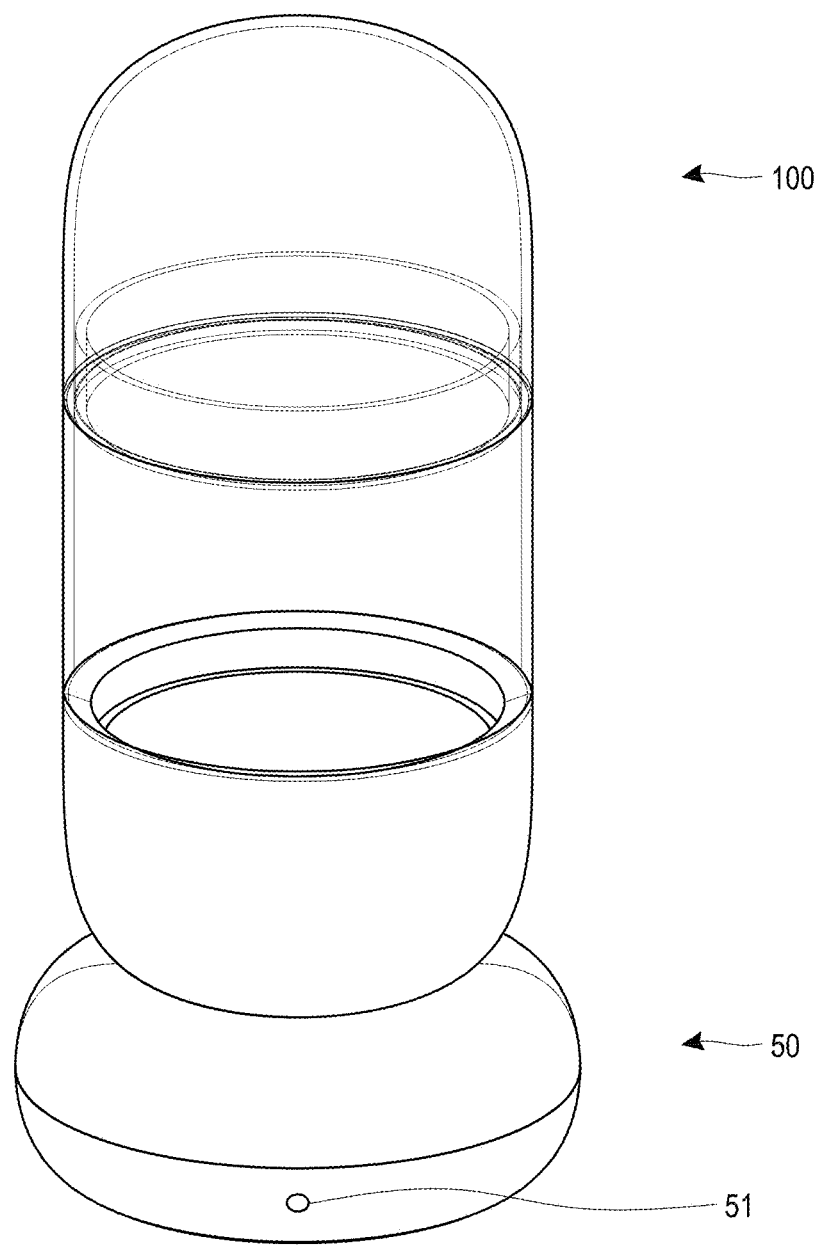
FIG. 3A is a schematic view of an actively heated or cooled drinkware container disposed on a power base.
Figure 3B:
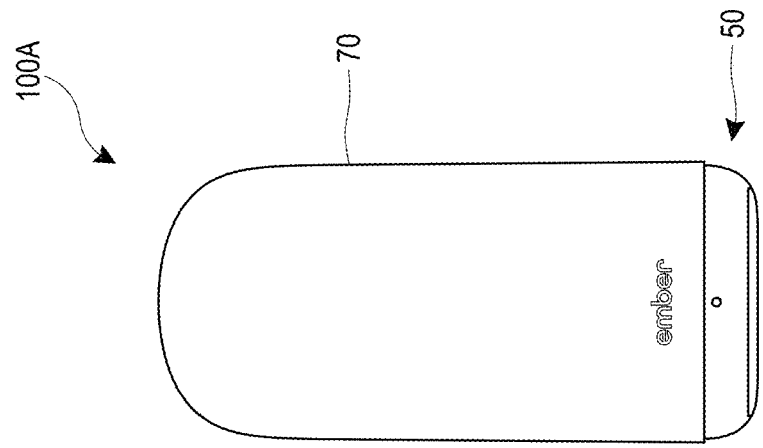
FIG. 3B is a side view of the actively heated or cooled drinkware container disposed on a power base of FIG. 3A.

FIG. 3A shows the drinkware container 100 disposed on a power base 50 (e.g., an electronic base, a smart base). Optionally, the power base 50 can be a smart base, as further described below. The power base 50 is operable to provide power to the one or more heating or cooling elements 42, as further described below. FIG. 3B shows a cross-sectional view of the drinkware container 100 disposed on the power base 50. The distal end 14 of the vessel 10 optionally is disposed over and optionally in contact with a rim 36A of the heat transfer unit 34. The rim 32A at the proximal end of the module 30 is optionally disposed over (e.g., circumferentially about, circumferentially surrounding) the reduced diameter portion 14B of the vessel 10. For sake of clarity, FIG. 3B excludes other features from the drinkware container 100, such as sensors, circuitry, etc., and from the power base or smart base 50, such as circuitry, power storage members (e.g., batteries), etc., which are further described below.

The power base 50 optionally has one or more visual indicators 51 that can indicate one or more operating conditions of the power base 50. For example, the one or more visual indicators 51 can indicate one or more of: attachment of drinkware container 100 to the power base 50, transfer of power to the one or more heating or cooling elements 42, communication with an electronic device (described further below), and temperature of the liquid in the drinkware container (e.g., to indicate the liquid is ready to consume or has not yet reached the desired temperature). For example, the one or more visual indicators 51 can be hidden-til-lit LED lights operable to illuminate in one or more (e.g., a plurality of) colors. For example, the visual indicator 51 can illuminate in a green color when the liquid is at the desired temperature for consumption and red when it has not yet reached the desired consumption temperature. Additionally, the one or more visual indicators 51 can flash in one or more (e.g., a plurality of) frequencies to indicate an operation of the power base 50 (e.g., optionally pairing of the power base 50 with an electronic device to communicate information from the power base 50 to the electronic device and optionally to provide user operating instructions to the power base 50 from the electronic device). Further details on the components and operation of the power base 50 are provided further below.

Figure 4B:
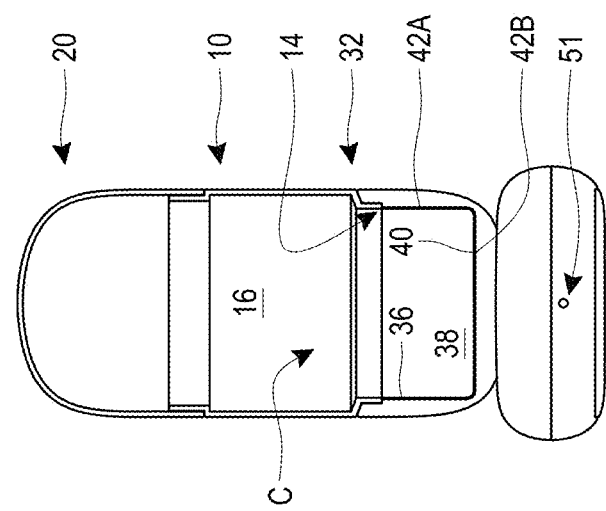
FIG. 4B is a side view of the actively heated or cooled drinkware container of FIG. 4A.
Figure 4A:
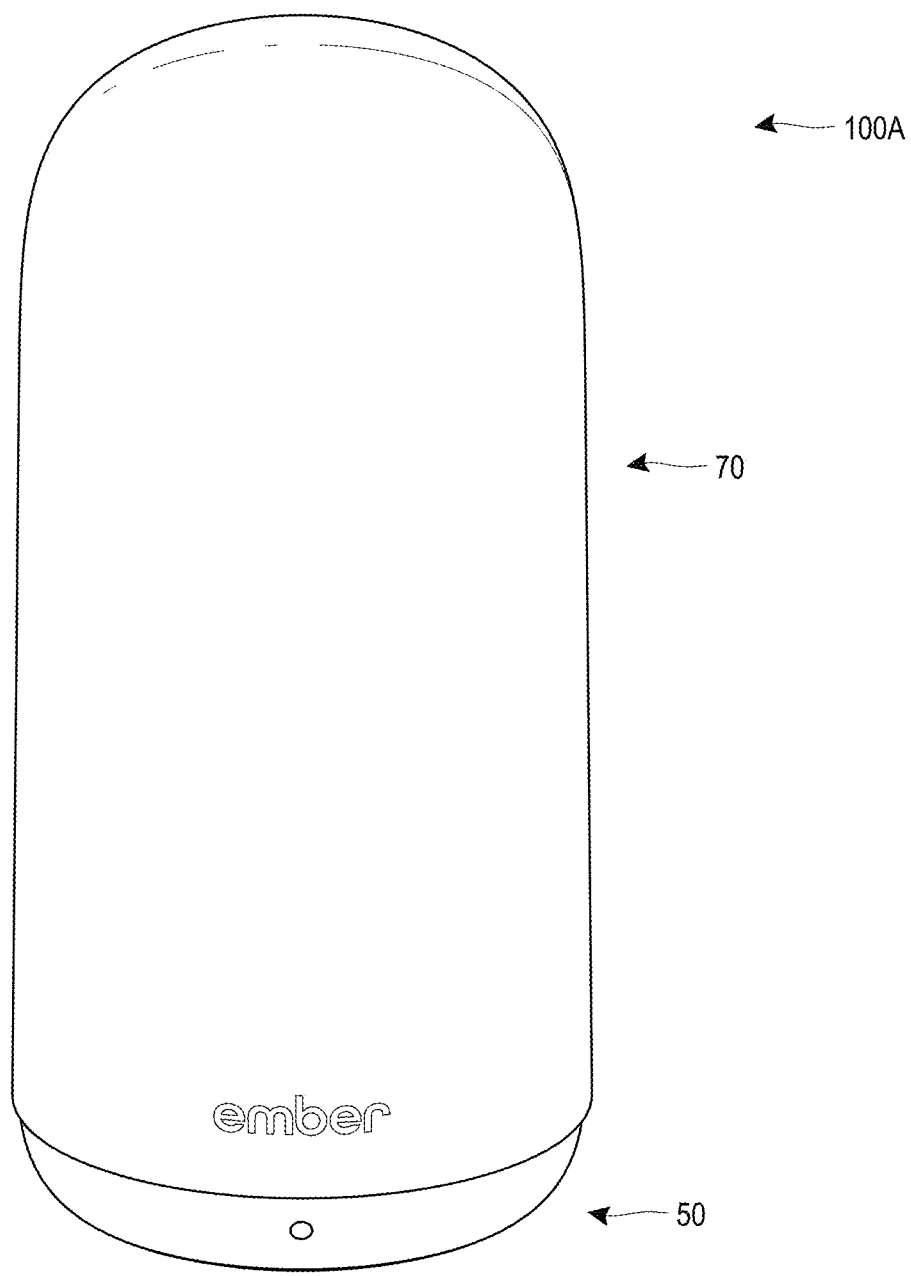
FIG. 4A is a schematic perspective view of an actively heated or cooled drinkware container.
Figure 4C:
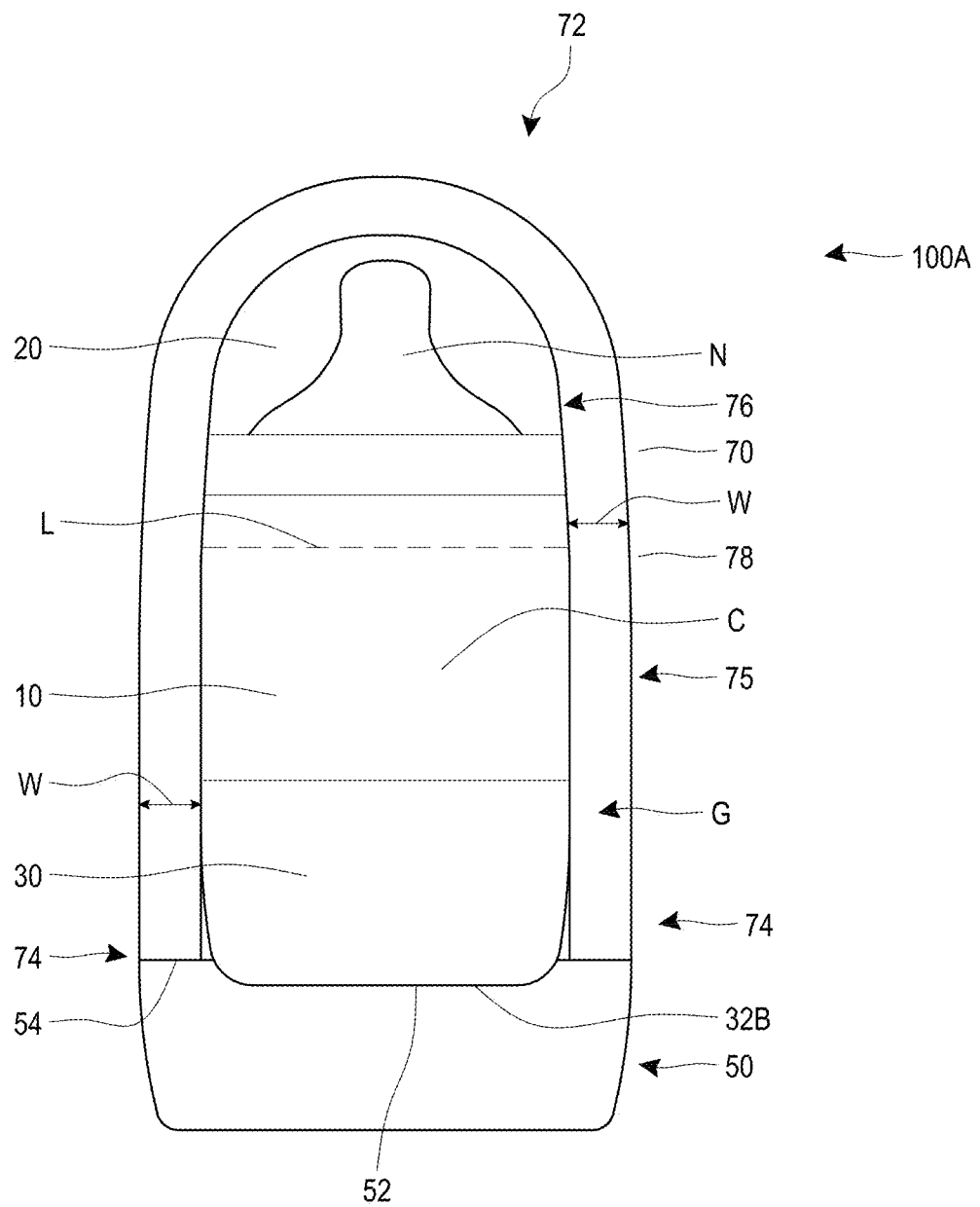
FIG. 4C is a schematic side view and partial cross-sectional view of the actively heated or cooled drinkware container of FIG. 4A.

FIGS. 4A-4C shows a drinkware container system 100A, which is shown as an infant feeding system (e.g., a baby bottle system). Some of the features of the drinkware container system 100A are similar to features in the drinkware container system 100 in FIGS. 1-3B. Thus, references numerals used to designate the various components of the container system 100 are identical to those used for identifying the corresponding components of the drinkware container system 100A in FIGS. 4A-4C. Therefore, the structure and description for the various components of the drinkware container system 100 in FIGS. 1-3B is understood to also apply to the corresponding components of the drinkware container system 100A in FIGS. 4A-4C, except as described below.

The drinkware container system 100A includes a nipple N disposed over the vessel 10 and under the lid 20. The module 30 is disposed on top of the power base 50, in a similar manner as described above in connection with the drinkware container 100. The power base 50 can be a smart base, as described further below. Optionally, the bottom surface 32B of the module 30 contacts a top surface 52 of the power base 50. The power base 50 can optionally be wider than the module 30 so as to define a circumferential shoulder 54 outward of the module 30 when the module 30 is disposed on the power base 50. Optionally, the module 30 can mechanically couple to the power base 50 (e.g., via one or more threads, key and slot connection, magnets, etc.). Alternatively, the module 30 can be disposed on the power base 50 but not be mechanically coupled to it. Advantageously, the power base 50 can provide power to the module 30 to, for example, provide power to the one or more heating or cooling elements 42.

The drinkware container system 100A optionally includes a cover 70 that can be disposed over the drinkware container (e.g., the bottle assembly defined by the vessel 10, module 30, optional nipple N, and optional lid 20). The cover 70 can optionally be dome shaped with a closed proximal end 72, an open distal end 74, and a chamber or cavity C between the closed proximal end 72 and open distal end 74 that removably receives the drinkware container 100A. The cover 70 optionally encloses at least a portion of the drinkware container 100A. In one implementation, the cover 70 encloses the entire drinkware container 100A. The cover 70 is optionally defined by a wall 75 having an inner surface 76 and an outer surface 78, the wall 75 having a width W between the inner and outer surfaces 76, 78. The width W can optionally range between about 5 mm and about 10 mm, optionally about 7 mm. However, the wall 75 can have other suitable widths W.

Optionally, the cover 70 is sized so that the inner surface 76 is adjacent (e.g., in contact with) at least a portion of an outer surface of the drinkware container 100A (e.g., at least a portion of an outer surface of the vessel 10 and/or the module 30, and or the lid 20). In one implementation, one or both of the cover 70 (e.g., the proximal end 72 of the cover 70) and the lid 20 can optionally have a pressure relief valve incorporated therein to allow pressure build up in the drinkware container 100 (e.g., in the liquid in the chamber C of the drinkware container 100) to be released. In another implementation, the cover 70 is sized so as to define an annular gap between the inner surface 76 of the cover and at least a portion of the outer surface of the drinkware container (e.g., at least a portion of an outer surface of the vessel 10 and/or the module 30 and/or the lid 20). In one implementation, the cover 70 optionally includes a thermally insulative material with low thermal conductivity properties between the inner surface 76 and the outer surface 78, thereby allowing the liquid in the drinkware container to retain its temperature for a prolonged period of time (e.g., 5 hours, 6 hours, 8 hours, 10 hours). In another implementation, the cover 70 has an gap or cavity defined between the inner surface 76 and the outer surface 78, so that the inner surface 76 is insulated relative to the outer surface 78. Optionally, the gap or cavity G is filled with air. In another implementation, the gap G can be under vacuum.

Optionally, the cover 70 can mechanically couple to the power base 50, allowing the cover 70 and power base 50 to be portable as a single unit (e.g., with the power base 50 attached to the cover 70 while in transit), and defining a portable travel pack with the baby bottle assembly (e.g., the drinkware container 100, a conventional infant bottle, etc.) under the cover 70. For example, the distal end 74 of the cover 70 can couple with the shoulder 54 of the power base 50. In one implementation, the cover 70 can couple with the power base 50 via a threaded connection. In another implementation, the cover 70 can couple with the power base 50 via a key-and-slot mechanism. In another implementation, the cover 70 can couple with the power base 50 via one or more magnets, such as one or more electromagnets as further described below. In another implementation, the cover 70 can couple with the power base 50 via a press-fit connection. As shown in FIG. 4A, when the cover 70 is attached to the power base 50, the drinkware container assembly 100A advantageously appears seamless.

Figure 4D:
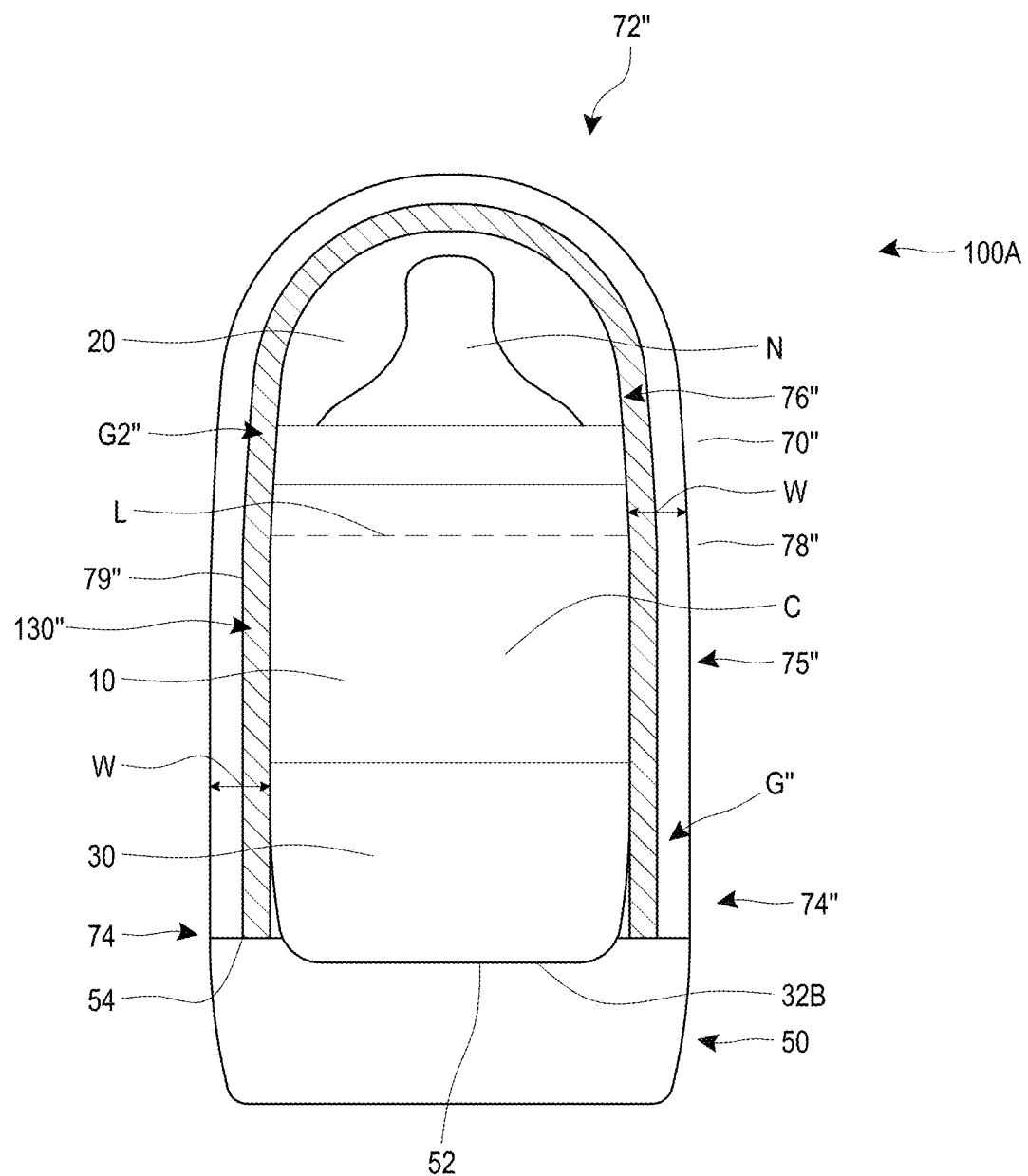
FIG. 4D is a schematic side view and partial cross-sectional view of another implementation of the actively heated or cooled drinkware container of FIG. 4A.

FIG. 4D schematically illustrate the container system 100A with a cover 70". The cover 70" is similar to the cover 70 of FIGS. 4A-4C. Thus, references numerals used to designate the various features of the cover 70" are identical to those used for identifying the corresponding components of the cover 70 in FIGS. 4A-4C, except that a " " "is added to the numerical identifier. Therefore, the structure and description for the various features of the cover 70 in FIGS. 4A-4C are understood to also apply to the corresponding components of the cover 70" in FIG. 4D, except as described below.

As shown in FIG. 4D, the cover 70" includes an intermediate wall 79" (e.g., annular intermediate wall) between (e.g., radially interposed) between at least a portion of the inner surface 74" and the outer surface 78". The intermediate wall 79" and inner wall 76" define a gap (e.g., annular gap) G2" therebetween. The intermediate wall 79" and outer surface 78" define a gap (e.g., annular gap) G" therebetween. In one implementation, the gap G" optionally includes a thermally insulative material with low thermal conductivity properties therein. In another implementation, the gap G" is filled with air. In another implementation, the gap G" is under vacuum. In one implementation, the gap G2" optionally includes a phase change material (PCM) 130". In one implementation, the phase change material 130" can be a solid-liquid PCM. In another implementation, the phase change material 130" can be a solid-solid PCM. The PCM 130" advantageously can passively absorb and release energy. Examples of possible PCM materials are water (which can transition to ice when cooled below the freezing temperature), a gel that can freeze when cooled, organic PCMs (e.g., bio based or Paraffin, or carbohydrate and lipid derived), inorganic PCMs (e.g., salt hydrates), and inorganic eutectics materials. However, the PCM 130" can be any thermal mass that can store and release energy.

In one implementation, the cover 70" can be placed in a cooler, refrigerator or freezer to charge (e.g., cool) the PCM 130". A user can then take the cover 70" from the cooler, refrigerator or freezer and dispose it over a drinkware container (e.g., infant feeding bottle), where the cover 70" will maintain the drinkware container in a cooled state due to the PCM 130" (e.g., the PCM 130" will absorb heat from the drinkware container to thereby cool the drinkware container). Optionally, the cover 70" can be attached to the power base 50 so that the drinkware container (e.g., infant feeding bottle) is disposed between the cover 70" and the power base 50, as shown in FIG. 4D. Therefore, the cover 70", drinkware container (e.g. infant feeding bottle) and power base 50 can be portable as a single unit, and optionally define a portable travel pack, where the PCM 130" will absorb heat from the drinkware container to thereby cool the drinkware container during such travel (e.g., commute to school, to work, travel on an airplane or train, travel outdoors, such as on a hiking trip).

In one implementation, the inner surface 76", outer surface 78", and intermediate wall 79" of the cover 70" are made of the same material (e.g., a metal, such as stainless steel; a plastic material, a ceramic coated metal material). In another implementation, the inner surface 76" (optionally along with the intermediate wall 79") is made of a different material (e.g., stainless steel) than the outer surface 78" (e.g., plastic, ceramic, ceramic covered metal).

In one implementation, the cover 70" can maintain the drinkware container (e.g., infant feeding bottle) disposed in a chamber of the cover 70", and/or the liquid in the drinkware container at a cooled temperature (e.g., 40 F, 45 F, 50 F, 55 F, etc.) for an extended period of time (e.g., 8 hours or less, 6 hours or less, 4 hours or less, 2 hours or less, about 1 hour, about 30 minutes, etc.).

Figure 4E:
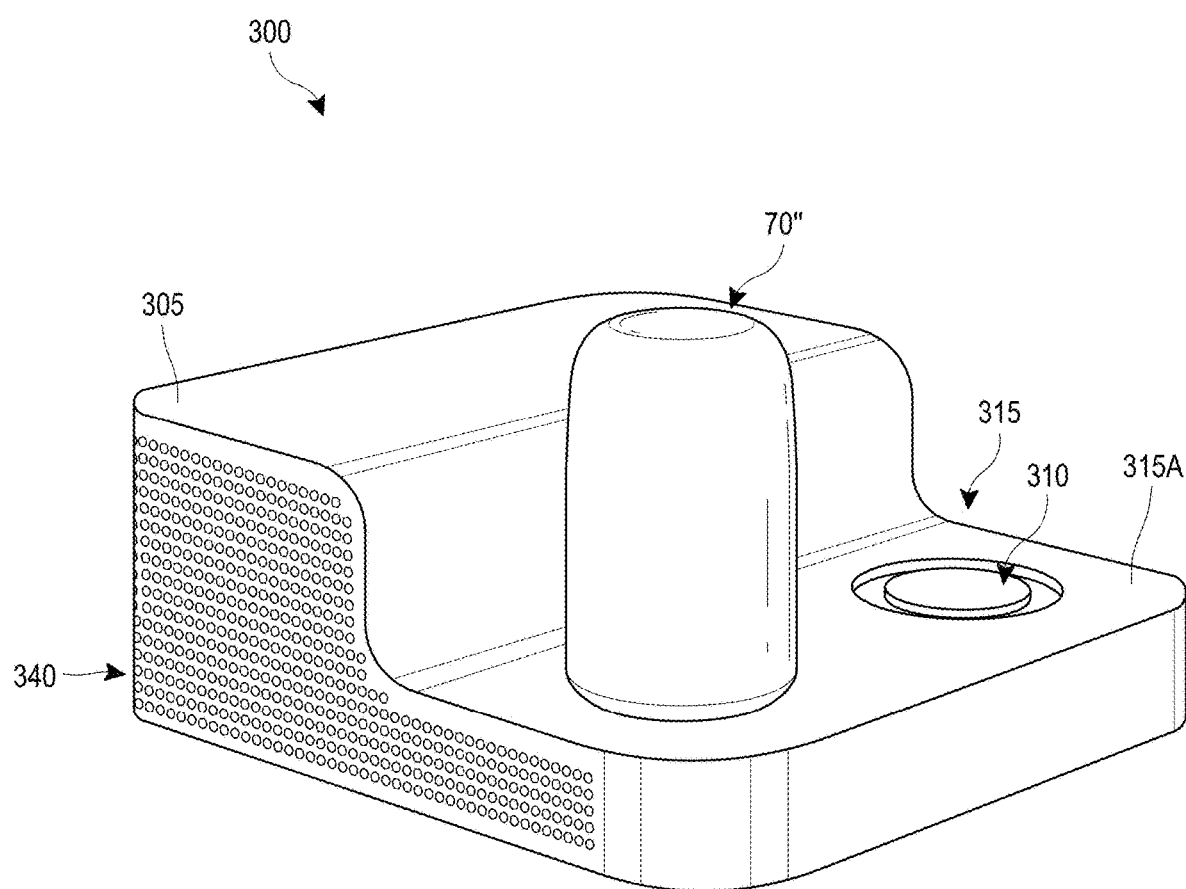
FIG. 4E is a schematic view of a cooling or heating unit for use with the a thermal cover of the actively heated or cooled drinkware container of FIG. 4A or 4D.
Figure 4F:
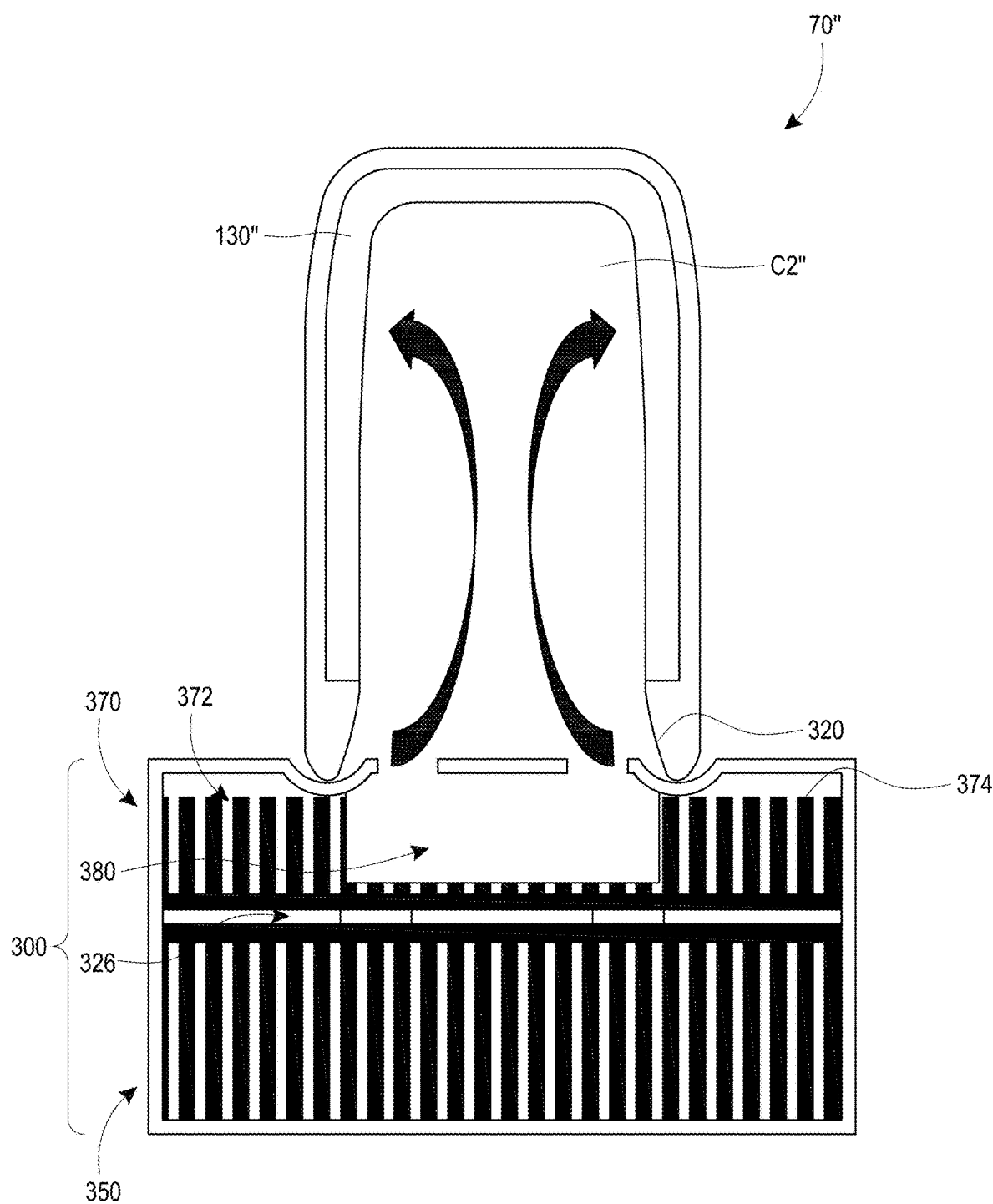
FIG. 4F is a cross-sectional side view of the cooling or heating unit of FIG. 4E.

FIGS. 4E-4F schematically illustrate a unit 300 (e.g., cooling unit) operable to cool a cover 70" (e.g., for use with a drinkware container, such as an infant feeding bottle). The unit 300 has a body 305 with a platform 315 and one or more docking portions 310. Optionally, the docking portions 310 are recessed relative to a surface 315A of the platform 315. The body can also have one or more vent openings 340 that allow flow of air into and out of the body 305 as further discussed below. The one or more docking portions 310 can receive the cover 70" thereon so that the open end 74" of the cover 70" is adjacent (e.g., in contact with) a surface of the docking portion 310. Each docking portion 310 can have one or more openings 320 (see FIG. 4F) located thereon so that the openings 320 face the chamber C2" of the 70" when the 70" is placed on the docking portion 310. In one implementation, the weight of the cover 70" maintains it in place over the docking portion 310. In another implementation, the cover 70" couples to the docking portion 310 via one or more magnets (e.g., located in the cover 70" and/or the platform 315, such as in the rim of the cover 70" or under the docking portion 310). In another implementation, the cover 70" mechanically couples to the docking portion 310 (e.g., in a twist-lock manner via a hook/slot mechanism, or threaded connection, defined in one or both of the cover 70" and docking portion 310).

The unit 300 has one or more first heat sinks (e.g., cold side heat sinks) 370 disposed in the body 305, one or more second heat sinks (e.g., hot side heat sinks) 350 disposed in the body 305, and one or more thermoelectric elements (TECs) (e.g., Peltier elements) 326 in thermal communication (e.g., direct contact) with, and interposed between, the one of more first heat sinks 370 and one or more second heat sinks 350. The unit 300 also has one or more fans 380 in fluid communication with the one or more first heat sinks 370. In the illustrated embodiment, the one or more fans 380 are disposed within (e.g., integrated in between) a first portion 372 and a second portion 374 of the first heat sink 370 (e.g., integrated into a center portion of the first heat sink 370). However, the one or more fans 380 can be located elsewhere in the body 305 relative to the one or more first heat sinks 370.

In operation, the one or more TECs 326 are operated to draw heat from the one or more first heat sinks 370 and to transfer heat to the one or more second heat sinks 350 to reduce the temperature (e.g., cool) the one or more first heat sinks 370. The one or more fans 380 are operated to flow air past one or more surfaces (e.g., fins) of the one or more first heat sinks 370, thereby cooling said air. In one implementation, the one or more first heat sinks 370 are cooled to a temperature of about 10 F-50 F and cools the air that flows over it to a temperature of about 10 F-50 F. The cooled air is directed through the one or more openings 320 into the chamber C2" of the cover 70", where it cools the inner surface 76". The cooled air also charges the PCM 130" (e.g., causing the PCM 130" to transition from one state to another, such as from liquid to solid), allowing the PCM 130" to absorb heat once a heated liquid or object (e.g., drinkware container, such as infant feeding bottle) is disposed in the chamber C2" of the cover 70". The cooled air can exit the chamber C2" via one or more openings (not shown) in the docking portion 310 and exit the body 305 via one or more of the vent openings 340.

In some implementations, the cooling unit 300 is a standalone unit that is separate from (e.g., not integrated into) a beverage preparation and/or dispensing machine (e.g., infant formula preparation and/or dispensing machine). In other implementations the cooling unit 300 are optionally incorporated into (e.g., integral with, a part of, coupled to, removably coupled to) a beverage dispending machine (e.g., an infant formula preparation and/or dispensing machine). Optionally, the electronics in the beverage dispensing machine can control the operation of one or more components of the cooling unit 300, such as providing power to and/or operating the one or more thermoelectric modules 326 (e.g., turning them on or off or adjusting power to each), providing power to and/or operating the one or more fans 380 (e.g., turning them on or off or adjusting power to each), providing power to and/or operating the dispensing unit, such as turning it on or off.

Figure 5:
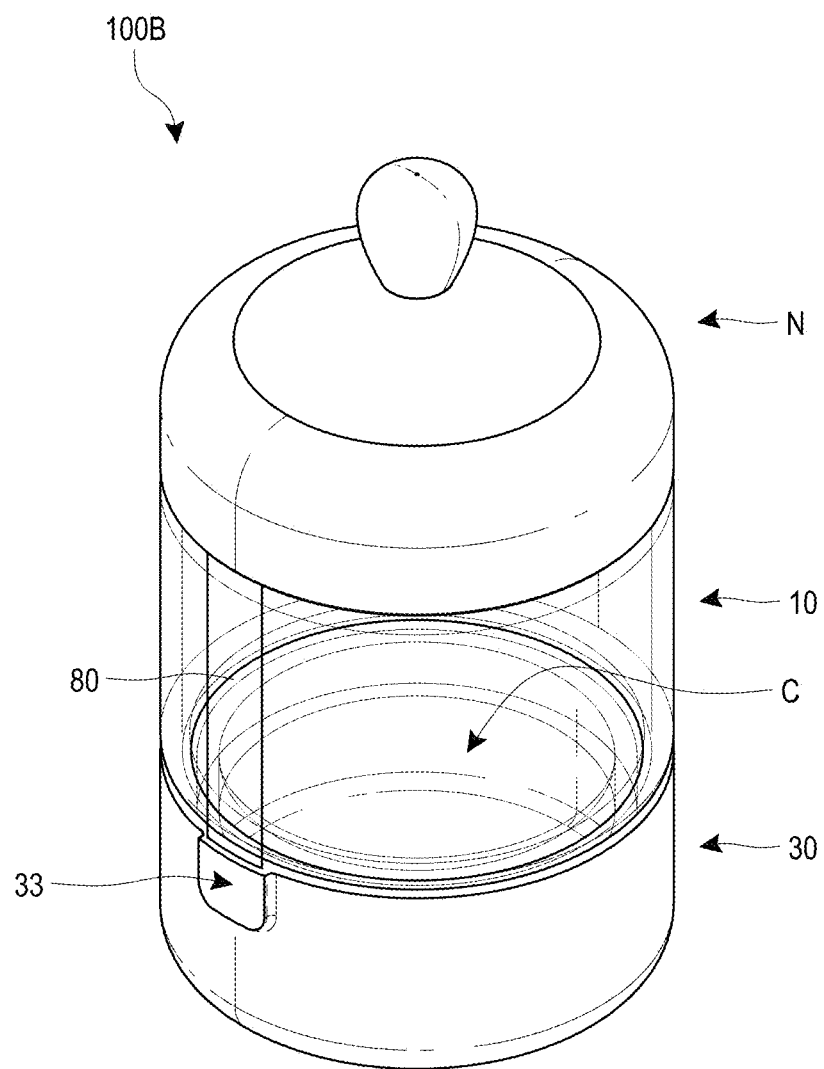
FIG. 5 is a schematic perspective view of an actively heated or cooled drinkware container.

FIG. 5 illustrates a drinkware container system 100B, which is shown as an infant feeding system (e.g., a baby bottle or infant bottle system). Some of the features of the drinkware container system 100B are similar to features in the drinkware container system 100 in FIGS. 1-3A-3B. Thus, references numerals used to designate the various components of the container system 100 are identical to those used for identifying the corresponding components of the drinkware container system 100B in FIG. 5. Therefore, the structure and description for the various components of the drinkware container system 100 in FIGS. 1-2 is understood to also apply to the corresponding components of the drinkware container system 100B in FIG. 5, except as described below.

The drinkware container system 100" optionally includes a nipple N. The vessel 10 optionally includes one or more sensors 80. Though FIG. 5 shows one sensor, multiple sensors can be provided on the vessel 10 and are contemplated in this disclosure. Optionally, the sensor 80 is a strip sensor. Optionally, the sensor 80 is a capacitance strip sensor. However, the one or more sensors 80 can be other suitable type sensors (e.g., temperature sensors, such as thermocouples, ultrasonic sensor, etc.). In an additional or alternative implementation, the one or more sensors 80 are a plurality of sensors, at least some of which are arranged vertically along at least a portion of a length of the vessel 10. In an additional or alternative implementation, the one or more sensors 80 are a plurality of sensors, at least some of which are arranged along at least a portion of the circumference of the vessel 10. The one or more sensors 80 optionally contact a wall of the vessel 10 (e.g., an outer surface of the wall of the vessel 10) and are in communication with the chamber C. The one or more sensors 80 can optionally sense one or more parameters of a liquid in the vessel 10. The one or more sensors 80 can optionally communicate with electronics in the module 30 via one or more corresponding connectors 33. Optionally, the one or more sensors 80 are covered with a sleeve, coating or film to advantageously inhibit peeling or detachment of the one or more sensors 80 from the vessel 10. In another implementation, the one or more sensors 80 are embedded in a wall of the vessel 10 (e.g., embedded between an inner surface and an outer surface of the wall of the vessel 10).

Figure 6:
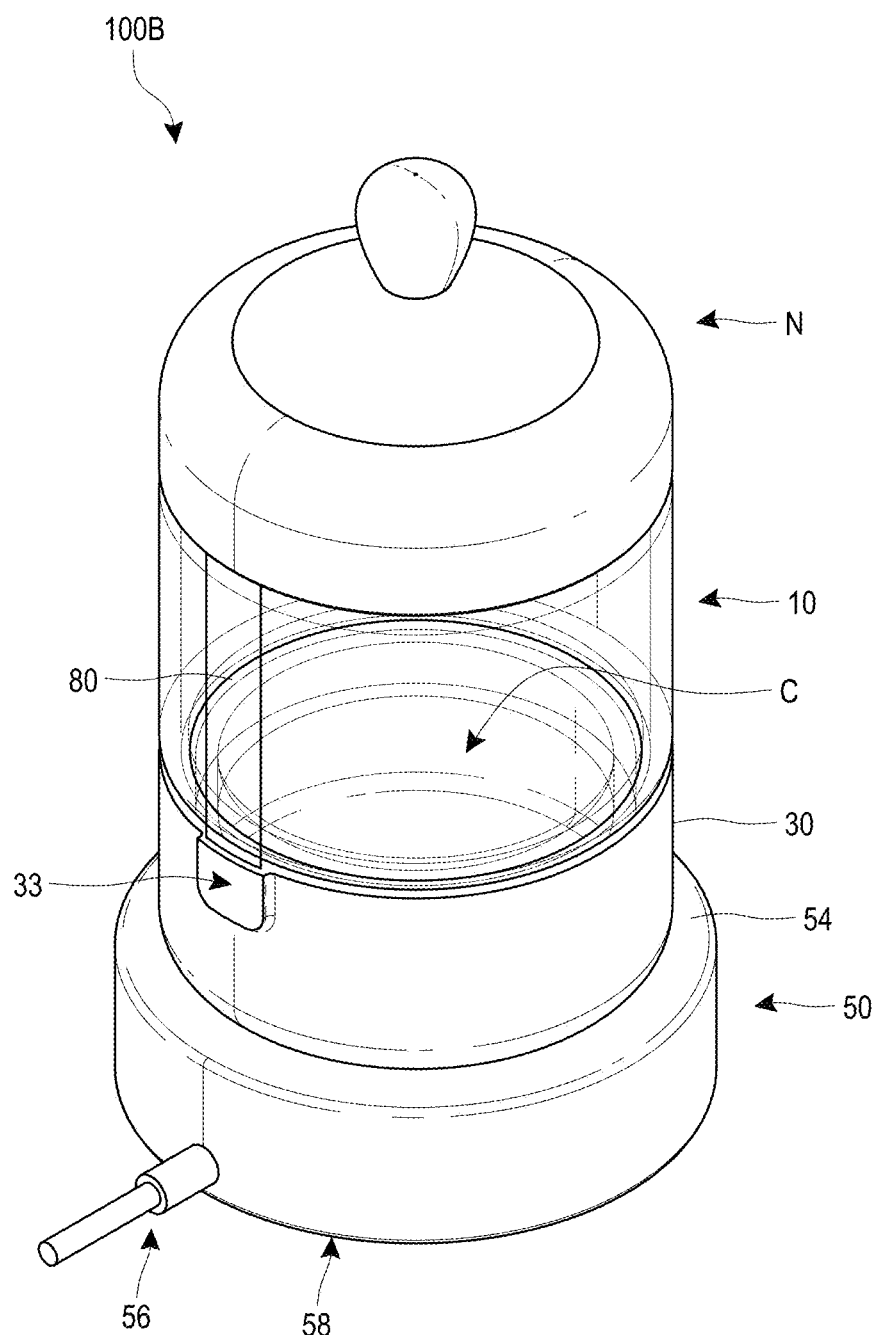
FIG. 6 is a schematic perspective view of an actively heated or cooled drinkware container disposed on a power base.

FIG. 6 shows the drinkware container system 100B disposed on the power base 50. The power base 50 can be a smart base, as further described below. The power base 50 optionally includes a barrel type electrical connector. However, other suitable connectors can be used. For example, the power base 50 can optionally have a USB connector that allows removable coupling of a power cord to the power base 50, where the opposite end of the power cord can be removably coupled to a wall connector or a male USB connector for connecting the power cord, for example, to a female USB connector (e.g., in a computer). Optionally, the power base 50 can have one or more electrical contacts (e.g., one or more electrical contact rings, such as gold-plated contacts rings) on a bottom surface 58 of the power base 50, thereby allowing the power base 50 to be powered by docking the power base 50 on another component (e.g. power source) with corresponding electrical contacts (e.g., one or more pogo pins) that engage the electrical contacts on the power base 50. In an additional or alternative implementation, the power base 50 can include a wireless power receiver, allowing the power base 50 to receive power from another component (e.g., a power source) via inductive coupling (e.g., when the power base 50 is disposed on or proximate the power source).

FIG. 7A illustrates a drinkware container system 100C. Some of the features of the drinkware container system 100C are similar to features in the drinkware container system 100 in FIGS. 1-3B and drinkware container 100B in FIGS. 5-6. Thus, references numerals used to designate the various components of the container system 100, 100B are identical to those used for identifying the corresponding components of the drinkware container system 100C in FIG. 7A. Therefore, the structure and description for the various components of the drinkware container system 100, 100B in FIGS. 1-3B and 5-6 is understood to also apply to the corresponding components of the drinkware container system 100C in FIG. 7A, except as described below.

FIG. 7A shows a bottom perspective view of the drinkware container 100C. The module 30 optionally has one or more electrical contacts 33 on the bottom surface 32B of the module 30. The one or more electrical contacts 33 can optionally be one or more (e.g., a pair of) electrical contact rings (e.g., gold-plated rings) 33A, 33B that are radially spaced from each other. Optionally, the electrical contact rings 33A, 33B are co-axial about an axis that coincides with a central axis (e.g., axis of symmetry) of the module 30 and/or the vessel 10.

The one or more electrical contacts 33 contact one or more electrical contacts 53 on the top surface 52 of a power base 50C (see FIG. 7C) when the drinkware container 100C is disposed on the top surface 52 of the power base 50C to thereby transmit power from the power base 50C to the drinkware container 100C (e.g., to the one or more heating or cooling elements 42 and/or sensors in the drinkware container), as further discussed below. The one or more electrical contacts 53 can optionally be one or more (e.g., a pair of) contact pins 53A, 53B (e.g., POGO pins).

Optionally, one or more sensors in the drinkware container 100C can transmit information (e.g., sensed temperature data, sensed liquid level data) to circuitry in the power base 50C via one or more of the electrical contacts 33A, 33B. Optionally, the power base 50C can calculate the amount and/or weight of the liquid in the drinkware container 100C based at least in part on the transmitted information (e.g., based on the sensed liquid level data).

Optionally, the module 30 has a button at the center of the bottom surface 32B and coaxial with the electrical contact rings 33A, 33B. The button can be operable to effect one or more operations for the drinkware container 100C, such as to begin a heating operation by the one or more heating elements 42 in the drinkware container 100C to heat a liquid therein. In another implementation, the button is excluded and the operation of the drinkware container 100C is effected via the power base 50C when the drinkware container 100C is disposed thereon, as further discussed below. In another implementation, operation of the drinkware container 100C is alternatively (or additionally) effected via an electronic device (e.g., mobile electronic device such as a smartphone, tablet computer, etc.) that communicates a signal wirelessly to the power base 50C and/or the drinkware container 100C, as further discussed below.

In another implementation, the electrical contacts 33, 53 are excluded and communication between the power base 50C and the drinkware container 100C is done wirelessly (e.g., using inductive coupling to transmit power from the power base 50C to the drinkware container 100C to power the one or more heating or cooling elements 42, sensors, etc. in the drinkware container). Further details on the components and operation of the power base 50C are provided below.

FIG. 7B illustrates a drinkware container system 100C'. Some of the features of the drinkware container system 100C' are similar to features in the drinkware container system 100 in FIGS. 1-3B, drinkware container 100B in FIGS. 5-6, and drinkware container 100C in FIG. 7A. Thus, references numerals used to designate the various components of the container system 100, 100B, 100C are identical to those used for identifying the corresponding components of the drinkware container system 100C' in FIG. 7B. Therefore, the structure and description for the various components of the drinkware container system 100, 100B, 100C in FIGS. 1-3B, FIGS. 5-6 and FIG. 7A, respectively, is understood to also apply to the corresponding components of the drinkware container system 100C' in FIG. 7B, except as described below.

FIG. 7B shows a bottom perspective view of the drinkware container 100C'. The module 30 optionally has one or more electrical contacts 33' on the bottom surface 32B of the module 30. The one or more electrical contacts 33' can optionally be one or more (e.g., three) electrical contact rings (e.g., gold-plated rings) 33A', 33B', 33C' that are radially spaced from each other. Optionally, the electrical contact rings 33A', 33B', 33C' are co-axial about an axis that coincides with a central axis (e.g., axis of symmetry) of the module 30 and/or the vessel 10. The one or more electrical contacts 33' contact one or more electrical contacts 53' on the top surface 52 of a power base 50C' (see FIG. 7D) when the drinkware container 100C' is disposed on the top surface 52 of the power base 50C' to thereby transmit power from the power base 50C' to the drinkware container 100C' (e.g., to the one or more heating elements 42 and/or sensors in the drinkware container), as further discussed below. The one or more electrical contacts 53' can optionally be one or more (e.g., three) contact pins 53A', 53B', 53C' (e.g., POGO pins). At least one (e.g., a pair) of the pins 53A', 53B', 53C' can transfer power from the power base 50C' to the drinkware container 100C' via at least one (e.g., a pair) of the electrical contacts 33A', 33B', 33C'. At least one of the pins 53A', 53B', 53C' can transfer information between one or more components (e.g., sensors) in the drinkware container 100C' and the power base 50C' via at least one of the electrical contacts 33A', 33B', 33C', as further described below.

In another implementation, the electrical contacts 33', 53' are excluded and communication between the power base 50C' and the drinkware container 100C' is done wirelessly (e.g., using inductive coupling to transmit power from the power base 50C' to the drinkware container 100C to power the one or more heating elements 42, sensors, etc. in the drinkware container). Further details of the components and operation of the power base 50C' are provided below.

FIGS. 8A-8B shows a drinkware container system 100D, which is shown as an infant feeding system (e.g., a baby bottle system). Some of the features of the drinkware container system 100D are similar to features in the drinkware container system 100A in FIGS. 4A-4C. Thus, references numerals used to designate the various components of the container system 100A are identical to those used for identifying the corresponding components of the drinkware container system 100D in FIGS. 8A-8B. Therefore, the structure and description for the various components of the drinkware container system 100A in FIGS. 4A-4C is understood to also apply to the corresponding components of the drinkware container system 100D in FIGS. 8A-8B, except as described below.

The drinkware container system 100D has a cover structure 70' similar to the cover 70. The cover structure 70' includes a top or proximal cover portion 70A and a bottom or distal cover portion 70B. The bottom cover portion 70B has a cavity defined by a circumferential wall 75B sized to receive at least a portion of the drinkware container (e.g., receive the vessel 10 and module 30) therein. Optionally, the circumferential wall 75B defines a cavity sized so that an inner surface of the wall 75B contact at least a portion of an outer surface of the drinkware container (e.g., contacts at least a portion of an outer surface of the vessel 10 and/or module 30). Optionally, a proximal end of the vessel 10 (e.g., the reduced diameter portion 12B) protrudes from a proximal end of the bottom cover portion 70B. The wall 75B has a width W', which can optionally be similar to the width W of the wall 75 in FIG. 4C. Optionally, the drinkware container is removably disposed in the bottom cover portion 70B. Alternatively, the drinkware container is fixedly disposed (e.g., not readily removed) within the bottom cover portion 70B. The top cover portion 70A is optionally removably attached to the lid 20.

The bottom cover portion 70B optionally includes a power base 50D incorporated (e.g., embedded) therein, so that the power base 50D is not separable from the bottom cover portion 70B. The power base 50D can optionally be a smart base, as further described below. The power base 50D operates in a similar manner as the power base 50 to provide power to the one or more heating or cooling elements 42 of the drinkware container. In another implementation, at least a portion of the power base 50D can be removably disposed in a distal end of the bottom cover portion 70B, such that the power base 50D can be detached or removed from the bottom cover portion 70B. Additional details on the operation of the power base 50D are provided further below.

In use, the top cover portion 70A can be disposed over the lid 20 so that a distal end of the top cover portion 70A is proximal to (e.g., adjacent to, in contact with) a proximal end of the lower cover portion 70B, to thereby define a travel pack TP for the drinkware container system 100D, allowing the user to maintain the liquid in the drinkware container thermally insulated for a prolonged period of time (e.g., while traveling, while commuting). The top cover portion 70A can be removed from over the lid 20 when the liquid in the drinkware container is ready to be consumed.

Figure 9:
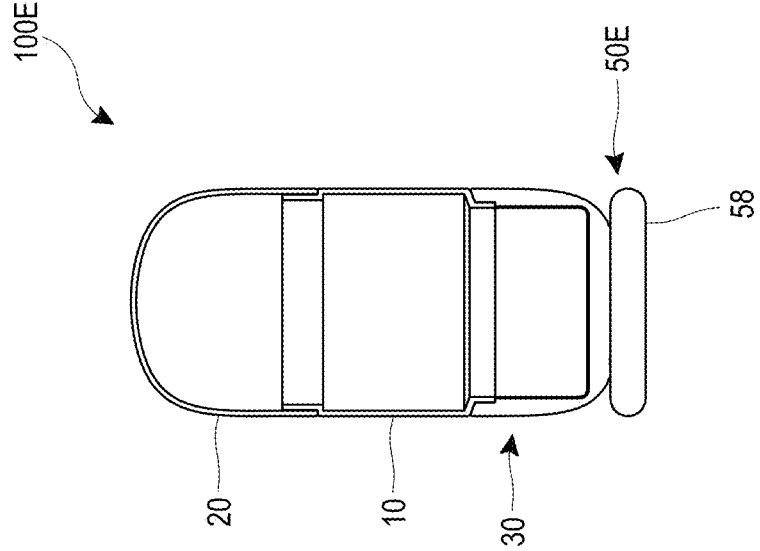
FIG. 9 is a schematic side view of an actively heated or cooled drinkware container disposed on a power base.

FIG. 9 shows a drinkware container system 100E, which is shown as an infant feeding system (e.g., a baby bottle system). Some of the features of the drinkware container system 100E are similar to features in the drinkware container system 100 in FIGS. 1-3B. Thus, references numerals used to designate the various components of the container system 100E are identical to those used for identifying the corresponding components of the drinkware container system 100 in FIGS. 1-3B. Therefore, the structure and description for the various components of the drinkware container system 100 in FIGS. 1-3B is understood to also apply to the corresponding components of the drinkware container system 100E in FIG. 9, except as described below.

FIG. 9 shows the drinkware container 100E removably disposed on a power base 50E. The power base 50E can optionally be a smart base, as further described below. The power base 50E advantageously has a low profile. The power base 50E excludes power storage elements (e.g., batteries), and instead provides a hardwired connection to a power source. For example, the power base 50E can have a barrel connector, similar to the barrel type connector shown in FIG. 6. However, other suitable connectors can be used. For example, the power base 50E can optionally have a USB connector that allows removable coupling of a power cord to the power base 50E, where the opposite end of the power cord can be removably coupled to a wall connector or a male USB connector for connecting the power cord, for example, to a female USB connector (e.g., in a computer). Optionally, the power base 50E can have one or more electrical contacts (e.g., one or more electrical contact rings, such as gold-plated contacts rings) on a bottom surface 58 of the power base 50E, thereby allowing the power base 50 to be powered by docking the power base 50E on another component (e.g. power source) with corresponding electrical contacts (e.g., one or more pogo pins) that engage the electrical contacts on the power base 50E. In another implementation, the power base 50E optionally has a wireless power receiver that can receive power wirelessly from a power source via inductive coupling.

FIGS. 10A-10B shows a drinkware container system 100F, which is shown as an infant feeding system (e.g., a baby bottle system). Some of the features of the drinkware container system 100F are similar to features in the drinkware container system 100 in FIGS. 1-3B. Thus, references numerals used to designate the various components of the container system 100F are identical to those used for identifying the corresponding components of the drinkware container system 100 in FIGS. 1-3B. Therefore, the structure and description for the various components of the drinkware container system 100 in FIGS. 1-3B is understood to also apply to the corresponding components of the drinkware container system 100F in FIGS. 10A-10B, except as described below.

FIGS. 10A-10B show a charger 200 (e.g., power source) that can at least partially receive the power base 50F thereon and is operable to transfer power to the power base 50F, for example to charge one or more power storage elements (e.g., rechargeable batteries) in the power base 50F, as further described below. The power base 50F is optionally a smart base, as further described below. Optionally, the charger 200 can have a recess that receives at least a portion (e.g., a bottom portion) of the power base 50F therein. In one implementation, the charger 200 can have one or more electrical contacts (e.g., electrical contact pins, POGO pins) on a top surface thereof that engage one or more electrical contacts (e.g., one or more electrical contact rings) on a bottom surface 58F of the power base 50F. The charger 200 optionally connects to a power source (e.g., a wall outlet) via a cable (e.g., barrel type electrical connector). In another implementation, the charger 200 optionally has a wireless power transmitter that transmits power to a wireless power receiver in the power base 50F via inductive coupling, for example when the power base 50F is disposed on or proximate the charger 200, to thereby charge the one or more power storage elements (e.g., batteries) in the power base 50F.

Figure 11A:
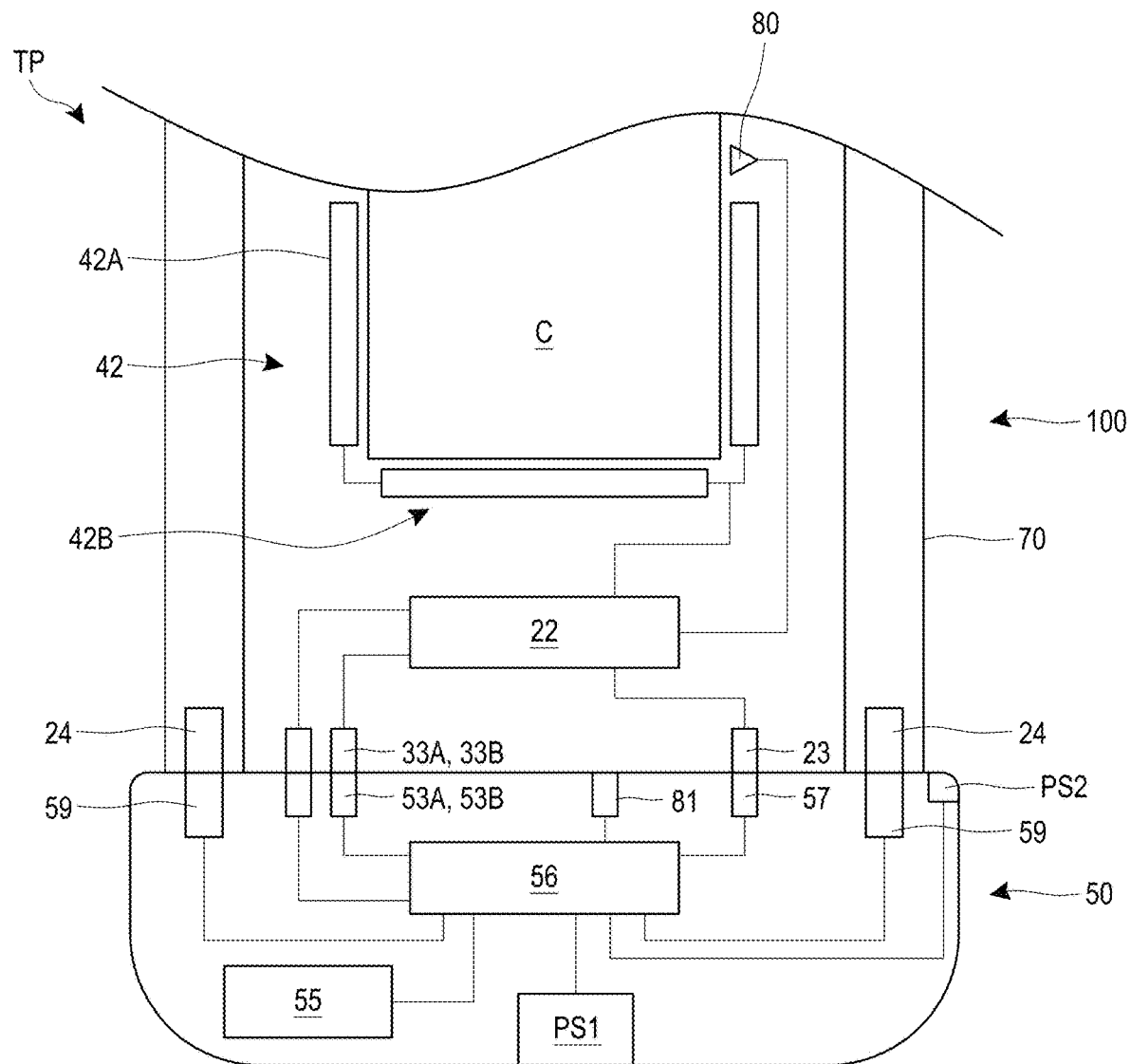
FIG. 11A is a schematic diagram of electronics in actively heated or cooled drinkware container and in power base.
Figure 11B:
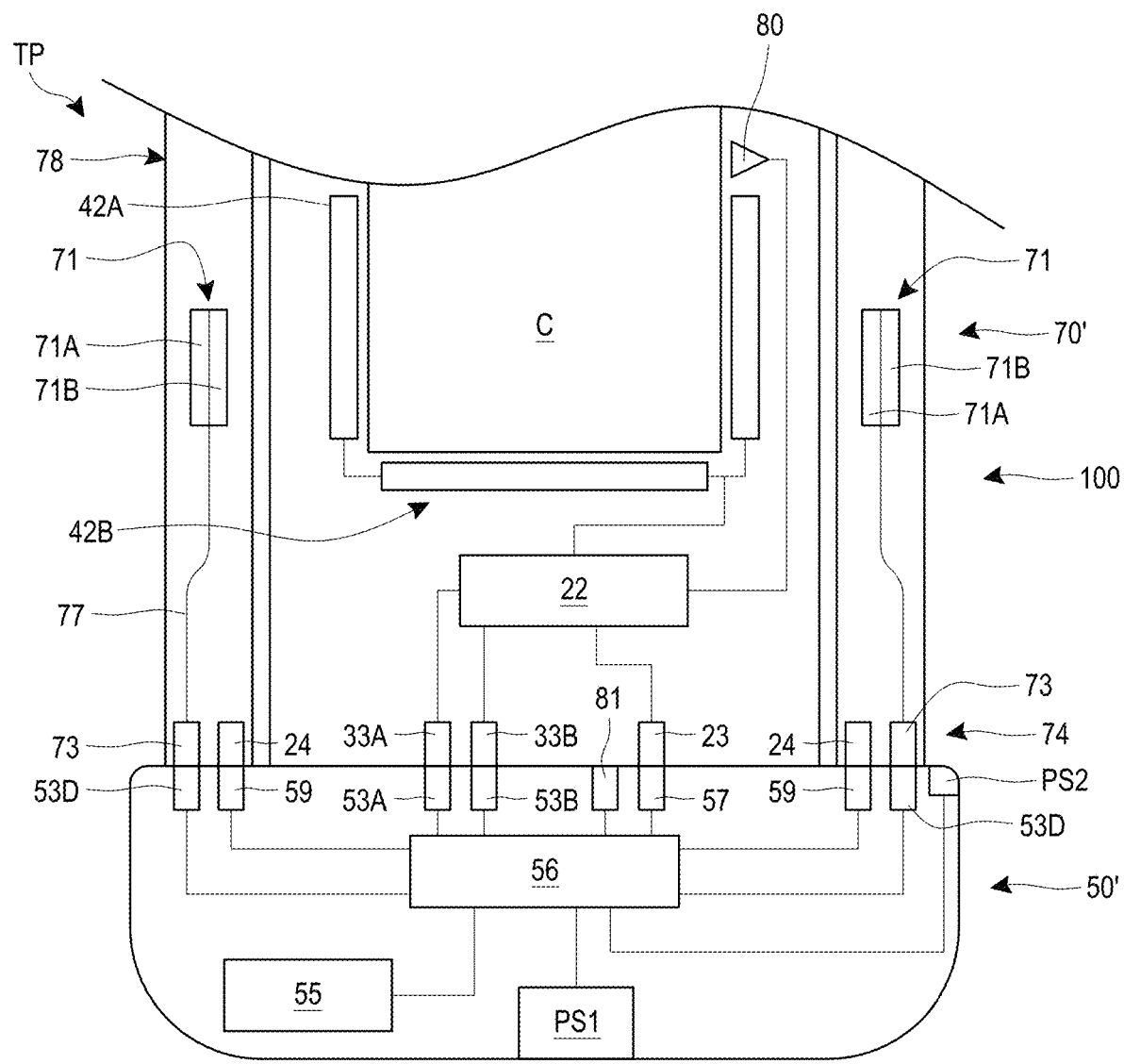
FIG. 11B is a schematic diagram of electronics in an actively heated or cooled drinkware container and in power base.
Figure 11C:
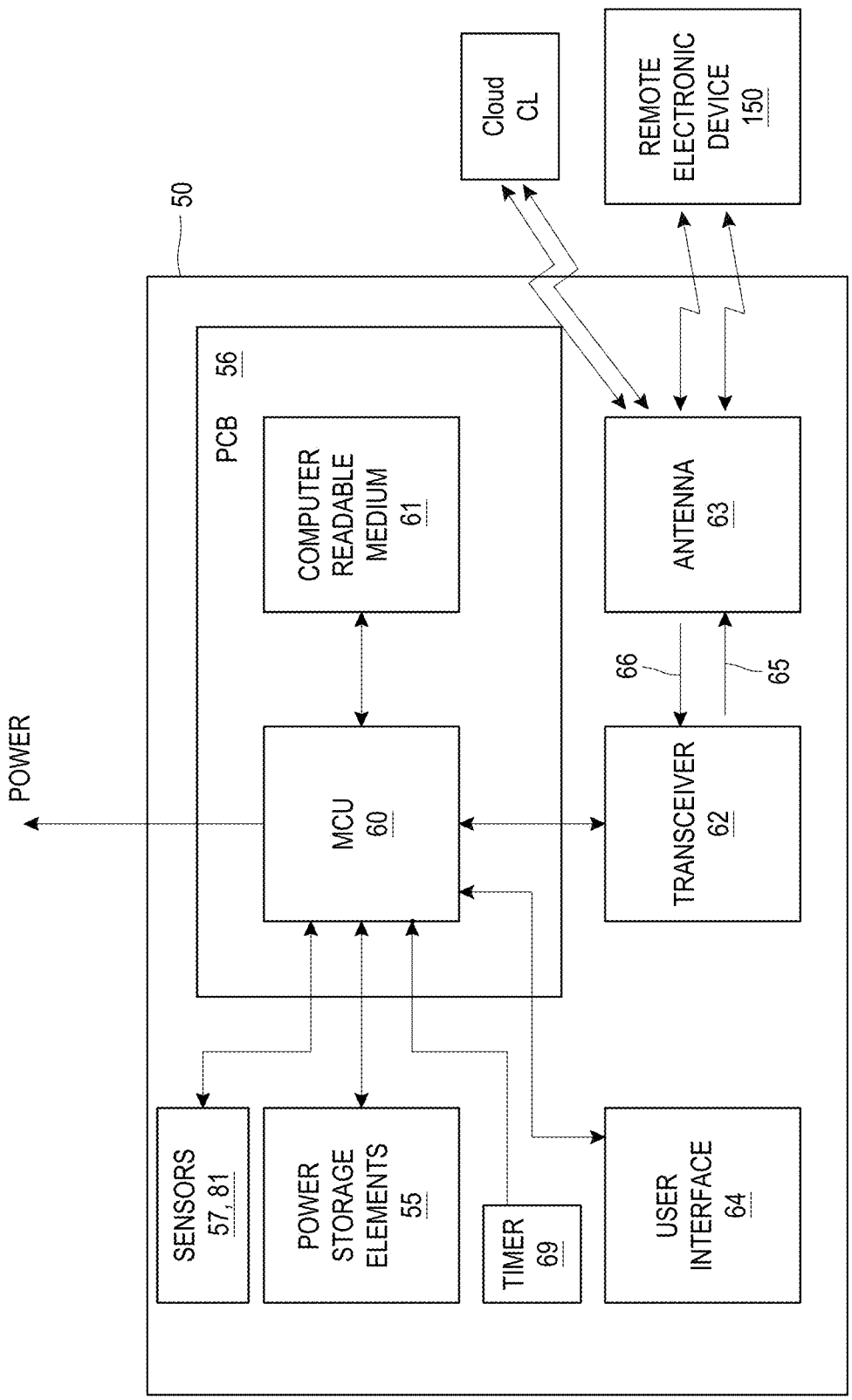
FIG. 11C is a schematic block diagram of one example of the electronics in the power base or smart base.

FIGS. 11A-11C are schematic illustrations of electronics in the drinkware container and the power base, which can optionally be implemented in any of the drinkware containers 100, 100A, 100B, 100C, 100C', 100D, 100E, 100F and power/smart base systems 50, 50', 50", 50"', 50C, 50C', 50D, 50E, 50F disclosed herein.

As previously discussed, the drinkware container 100 (e.g., module 30 of the drinkware container 100) has one or more heating or cooling elements 42, which optionally includes a heating or cooling element 42A disposed about at least a portion of the circumference of the chamber C in the container 100. The one or more heating or cooling elements 42 optionally includes a heating or cooling element 42B disposed adjacent a base of the chamber C. The drinkware container 100 optionally has one or more sensors 80 operable to sense one or more parameters (e.g., temperature, level, volume) of liquid in the chamber C.

As shown in FIG. 11A, the drinkware container 100 (e.g., the module 30 of the drinkware container 100) optionally has circuitry 22 that communicates with the one or more heating or elements 42 and the one or more sensors 80. Where the drinkware container 100 (e.g., the module 30) optionally includes one or more electrical contacts 33A, 33B, the circuitry 22 can optionally also communicate with the one or more electrical contacts 33A, 33B. As used herein, "communicate" is not limited to direct communication (e.g., via hardwired connections between the separate components), but also includes indirect communication via intervening electronic components. Further details of the circuitry 22 in the drinkware container are described below in connection with FIG. 11C.

With continued reference to FIG. 11A, the power base 50 optionally includes one or more power storage elements 55 and circuitry 56. The circuitry 56 can communicate with the one or more power storage elements 55. Where the power base 50 includes one or more electrical contacts 53A, 53B (or 53A, 53B, 53C in FIG. 7D), the circuitry 56 can optionally communicate with the one or more electrical contacts 53A, 53B (e.g., to thereby provide power to one or more of the circuitry 22, one or more heating or cooling elements 42 and one or more sensors 80, via the electrical contacts 33A, 33B in the drinkware container 100). In another implementation, the electrical contacts 33A, 33B in the bottle and the electrical contacts 53A, 53B in the power base 50 are excluded. In such an implementation, the circuitry 56 in the power base 50 optionally transmits power to the circuitry 22 in the drinkware container 100 (and thereby transmits power to the one or more heating or cooling elements 42 and/or one or more sensors 80) via inductive coupling (e.g., components in the circuitry 56 in the power base 50 and circuitry 22 in the drinkware container 100 provide an inductive power transmission circuit).

The power base 50 can optionally include a power button PS1 on or proximate the bottom surface 58 of the power base 50. Additionally or alternatively, the power base 50 can optionally include a power button PS2 on or proximate a top surface 52 of the power base 50. The power base 50 can optionally be turned on or off via one or both of the power button PS1, PS2.

With continued reference to FIG. 11A, in one implementation the sleeve 70 is a cylindrical sleeve and one piece (e.g. integrated with, monolithic with, etc.) the power base 50. In such an implementation, magnets 24 and electromagnets 59 are excluded.

Proximity Sensor

The power base 50 optionally includes one or more proximity sensors 57 (e.g., an inductive proximity sensor, a capacitive proximity sensor, a magnetic proximity sensor) that communicate with the circuitry 56. In one implementation, the one or more proximity sensors 57 can be one or more Hall effect sensors. The drinkware container 100 (e.g., the module 30 of the drinkware container 100) can optionally have one or more objects 23 (e.g., metal object, magnet, etc.) that can be detected by the one or more proximity sensors 57 when the drinkware container 100 is adjacent (e.g., disposed upon) the power base 50. Where the proximity sensor 57 is a Hall effect sensor, the one or more objects 23 are optionally one or more magnets.

In operation, the one or more proximity sensors 57 can communicate a signal to the circuitry 56 upon sensing the one or more objects 23 (e.g., when the power base 50 is disposed on the power base 50), and in response to such a signal the circuitry 56 (e.g., a switch of the circuitry 56) can allow communication of power from the one or more power storage elements 55 to the one or more electrical contacts 53A, 53B, which can then be transferred to the one or more electrical contacts 33A, 33B in the drinkware container 100, as further discussed below. When the drinkware container 100 is not proximal to (e.g., not adjacent to, not disposed upon) the power base 50, the one or more proximity sensors 57 will not communicate a proximity signal to the circuitry 56, and the circuitry 56 in response can disallow communication of power from the one or more power storage elements 55 to the one or more electrical contacts 53A, 53B (e.g., the circuitry 56 can prevent communication of power from the power storage elements 55 to the electrical contacts 53A, 53B unless it received the proximity signal from the sensor 57, such as unless the drinkware container 100 is placed on the power base 50). Advantageously, such an arrangement would inhibit (e.g., prevent) a user from receiving a shock from touching the electrical contacts 53A, 53B of the power base 50.

Electromagnetic Coupling

The power base 50 optionally includes one or more electromagnets 59 that communicate with the circuitry 56. One or both of the drinkware container 100 (e.g., module 30 of the drinkware container 100) and the cover 70 optionally includes one or more magnets 24 (e.g., permanent magnets). In one implementation, only the cover 70 includes the one or more magnets 24 and the drinkware container 100 is retained between the cover 70 and the power base 50 by an attraction force between the electromagnets 59 and the magnets 24 in the cover 70.

The circuitry 56 can operate the one or more electromagnets 59 in the power base 50 to have an opposite polarity as the magnets 24, thereby allowing the coupling of the power base 50 to one or both of the drinkware container 100 (e.g., module 30 of the drinkware container 100) and the cover 70, for example, to retain them in a coupled state. The circuitry 56 can also operate the one or more electromagnets 59 in the power base 50 to have the same polarity as the magnets 24, thereby allowing the decoupling of the power base 50 from one or both of the drinkware container 100 (e.g., module 30 of the drinkware container 100) and the cover 70. For example, the circuitry 56 can operate the one or more electromagnets 59 to have the power base 50 decouple from one or both of the drinkware container 100 (e.g., module 30 of the drinkware container 100) and the cover 70 in response to a user instruction (e.g., via a user interface on the power base 50, or via a remote instruction provided to the power base 50 by the user via a remote electronic device or a mobile electronic device).

In use, the circuitry 56 can optionally actuate (e.g., upon receipt of user instructions via a user interface on the power base 50 or wirelessly via a remote electronic device such as a mobile electronic device) the one or more electromagnets 59 to couple the power base 50 to one or both of the drinkware container 100 (e.g., module 30 of the drinkware container 100) and the cover 70. In another implementation, the circuitry 56 can automatically actuate the one or more electromagnets 59 to couple the power base 50 to one or both of the drinkware container 100 (e.g., module 30 of the drinkware container 100) and the cover 70 upon placement of the drinkware container 100 and/or cover 70 proximal to (e.g., adjacent to, in contact with) the power base 50.

Such coupling could allow the power base 50 and drinkware container 100 and/or cover 70 to form a single travel unit, making it easy to carry while traveling. Additionally, such coupling could facilitate the efficient heating of liquid in the drinkware container 100 by maintaining the drinkware container 100 and/or cover 70 attached to the power base 50 during the heating process. Once the heating process was completed, circuitry 56 in the power base 50 can actuate the one or more electromagnets 59 to decouple the drinkware container 100 and/or cover 70 from the power base 50, thereby allowing the consumption of the liquid in the drinkware container 100 without having the electronics in the power base 50 attached to the drinkware container 100 during said consumption. In one implementation, the circuitry 56 can actuate the one or more electromagnets 59 to decouple the drinkware container 100 and/or cover 70 from the power base 50 upon receipt of a command from the user (e.g., via a user interface of the power base 50, such as optionally via a gesture; wirelessly via an electronic device, such as a mobile electronic device, that optionally communicates with the circuitry 56, etc.), such as a command that the contents of the drinkware container 100 are ready for consumption (e.g., a "feeding" command). In another implementation, the circuitry 56 can actuate the one or more electromagnets 59 to decouple the drinkware container 100 and/or cover 70 from the power base 50 upon receipt of a signal from the one or more sensors 80 (as further described below) that the contents (e.g. liquid) in the chamber C are at a predetermined temperature for consumption (or within a predetermined temperature range for consumption). Said predetermined temperature or temperature range can optionally be a user selected temperature or temperature range, or can be a temperature value or temperature range stored in a memory of the drinkware container 100 (e.g., module 30 of the drinkware container 100) or memory of the power base 50.

Optionally, the circuitry 56 allows or facilitates the transfer of power and/or to the drinkware container 100, for example from the one or more batteries 55 to the one or more heating or cooling elements 42 (e.g., via the one or more electrical contacts 33A, 33B, 53A, 53B), when at least one of the one or more sensors 80 (e.g., a liquid level sensor, a capacitance sensor, etc.) in the drinkware container 100 or weight sensors 81 in the electronic (e.g., power, smart) base 50 indicates that there is liquid in the chamber C (e.g., above a predetermined liquid level or above a predetermined amount or weight).

Optionally, the circuitry 56 can inhibit (e.g. prevent) transfer of power and/or automatically terminates transfer of power to the drinkware container 100, for example from the one or more batteries 55 to the one or more heating or cooling elements 42 (e.g., via the one or more electrical contacts 33A, 33B, 53A, 53B), when at least one of the one or more sensors 80 (e.g., a liquid level sensor, a capacitance sensor, etc.) in the drinkware container 100 or weight sensors 81 in the electronic (e.g., power, smart) base 50 indicates that the chamber C is empty or near empty (e.g., below a predetermined liquid level).

FIG. 11B is a schematic diagram of an optional implementation of the drinkware container assembly or travel pack TP. The travel pack TP assembly can include a drinkware container, such as the drinkware container 100, disposed on a power base 50', with a cover 70' disposed over the drinkware container 100 and attached to the power base 50'. The power base 50' can optionally be similar to the power base 50 in FIG. 11A (e.g., include the same components as the power base 50 in FIG. 11A), except as described below. The cover 70' can optionally be similar to the cover 70 in FIG. 11A (e.g., include the same components or features as the cover 70 in FIG. 11A), except as described below. Therefore, the same numerical identifiers are used in FIG. 11A to identify similar components shown in FIG. 11A, and the description corresponding to such components in FIG. 11A are understood to also apply to the similarly numbered components in FIG. 11B.

As shown in FIG. 11B, the cover 70' can optionally couple to the power base 50' via one or more magnets 24 in the cover 70 and one or more electromagnets 59 in the power base 50' that communicate with the circuitry 56 in the power base 50'. The cover 70' can include one or more (e.g., a plurality of) thermoelectric elements (e.g., Peltier elements) 71, for example embedded between the inner surface 76 and the outer surface 78 of the cover 70'. Each of the one or more thermoelectric elements 71 can have a hot side 71A and a cold side 71B, where the hot side 71A faces away from the inner surface 76 and the cold side 71B faces toward the inner surface 76. Optionally, an inner surface of the cold side 71B of the one or more thermoelectric elements 71 is substantially coplanar with the inner surface 76. The one or more thermoelectric elements 71 can connect with one or more electrical contacts 73 optionally at the distal end 74 of the cover 70' via one or more optional wires 77.

The power base 50' can optionally have one or more electrical contacts 53D that communicate with the circuitry 56. Optionally, when the cover 70' is disposed adjacent the power base 50', the one or more electrical contacts 53D of the power base 50' can contact the one or more electrical contacts 73 of the cover 70'. Optionally, the control circuitry 56 can provide power (e.g., from the one or more power storage elements or batteries 55) to the one or more thermoelectric elements 71 via the one or more electrical contacts 53D, 73 to operate the one or more thermoelectric elements 71. In operation, the one or more thermoelectric elements 71 draw heat from the drinkware container 100 via the cold side 71B and transfer it to the hot side 71A, thereby actively cooling the drinkware container 100 and the contents (e.g., water, milk, breast milk, baby formula, etc.) in the container 100 (e.g., in the chamber C of the container 100). Optionally, the cover 70' can have one or more heat sinks (e.g., fins) to dissipate heat from the hot side 71A to the environment. Advantageously, operation of the one or more thermoelectric elements 71 as described above can allow the contents of the drinkware container 100 to be selectively chilled until ready for use (e.g., chilled while in transit, during travel, etc.). Operation (e.g., turning on) of the one or more thermoelectric elements 71 can optionally be effected automatically by the circuitry 56 upon coupling of the cover 70' to the power base 50'. Alternatively, operation of the one or more thermoelectric elements 71 can effected upon receipt of instructions by the circuitry 56 from a user (e.g., via a user interface on the power base 50' or wirelessly via an electronic device, such as a mobile electronic device, that sends instructions to the power base 50', as further described below).

With continued reference to FIG. 11B, in one implementation the sleeve 70' is a cylindrical sleeve and one piece (e.g. integrated with, monolithic with, etc.) the power base 50'. In such an implementation, magnets 24 and electromagnets 59 are excluded. Further, in such an implementation, the electrical contacts 73, 53D are excluded and one or more electrical lines 77 extend between the one or more thermoelectric elements 71 and the circuitry 56.

With reference to FIGS. 11A, 11B, the power base 50, 50' can optionally be used without the sleeve 70, 70' (as shown in FIGS. 3A-3B). In one implementation, the power base 50, 50' can optionally include one or more weight sensors 81 that communicate with the circuitry 56. The one or more weight sensors 81 can measure a weight (e.g., ounces, pounds, grams, kilograms, etc.) of the drinkware container 100 when the drinkware container 100 is placed on the power base 50, 50'. In one implementation, the one or more weight sensors 81 can include a strain gauge. In another implementation, the one or more weight sensors 81 can include a capacitive force sensor. In another implementation, the one or more weight sensors 81 can include a piezoresistive force sensor. In one implementation, the one or more weight sensors 81 can be at or proximate a top surface 52 of the power base 50, 50'. In another implementation, the one or more weight sensors 81 can be at or proximate a bottom surface 58 of the power base 50, 50'. However, the one or more weight sensors 81 can be located in other suitable locations on the power base 50, 50' where they can be exposed to a force coinciding with the placement of the drinkware container 100 on the power base 50, 50'. In one implementation, the one or more weight sensors 81 can be substantially aligned with a center axis (e.g., axis of symmetry) of the power base 50, 50'. In another implementation, the one or more weight sensors 81 can be substantially unaligned with the center axis (e.g., off center relative to an axis of symmetry) of the power base 50, 50'.

FIG. 11C is a schematic block diagram of one example of the power base 50 implementing one or more features of the present disclosure. For clarity, the one or more electrical contacts 53A, 53B, and one or more electromagnets 59 are excluded from the figure. However, one of skill in the art will recognize that such features can be included in the power base 50 shown in FIG. 11C in a similar manner as shown in FIG. 11A.

The power base 50 optionally includes one or more antennae 63 that communicate with a transceiver 62 and optionally implement a wireless telecommunication standard (e.g., WiFi 802.11, 3G, BLUETOOTH®). The power base 50 can have a printed circuit board (PCB) 56 that optionally has a processor or microcontroller unit (MCU) 60 and optionally has a computer readable medium (e.g., memory) 61 mounted thereon. Optionally, the optional transceiver 62 and optional antennae 63 can also be mounted on the PCB 56. The power base 50 optionally includes a user interface 64 that communicates with the processor 60. The user interface 64 can optionally include one or more of: a digital screen, a dot matrix display, a visual indicator, an indicator light, a capacitive touch sensor, a gesture sensor, etc. The power base 50 can also include one or more timers 69 that communicate time information to the MCU 60.

The transceiver 62 can generate wireless (e.g., RF) signals for transmission via the antenna 63. Furthermore, the transceiver 62 can receive incoming wireless (e.g., RF) signals from the antenna 63. It will be understood that various functionalities associated with transmitting and receiving of wireless (e.g., RF) signals can be achieved by one or more components that are collectively represented in FIG. 11B as the transceiver 62. For example, a single component can be configured to provide both transmitting and receiving functionalities. In another example, transmitting and receiving functionalities can be provided by separate components.

In FIG. 11C, one or more output signals from the transceiver 62 are depicted as being provided to the antenna 63 via one or more transmission paths 65. The transmit paths 65 can optionally include one or more power amplifiers to aid in boosting, for example, an RF signal having a relatively low power to a higher power suitable for transmission. Although FIG. 11C illustrates a configuration using one transmission path 65, the power base 50 can optionally have more than one transmission path 65.

In FIG. 11C, one or more detected signals from the antenna 63 are depicted as being provided to the transceiver 62 via one or more receiving paths 66. Although FIG. 11C illustrates one receiving path 66, the power base 50 can optionally have more than one receiving path 66. In one implementation, the transceiver 62 and one or more antennae 63 are excluded.

The processor 60 can optionally facilitate the implementation of various processes disclosed herein on the power base 50. The processor 60 can be a general purpose computer, special purpose computer, or other programmable data processing apparatus. In certain implementations, the power base 50 optionally includes a computer-readable memory 61, which can include computer program instructions (e.g., power delivery algorithms, temperature setpoints at which to operate the one or more heating or cooling elements 42) that may be provided to and executed by the processor 60. The one or more power storage elements 55 (e.g., batteries) can optionally be any suitable battery for use in the power base 50, including, for example, a lithium-ion battery.

Communication with Cloud

With continued reference to FIG. 11C, as discussed above the power base 50 can optionally communicate (e.g., one-way communication, two-way communication) with one or more remote electronic devices 150 (e.g., mobile phone, tablet computer, desktop computer) via a wired or wireless connection (e.g., 802.11b, 802.11a, 802.11g, 802.11n standards, 3G, 4G, LTE, BLUETOOTH®, etc.). Additionally or alternatively, the power base 50 can optionally communicate with a cloud-based data storage system or server CL, via one or both of a wired or wireless connection (e.g., 802.11b, 802.11a, 802.11g, 802.11n standards, 3G, 4G, LTE, etc.). Optionally, the power base 50 can communicate with the remote electronic device 150 via an app (mobile application software) that is optionally downloaded (e.g., from the cloud) onto the remote electronic device 150. The app can provide one or more graphical user interface screens via which the remote electronic device 150 can display one or more data received from the power base 50 and/or information transmitted from the remote electronic device 150 to the power base 50. Optionally, a user can provide instructions to the power base 50 via the one or more of the graphical user interface screens on the remote electronic device 150 (e.g., temperature setpoint at which to heat the contents of the drinkware container 100, turning on or off power to the one or more heating or cooling elements 42, 42A, 42B, thermo-electric modules 71, electromagnets 59, etc.). Such communication with one or both of a remote electronic device 150 (e.g., mobile electronic device, such as a smartphone or tablet computer) and a cloud-based data storage system or server CL makes the power base or electronic base 50 a smart base.

In another variation, the graphical user interface (GUI) screen of the remote electronic device 150 can optionally provide a dashboard display of one or more parameters associated with the use of the drinkware container 100. For example, the GUI can provide an indication of power supply left in the one or more batteries 55, such as % of life left or time remaining before battery power drains completely, temperature in chamber C, etc., for example while the drinkware container 100 is in transit (e.g., during a commute) and before the one or more heating or cooling elements 42 are actuated to heat the contents in the chamber C of the drinkware container 100.

Optionally, the power base 50 can communicate information (e.g., one or more of a temperature of the contents in the chamber C, a start time of a feeding event, an end time of a feeding event, a duration of a feeding event, the number of feeding events per day, an amount, for example volume, consumed during a feeding event) to the cloud CL on a periodic basis (e.g., every hour, one a day, on a continuous basis in real time, etc.). For example, the start time of a feeding event (START_TIME) can substantially coincide with the time the drinkware container 100 is removed from the power base 50 after the alert has been sent to the user (e.g., wirelessly sent to the remote electronic device 150) that the desired temperature of the contents in the chamber C of the drinkware container 100 has been reached. The end time of a feeding event (END_TIME) can substantially coincide with the time the drinkware container 100 is placed back on the power base 50 after a START_TIME has been logged by the power base 150 (e.g., by the MCU 60). The duration of the feeding event (DURATION_TIME) can be calculated (e.g., by the MCU 60) based on the difference between the END_TIME and START_TIME logged by the power base 150 (e.g., by the MCU 60). The number of feedings (FEEDING_COUNT) can be calculated (e.g., by the MCU 60) based on the number of START_TIMES logged and/or number of END_TIMES logged (e.g., by the MCU 150) in a twenty-four hour period. The amount (e.g., volume) consumed in a feeding event (FEEDING_AMOUNT) can be calculated (e.g., by the MCU 60) based on the difference in the measured weight (from the weight sensor 81) of the drinkware container 100 at the logged START_TIME and the measured weight (from the weight sensor 81) at the logged END_TIME for a feeding event.

Once stored on the cloud CL, such information can be accessed via one or more remote electronic devices 150 (e.g., via a dashboard on a smart phone, tablet computer, laptop computer, desktop computer, etc.), advantageously allowing, for example, a user (e.g., parent, caregiver) to track the number of feeding events and/or timing of feeding events and/or amounts consumed (e.g., of milk, breast milk, infant formula, water, etc.) by an infant. Optionally, such information (e.g., one or more of start time, end time, duration and amount, such as volume, of feedings) can be communicated (e.g., via a push notification) from the cloud CL to the remote electronic device 150. Such a dashboard can allow a user (e.g., parent, guardian) to view and compare (e.g., in bar chart form, pie chart form, etc.) infant feeding events (e.g., duration, start time and stop time, amount (volume) consumed) during a period selected by the user (e.g., day to day, over a week, week-to-week, over a month, etc.). Additionally or alternatively, the power base or smart base 50 can store in a memory 61 such information, which can be accessed from the power base 50 by the user via a wired or wireless connection (e.g., via the remote electronic device 150).

Optionally, the power base or smart base 50 can provide one or more alerts (e.g., visual alerts, aural alerts) to a user via one or both of the user interface 64 on the power base or smart base 50 and the remote electronic device 150 (e.g., via a GUI screen of an app associated with the power base 50 and/or drinkware container 100). Such alerts and indicate to the user one or more of the following: a) instructions to place the empty drinkware container 100 on the power or smart base 50 to record (with the weight sensor 81) an initial weight (EMPTY) of the drinkware container 100 without liquid, b) instructions to place drinkware container 100 (once filled with liquid) on the power base 50 to record (with the weight sensor 81) initial weigh-in and/or to start a heating process of the contents in the chamber C, c) instructions to remove the drinkware container 100 from the power base 50 once the temperature setpoint for the contents in the chamber C is reached, recording a feeding start time once the drinkware container 100 is removed, d) instructions to place the drinkware container 100 on the power base 50 to record (with the weight sensor 81) an end weigh-in after drinkware container 100 was removed at step c), e) recording a feeding end time once the drinkware container 100 is replaced on the power base 50, and f) battery power available.

Figure 11D:
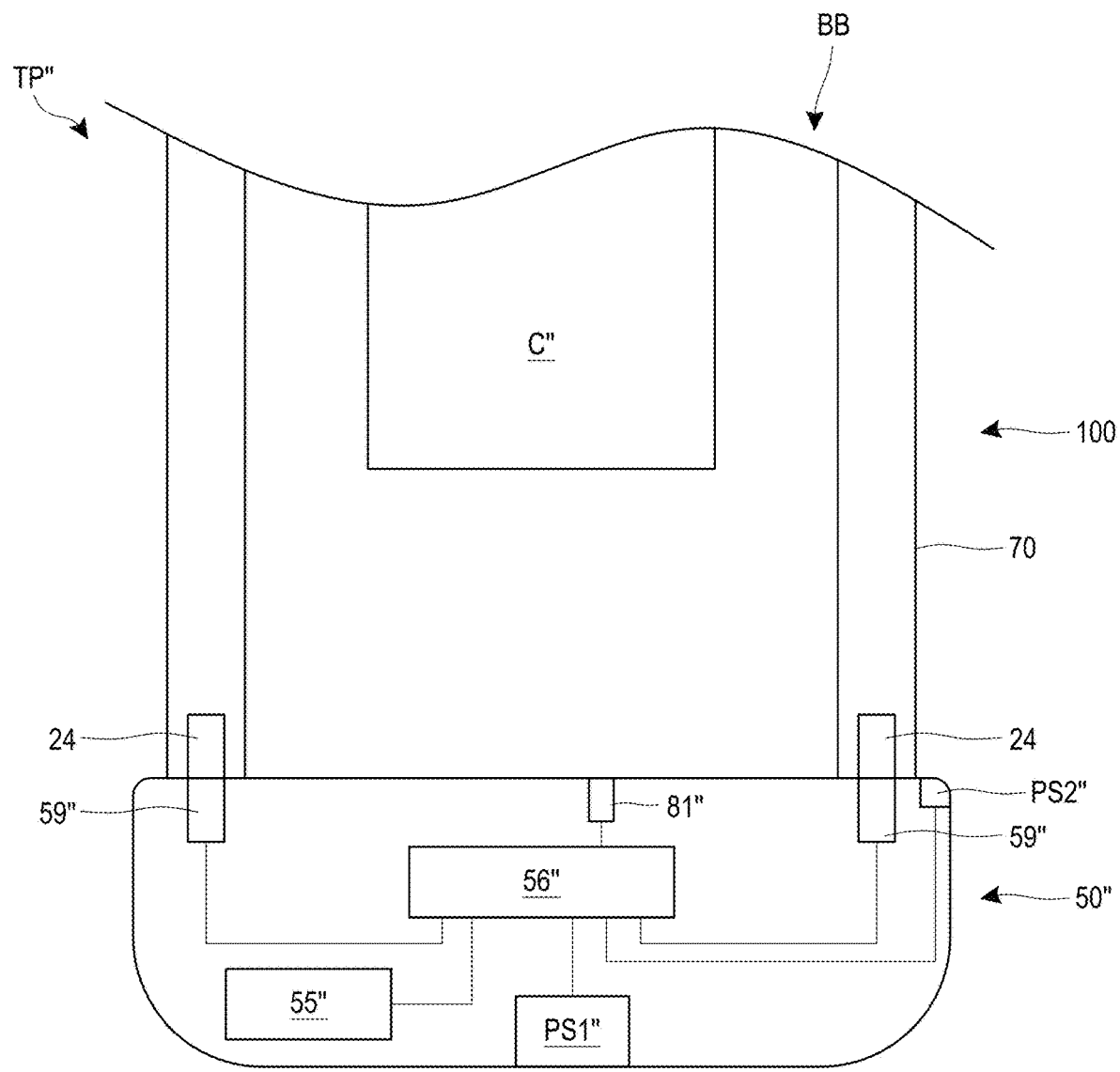
FIG. 11D is a schematic diagram of electronics in a smart base for use with an infant bottle or actively heated or cooled drinkware container.

FIG. 11D is a schematic diagram of an optional implementation of the drinkware container assembly or travel pack TP". The travel pack TP" assembly can include a conventional drinkware container BB (e.g., conventional infant bottle) having a chamber C" disposed on a smart base 50". A cover 70 can optionally be disposed over the drinkware container BB and attached to the smart base 50". The cover 70 can be identical to the cover 70 described above in connection with FIG. 11A. The smart base 50" can optionally be similar to the power base 50 in FIG. 11A (e.g., include the same components as the power base 50 in FIG. 11A), except as described below. Therefore, the same numerical identifiers are used in FIG. 11D to identify similar components shown in FIG. 11A, except that a """ is added to the numerical identifier, and the description corresponding to such components in FIG. 11A are understood to also apply to the similarly numbered components in FIG. 11D.

The smart base 50" differs from the power base 50 in FIG. 11A in that it excludes electrical contacts 53A, 53B and proximity sensor 57. The smart base 50" optionally includes one or more power storage elements 55" (e.g., batteries, such as rechargeable batteries), one or more electromagnets 59" and one or more weight sensors 81", all of which optionally communicate with circuitry 56". As discussed in connection with power base 50 in FIG. 11A, the electromagnet(s) 59 are actuatable to couple with magnets 24 in cover 70 to retain the drinkware container BB between the smart base 50" and the cover 70. As discussed above, the one or more weight sensors 81 are operable to measure a weight of the drinkware container BB (e.g., when empty, when filled with liquid) and to communicate the measured amounts to the circuitry 56".

Figure 11E:
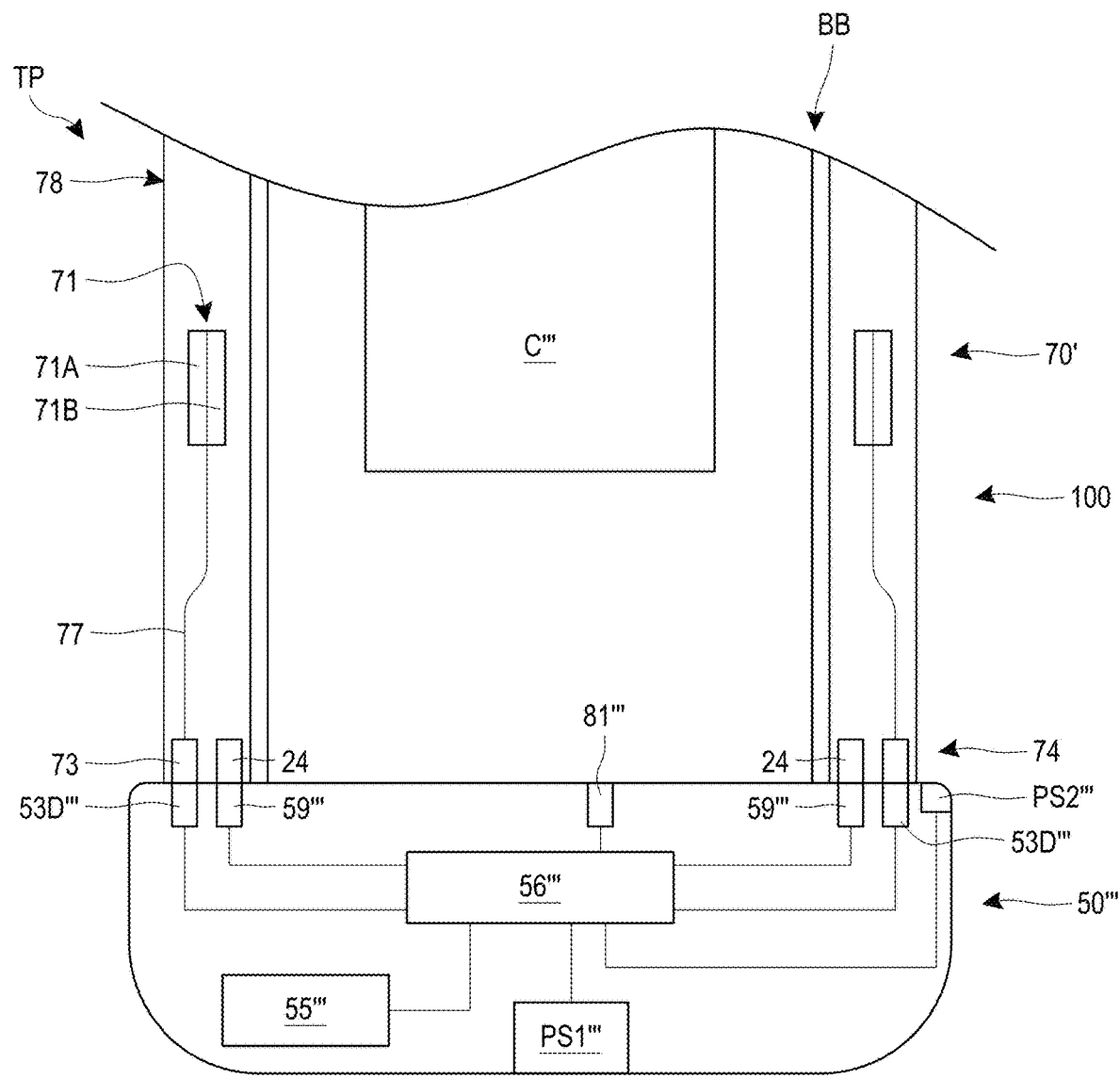
FIG. 11E is a schematic block diagram of an example of the electronics in a smart base for use with an infant bottle or actively heated or cooled drinkware container.

FIG. 11E is a schematic diagram of an optional implementation of the drinkware container assembly or travel pack TP'''. The travel pack TP''' assembly can include a conventional drinkware container BB (e.g., conventional infant bottle) having a chamber C''' disposed on a smart base 50'''. A cover 70' can optionally be disposed over the drinkware container BB and attached to the smart base 50'. The cover 70' can be identical to the cover 70' described above in connection with FIG. 11B. The smart base 50' can optionally be similar to the power base 50' in FIG. 11B (e.g., include the same components as the power base 50' in FIG. 11B), except as described below. Therefore, the same numerical identifiers are used in FIG. 11E to identify similar components shown in FIG. 11B, except that a "'''" is added to the numerical identifier, and the description corresponding to such components in FIG. 11B are understood to also apply to the similarly numbered components in FIG. 11E.

The smart base 50''' differs from the power base 50' in FIG. 11D in that it excludes electrical contacts 53A, 53B and proximity sensor 57. The smart base 50''' optionally includes one or more power storage elements 55''' (e.g., batteries, such as rechargeable batteries), one or more electromagnets 59''' and one or more weight sensors 81''', and one or more electrical contacts 53D''', all of which optionally communicate with circuitry 56'''. As discussed in connection with power base 50' in FIG. 11B, the electromagnet(s) 59''' are actuatable to couple with magnets 24 in cover 70' to retain the drinkware container BB between the smart base 50''' and the cover 70'. As discussed above, the one or more weight sensors 81' are operable to measure a weight of the drinkware container BB (e.g., when empty, when filled with liquid) and to communicate the measured amounts to the circuitry 56'''. As discussed previously in connection with FIG. 11B, power can be provided from the one or more power storage elements 55''' (via the circuitry 56') to the one or more thermoelectric elements 71 (via electrical contacts 53D in smart base 50' and electrical contacts 73 in the cover 70') to operate the one or more thermoelectric elements 71 to cool the contents in the chamber C'''.

Figure 11F:
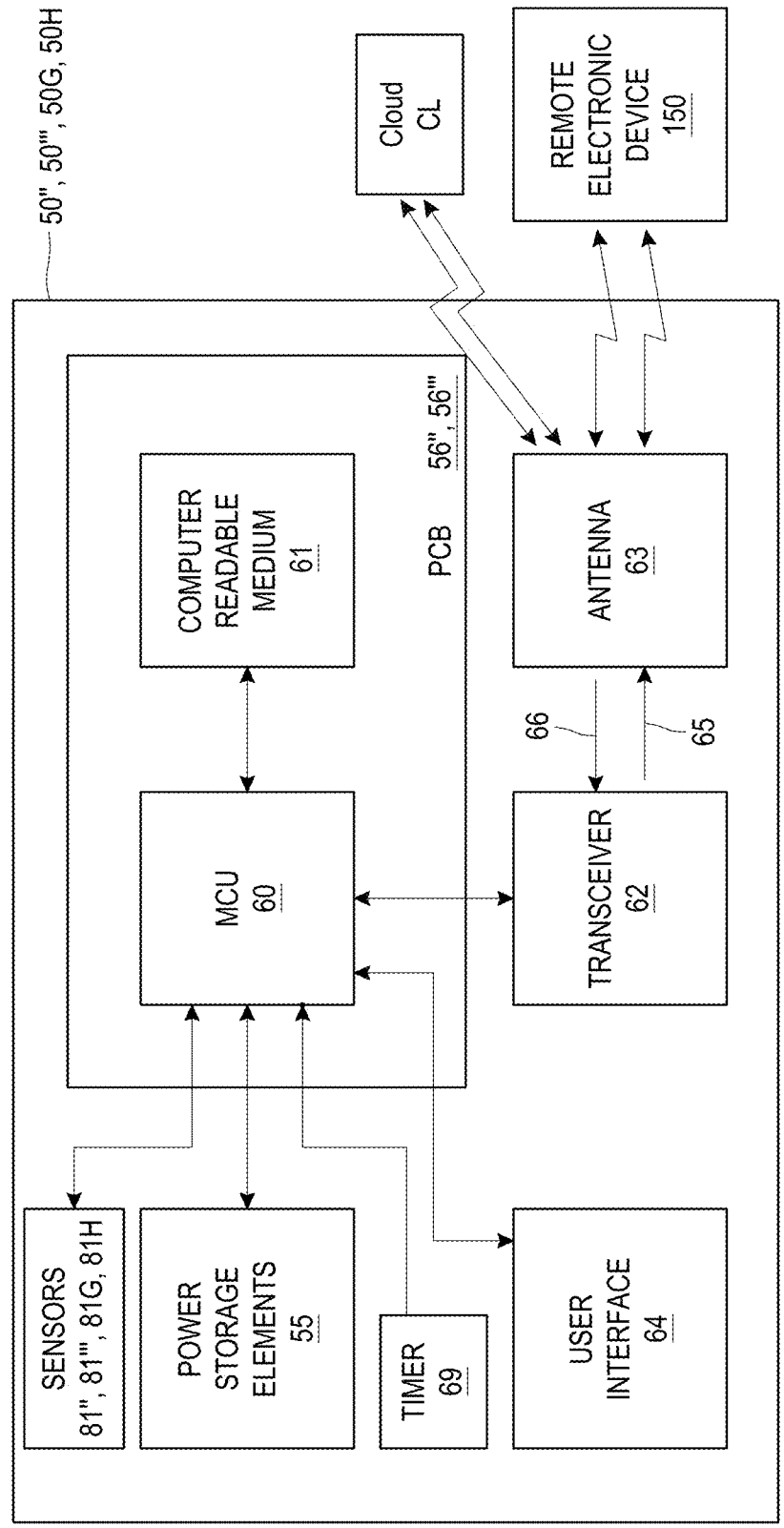
FIG. 11F is a schematic block diagram of one example of the electronics in the smart base.

FIG. 11F is a schematic block diagram of the smart base 50'', 50''' implementing one or more features of the present disclosure. For clarity, the one or more electrical contacts 53A, 53B, and one or more electromagnets 59 are excluded from the figure. However, one of skill in the art will recognize that such features can be included in the smart base 50'', 50''' shown in FIG. 11F in a similar manner as shown in FIGS. 11D-E. Therefore, the same numerical identifiers are used in FIG. 11F to identify similar components shown in FIG. 11C, except that a " '' or '''" is added to the numerical identifier, and the description corresponding to such components in FIG. 11C is understood to also apply to the similarly numbered components in FIG. 11F.

The smart base 50'', 50''', 50G, 50H in FIG. 11F operates in a similar manner as the smart base 50 in FIG. 11C, except that it does not provide power to a drinkware container. The smart base 50'', 50''', 50G, 50H can communicate (wirelessly) with a remote electronic device 150 or cloud-based data storage system or server CL, in a similar manner as described above for FIG. 11C. The smart base 50'', 50''', 50G, 50H in FIG. 11F can optionally be utilized with a conventional drinkware container (e.g., a conventional infant feeding bottle or sippy cup).

Figure 11G:
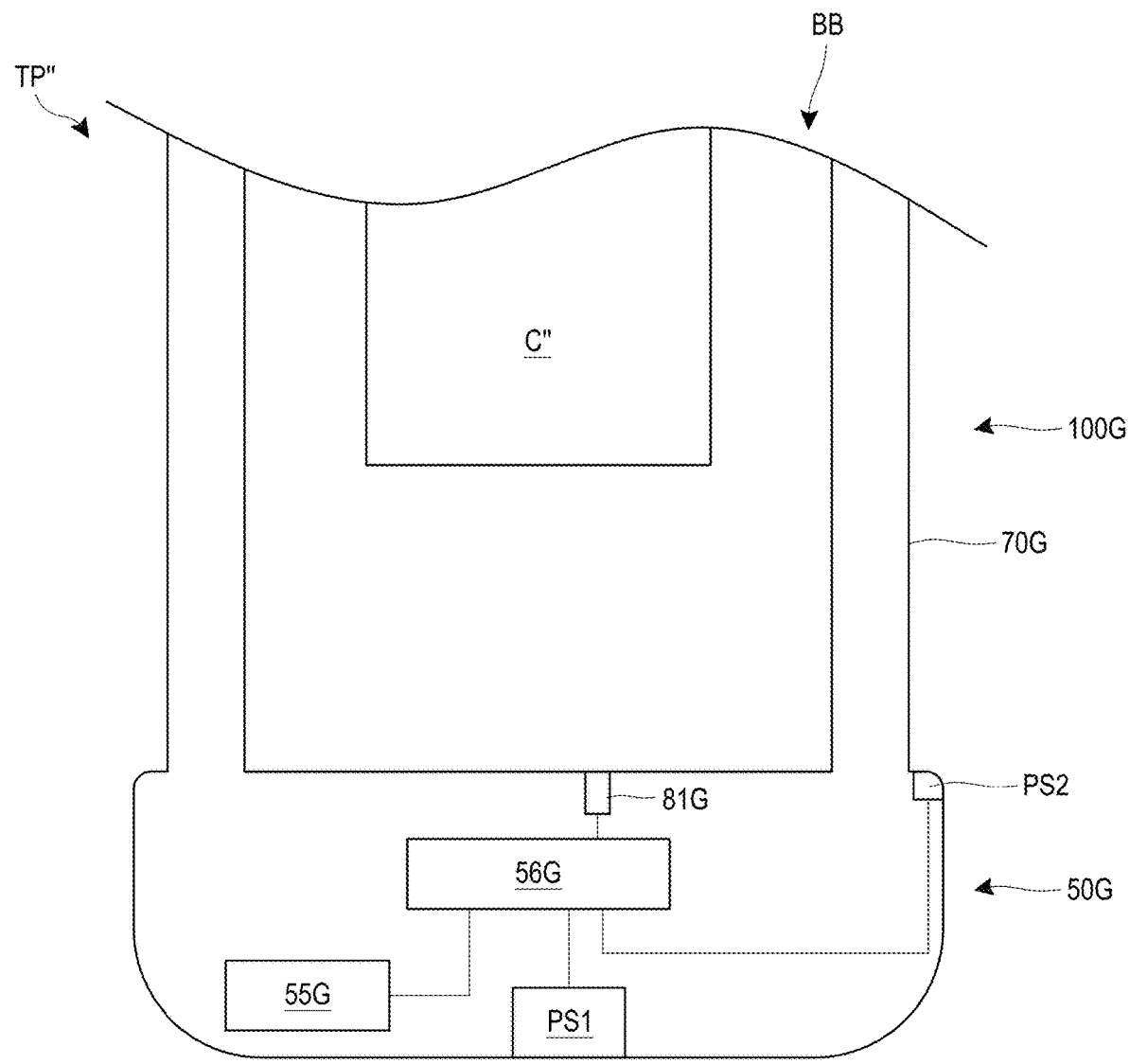
FIG. 11G is a schematic diagram of electronics in a smart base for use with a drinkware container, such as an infant bottle.

FIG. 11G is a schematic diagram of an optional implementation of the drinkware container assembly 100G or travel pack TP'''. The travel pack TP''' assembly can include a conventional drinkware container BB (e.g., conventional infant bottle) having a chamber C'' disposed on a smart base 50G. A cover or sleeve 70G (e.g., cylindrical sleeve) can optionally be attached to (e.g., integrated with, one piece with) the smart base 50G. The smart base 50G can optionally be similar to the power base 50 in FIG. 11A (e.g., include the same components as the power base 50 in FIG. 11A), except as described below. Therefore, the same numerical identifiers are used in FIG. 11G to identify similar components shown in FIG. 11A, except that a "G" is added to the numerical identifier, and the description corresponding to such components in FIG. 11A are understood to also apply to the similarly numbered components in FIG. 11G.

The smart base 50G differs from the power base 50 in FIG. 11A in that it is integrated with (e.g., one piece with, monolithic with) the sleeve or cover 70G. The sleeve or cover 70G is sized to receive a drinkware container (e.g., infant bottle BB) in the opening defined by the sleeve above the smart base 50G (e.g., so that the drinkware container, for example infant bottle, contacts the top surface of the smart base 50G. The smart base 50G optionally includes one or more power storage elements 55G (e.g., batteries, such as rechargeable batteries), and one or more weight sensors 81G, all of which optionally communicate with circuitry 56G. As discussed above, the one or more weight sensors 81G are operable to measure a weight of the drinkware container BB (e.g., when empty, when filled with liquid) and to communicate the measured amounts to the circuitry 56G. As shown in FIG. 11F, the smart base 50G can optionally communicate data with a remote electronic device (e.g., smartphone, tablet computer) 150 and/or with a cloud-based data storage system CL.

Figure 11H:
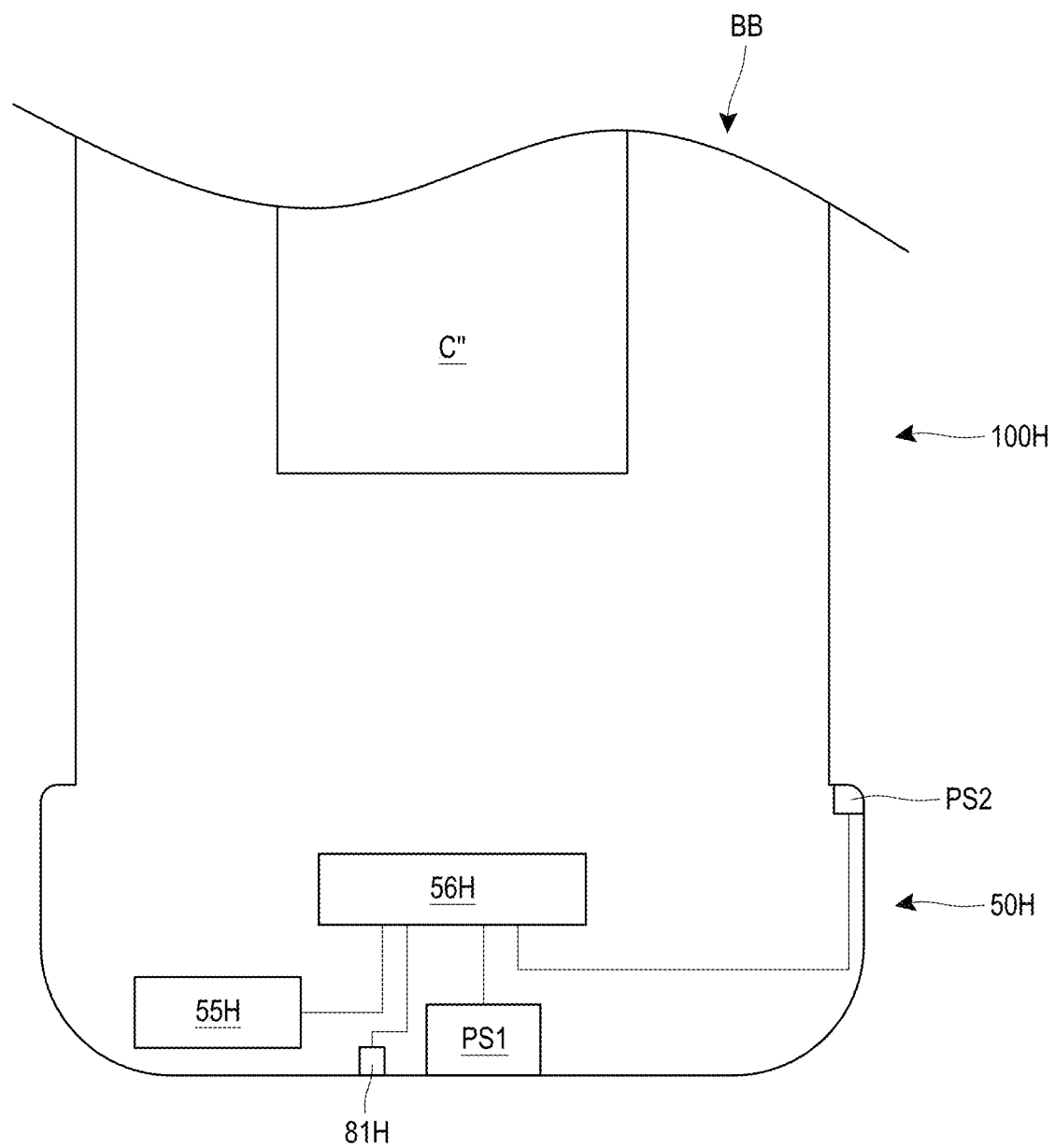
FIG. 11H is a schematic diagram of electronics in a smart base for use with a drinkware container, such as an infant bottle.

FIG. 11H is a schematic diagram of an optional implementation of the drinkware container assembly 100H. The container assembly 100H can include a conventional drinkware container BB (e.g., conventional infant bottle) having a chamber C'' disposed on a smart base 50H. The smart base 50H can optionally be similar to the power base 50G in FIG. 11G (e.g., include the same components as the power base 50G in FIG. 11G), except as described below. Therefore, the same numerical identifiers are used in FIG. 11H to identify similar components shown in FIG. 11G, except that an "H" is added to the numerical identifier, and the description corresponding to such components in FIG. 11G are understood to also apply to the similarly numbered components in FIG. 11H.

The smart base 50H differs from the power base 50G in FIG. 11G in that the sleeve or cover 70G is excluded, so that only the drinkware container BB is disposed on the power base 50H. The smart base 50H optionally includes one or more power storage elements 55H (e.g., batteries, such as rechargeable batteries), and one or more weight sensors 81H, all of which optionally communicate with circuitry 56H. As discussed above, the one or more weight sensors 81H are operable to measure a weight of the drinkware container BB (e.g., when empty, when filled with liquid) and to communicate the measured amounts to the circuitry 56H. As shown in FIG. 11F, the smart base 50H can optionally communicate data with a remote electronic device (e.g., smartphone, tablet computer) 150 and/or with a cloud-based data storage system CL.

Communication of Sensor Signals

FIGS. 12A-12D show schematic diagrams of optional electronics in the drinkware container 100 (e.g., in the module 30 of the drinkware container 100) and power base or smart base 50, and in particular optional electronics used for communicating information (e.g., signals) from the one or more sensors 80 in the drinkware container 100 to the power base or smart base 50. For sake of clarity, other electronics in the drinkware container 100 (e.g., in the module 30 of the drinkware container 100) and the power base 50, in particular electronics related to the transfer of power to the drinkware container 100, are excluded. The optional electronics in FIGS. 12A-12D can optionally be implemented in any of the drinkware containers 100, 100A, 100B, 100C, 100C', 100D, 100E, 100F and power/smart base systems 50, 50', 50", 50''', 50C, 50C', 50D, 50E, 50F disclosed herein.

Figure 12A:
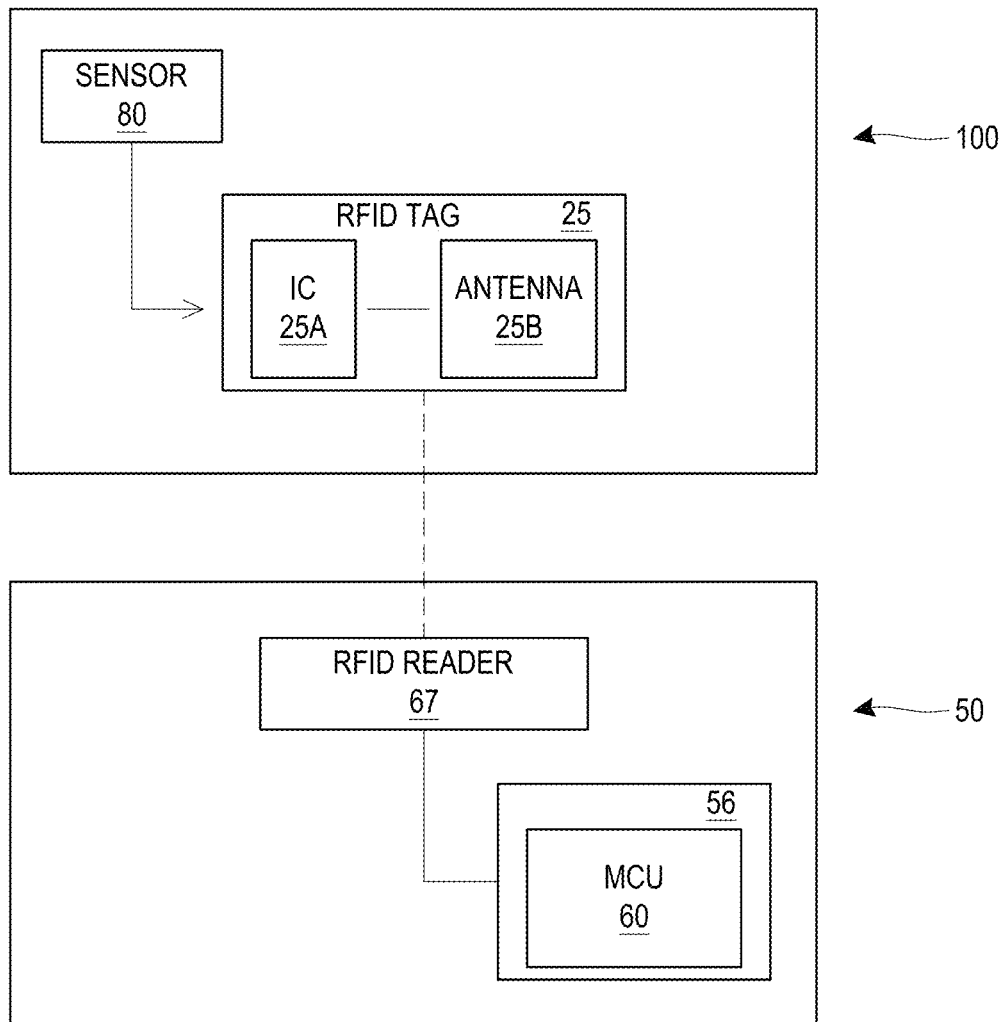
FIG. 12A is another schematic diagram of electronics in an actively heated or cooled drinkware container an in a power base.

With reference to FIG. 12A, signals or sensed data from the one or more sensors 80 are optionally communicated to the power base 50 (e.g., when the drinkware container 100 is disposed upon the power base 50) via an RFID tag and reader system. In one implementation the drinkware container 100 (e.g., the module 30 of the drinkware container 100) optionally includes a radio-frequency identification (RFID) tag 25, which can optionally have an integrated circuit 25A and an antenna 25B. The one or more sensors 80 can communicate with (e.g., communicate signals corresponding to sensed data to) the RFID tag 25. In one implementation, the RFID tag 25 can communicate with the circuitry 22.

The power base 50 optionally includes an RFID reader 67. Optionally, the RFID reader 67 communicates with one or both of the circuitry 56 (e.g., with the processor 60) and the one or more power storage elements 55. The RFID reader 67 can read (e.g., wirelessly) the signals or sensed data on the RFID tag 25 (e.g., sensed data communicated by the one or more sensors 80), for example when the drinkware container 100 (e.g., when the module 30 of the drinkware container 100) is proximate to (e.g., disposed upon, adjacent to, in contact with or supported on) the power base 50, and can optionally communicate the signals or sensed data to the processor 60, where the processor 60 can optionally process the data. Optionally, where the power base 50 includes a transceiver 62, the sensed data can be communicated from the power base 50 to a remote electronic device or mobile electronic device, such as a smartphone or tablet computer.

Optionally, the RFID tag 25 is a passive tag and is powered by the RFID reader 67. That is, there is no power source in the drinkware container 100 (e.g., in the module 30 of the drinkware container 100) and communication of the sensed data or signals from the one or more sensors 80 via the RFID tag 25 is powered by the one or more power storage elements 55 in the power base 50, for example when the drinkware container 100 (e.g., when the module 30 of the drinkware container 100) is proximate to (e.g., disposed upon, adjacent to, in contact with or supported on) the power base 50.

Figure 12B:
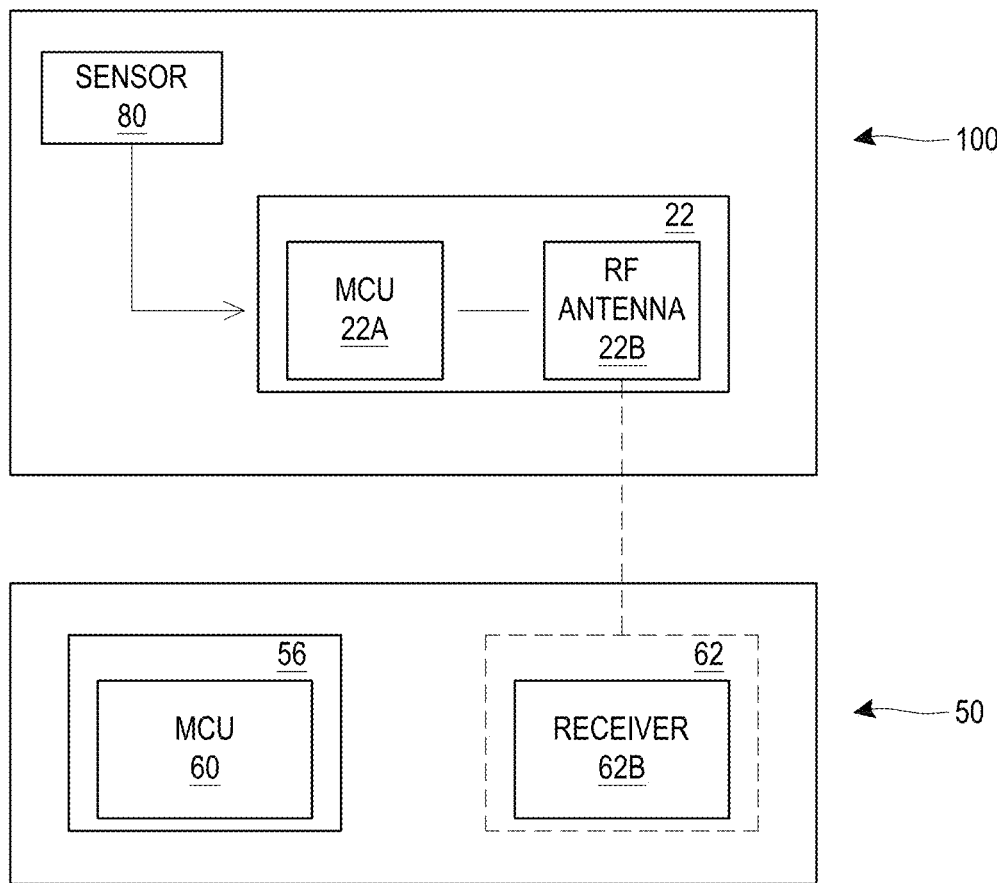
FIG. 12B is another schematic diagram of electronics in an actively heated or cooled drinkware container an in a power base.

With reference to FIG. 12B, signals or sensed data from the one or more sensors 80 are optionally communicated to the power base 50 (e.g., when the drinkware container 100 is disposed upon the power base 50) via an antenna (e.g., RF antenna) in the drinkware container 100 and receiver (e.g., RF receiver) in the power base 50. In one implementation the drinkware container 100 (e.g., the module 30 of the drinkware container 100) optionally includes circuitry 22 with a processor or microcontroller unit 22A and at least one radiofrequency antenna 22B that optionally communicates with the processor 22A. As previously discussed, the one or more sensors 80 can communicate with (e.g., communicate signals corresponding to sensed data to) the circuitry 22.

The power base 50 optionally includes a receiver (e.g., radiofrequency receiver) 62B. In one implementation, the receiver 62B can be part of the transceiver 62; in another implementation the receiver 62B can be a separate component than the transceiver 62. Optionally, the receiver 62B communicates with the circuitry 56 (e.g., with the processor 60 of the circuitry 56). The antenna 22B can optionally be a short range antenna, and the receiver 62B can be a short range RF receiver.

The receiver 62B can receive (e.g., wirelessly) the signals or sensed data (e.g., sensed data communicated by the one or more sensors 80) via the antenna 22B, for example when the drinkware container 100 (e.g., when the module 30 of the drinkware container 100) is proximate to (e.g., disposed upon, adjacent to, in contact with or supported on) the power base 50, and can optionally communicate the signals or sensed data to the processor 60, where the processor 60 can optionally process the data. Optionally, where the power base 50 includes a transceiver 62, the sensed data can be communicated from the power base 50 to a remote electronic device or mobile electronic device, such as a smartphone or tablet computer.

Optionally, the antenna 22B, circuitry 22 and one or more sensors 80 are powered by the power base 50. That is, there is no power source in the drinkware container 100 (e.g., in the module 30 of the drinkware container 100) and communication of the sensed data or signals from the one or more sensors 80 via the antenna 22B is powered by the one or more power storage elements 55 in the power base 50, for example when the drinkware container 100 (e.g., when the module 30 of the drinkware container 100) is proximate to (e.g., disposed upon, adjacent to, in contact with or supported on) the power base 50.

Figure 12C:
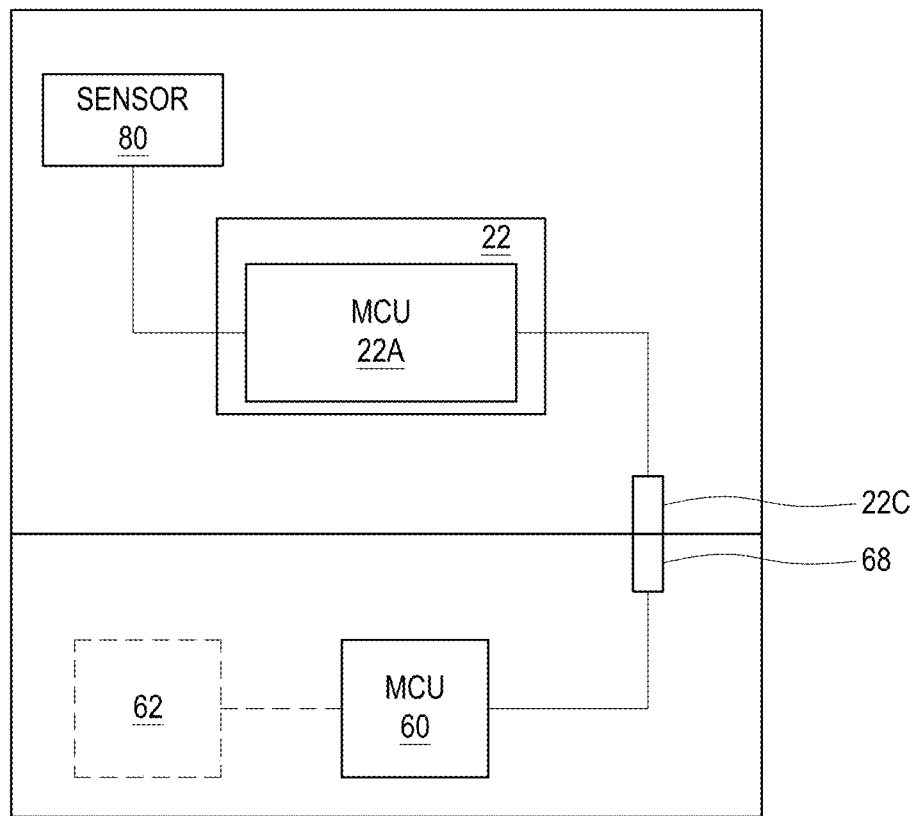
FIG. 12C is another schematic diagram of electronics in an actively heated or cooled drinkware container an in a power base.

With reference to FIG. 12C, signals or sensed data from the one or more sensors 80 are optionally communicated to the power base 50 (e.g., when the drinkware container 100 is disposed upon the power base 50) using via one or more light emitters in the drinkware container 100 and one or more receivers in the power base 50, for example using visible light communication technology.

In one implementation the drinkware container 100 (e.g., the module 30 of the drinkware container 100) optionally includes circuitry 22 with a processor or microcontroller unit 22A. As previously discussed, the one or more sensors 80 can communicate with (e.g., communicate signals corresponding to sensed data to) the circuitry 22, which are optionally processed by the processor 22A. Additionally, the drinkware container 100 (e.g., the module 30 of the drinkware container 100) optionally includes one or more light emitters 22C (e.g., infrared light emitter, ultraviolet light emitter, light emitting diodes (LEDs)) in communication with the circuitry 22 (e.g., in communication with the processor 22A of the circuitry 22). Optionally, the processor 22A can process the signals from the one or more sensors 80 and operate the one or more light emitters 22C (e.g., at one or more frequencies) to communicate said signals as one or more light signals. For example, the processor 22A can process the signals from the one or more sensors 80 into on/off instructions for the one or more light emitters 22C at one or more frequencies (e.g., to convert the signals into binary code). The one or more light emitters 22C can then be operated (e.g., flash on and off) according to the on/off instructions from the processor 22A.

The power base 50 optionally includes one or more receivers 68 (e.g., having a photodiode, image sensor, etc.) that can receive (e.g., wirelessly) the one or more light signals from the one or more light emitters 22C, for example when the drinkware container 100 (e.g., when the module 30 of the drinkware container 100) is proximate to (e.g., disposed upon, adjacent to, in contact with or supported on) the power base 50. The receiver 68 optionally interprets the received light signal (e.g., the binary code provided by the light signals) and communicates the received information to the circuitry 56 (e.g., to the processor 60 of the circuitry 56). In another implementation, the receiver 68 communicates the light signal from to the circuitry 56 without interpreting the signal. The circuitry 56 (e.g., the processor 60 of the circuitry) optionally processes the received light signal (e.g., interprets the binary code communicated by the signal). Accordingly, the receiver 68 can receive (wirelessly) the signals or sensed data (e.g., sensed data from the one or more sensors 80) via the one or more light emitters 22C.

Optionally, where the power base 50 includes a transceiver 62, the sensed data can be communicated from the power base 50 (via the transceiver 62) to a remote electronic device or mobile electronic device, such as a smartphone or tablet computer.

Optionally, the circuitry 22, one or more light emitters 22C and one or more sensors 80 are powered by the power base 50. That is, there is no power source in the drinkware container 100 (e.g., in the module 30 of the drinkware container 100) and communication of the sensed data or signals from the one or more sensors 80 via the one or more light emitters 22C is powered by the one or more power storage elements 55 in the power base 50, for example when the drinkware container 100 (e.g., when the module 30 of the drinkware container 100) is proximate to (e.g., disposed upon, adjacent to, in contact with or supported on) the power base 50.

Figure 12D:
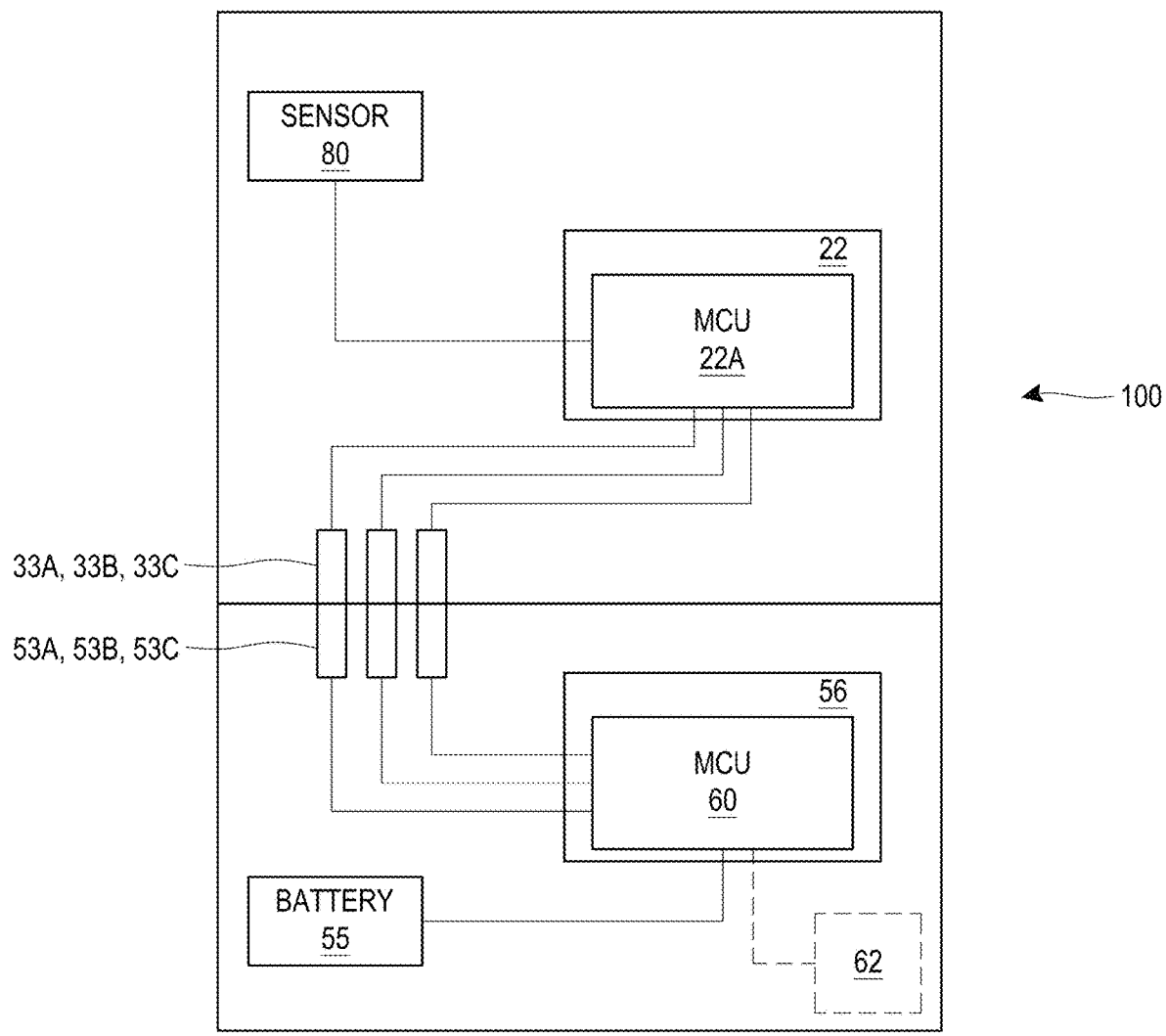
FIG. 12D is another schematic diagram of electronics in an actively heated drinkware container an in a power base.

With reference to FIG. 12D, signals or sensed data from the one or more sensors 80 are optionally communicated to the power base 50 (e.g., when the drinkware container 100 is disposed upon the power base 50) via one or more electrical contacts in the drinkware container 100 (e.g., in the module 30 of the drinkware container 100) and one or more electrical contacts in the power base 50.

In one implementation the drinkware container 100 (e.g., the module 30 of the drinkware container 100) optionally includes circuitry 22 with a processor or microcontroller unit 22A. As previously discussed, the one or more sensors 80 can communicate with (e.g., communicate signals corresponding to sensed data to) the circuitry 22, which are optionally processed by the processor 22A. Additionally, the drinkware container 100 (e.g., the module 30 of the drinkware container 100) optionally includes one or more electrical contacts 33A, 33B, 33C in communication with the circuitry 22 (e.g., in communication with the processor 22A of the circuitry 22). The processor 22A can optionally process the signals from the one or more sensors 80. For example, the processor 22A can optionally convert the signals from the one or more sensors 80 into one or more pulsed signals (e.g., on/off signal) at one or more frequencies (e.g., to convert the signals into binary code) and communicate pulsed signal to at least one of the one or more electrical contacts 33A, 33B, 33C.

At least one of one or more electrical contacts 53A, 53B, 53C of the power base 50 can receive the one or more pulsed signals from said at least one of the one or more electrical contacts 33A, 33B, 33C, for example when the drinkware container 100 (e.g., when the module 30 of the drinkware container 100) is proximate to (e.g., disposed upon, adjacent to, in contact with or supported on) the power base 50. The one or more electrical contacts 53A, 53B, 53C can communicate with the circuitry 56 (e.g., with a processor 60 of the circuitry). For example, the processor 60 can optionally process the received signals from the one or more electrical contacts 53A, 53B, 53C (e.g., to interpret the binary code in the received pulsed signal).

Optionally, where the power base 50 includes a transceiver 62, the sensed data can be communicated from the power base 50 to a remote electronic device or mobile electronic device, such as a smartphone or tablet computer.

Optionally, the circuitry 22, one or more electrical contacts 33A, 33B, 33C and one or more sensors 80 are powered by the power base 50. That is, there is no power source in the drinkware container 100 (e.g., in the module 30 of the drinkware container 100) and communication of the sensed data or signals from the one or more sensors 80 via the one or more light electrical contacts 33A, 33B, 33C is powered by the one or more power storage elements 55 in the power base 50, for example when the drinkware container 100 (e.g., when the module 30 of the drinkware container 100) is proximate to (e.g., disposed upon, adjacent to, in contact with or supported on) the power base 50.

FIG. 12D shows three electrical contacts 33A, 33B, 33C in the drinkware container 100 (e.g., in the module 30 of the drinkware container 100) and three corresponding electrical contacts 53A, 53B, 53C in the power base 50. In this implementation, two of the three contacts (e.g., 33A, 33B; 53A, 53B) in the drinkware container 100 and the power base 50 can be used to transmit power from the power base 50 to the drinkware container 100 and one of the three electrical contacts (e.g., 33C, 53C) can be used to communicate signals from the one or more sensors 80 to the power base 50, in the manner discussed above.

In another implementation, each of the drinkware container 100 and the power base 50 can instead have only two electrical contacts (e.g., 33A, 33B; 53A, 53B), which are used to transmit power from the power base 50 to the drinkware container 100 as well as to communicate signals or sensed data from the one or more sensors 80 to the power base 50. The circuitry 22 (e.g., the processor 22A of the circuitry) can optionally convert the signals from the one or more sensors 80 into a pulsed signal and communicate the pulsed signal along with the power signal through the electrical contacts 33A, 33B to the contacts 53A, 53B, which in turn communicate the pulsed signal along with the power signal to the circuitry 56 (e.g., to the processor 60 of the circuitry 56). The circuitry 56 (e.g., the processor 60) can optionally separate the pulsed signal from the power signal and process it (e.g., interpret the binary code in the received pulsed signal).

Figure 13A:
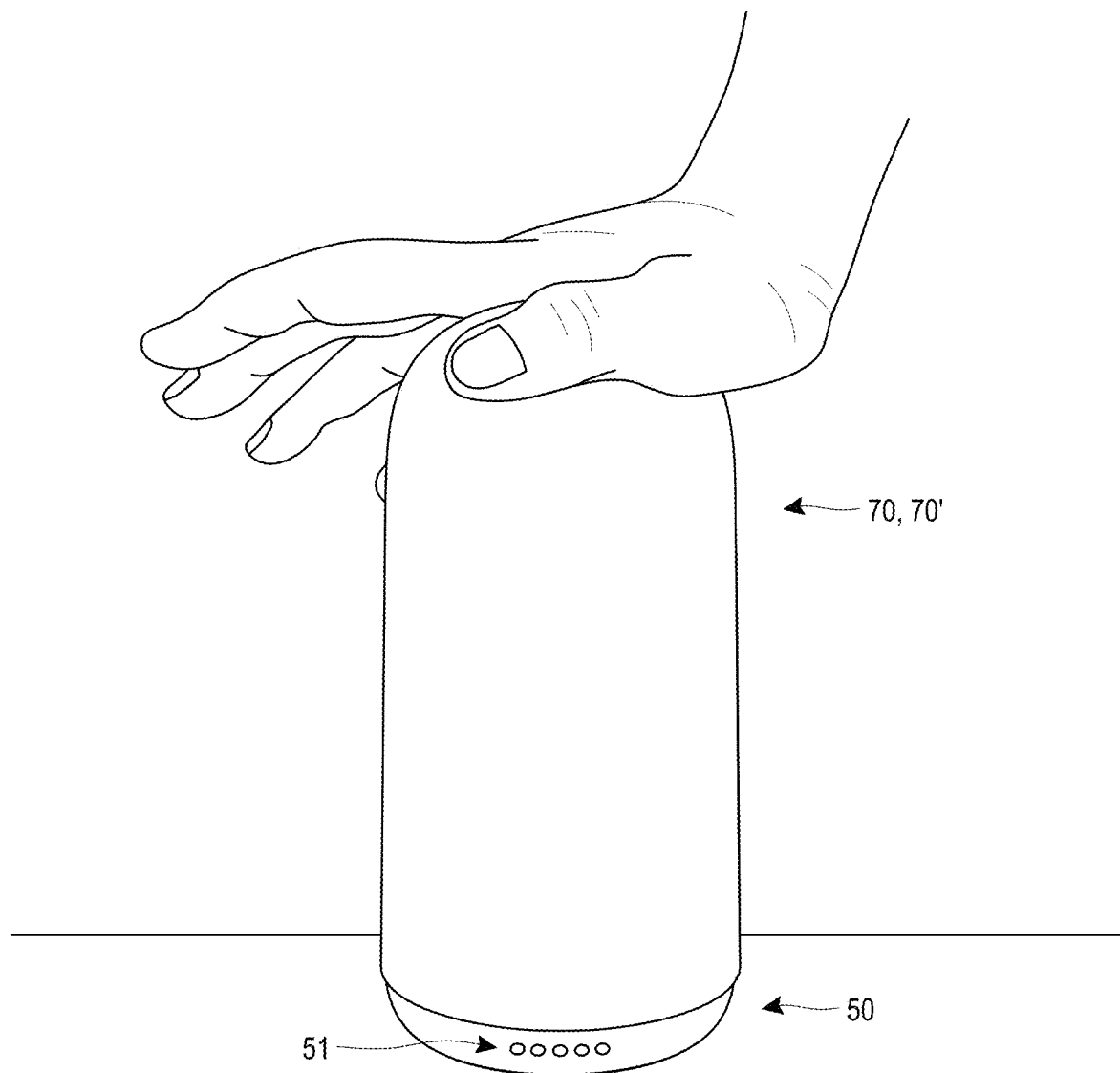
FIG. 13A is a schematic view of one example of actuating one or both of a power/smart base and an actively heated or cooled drinkware container.
Figure 13B:
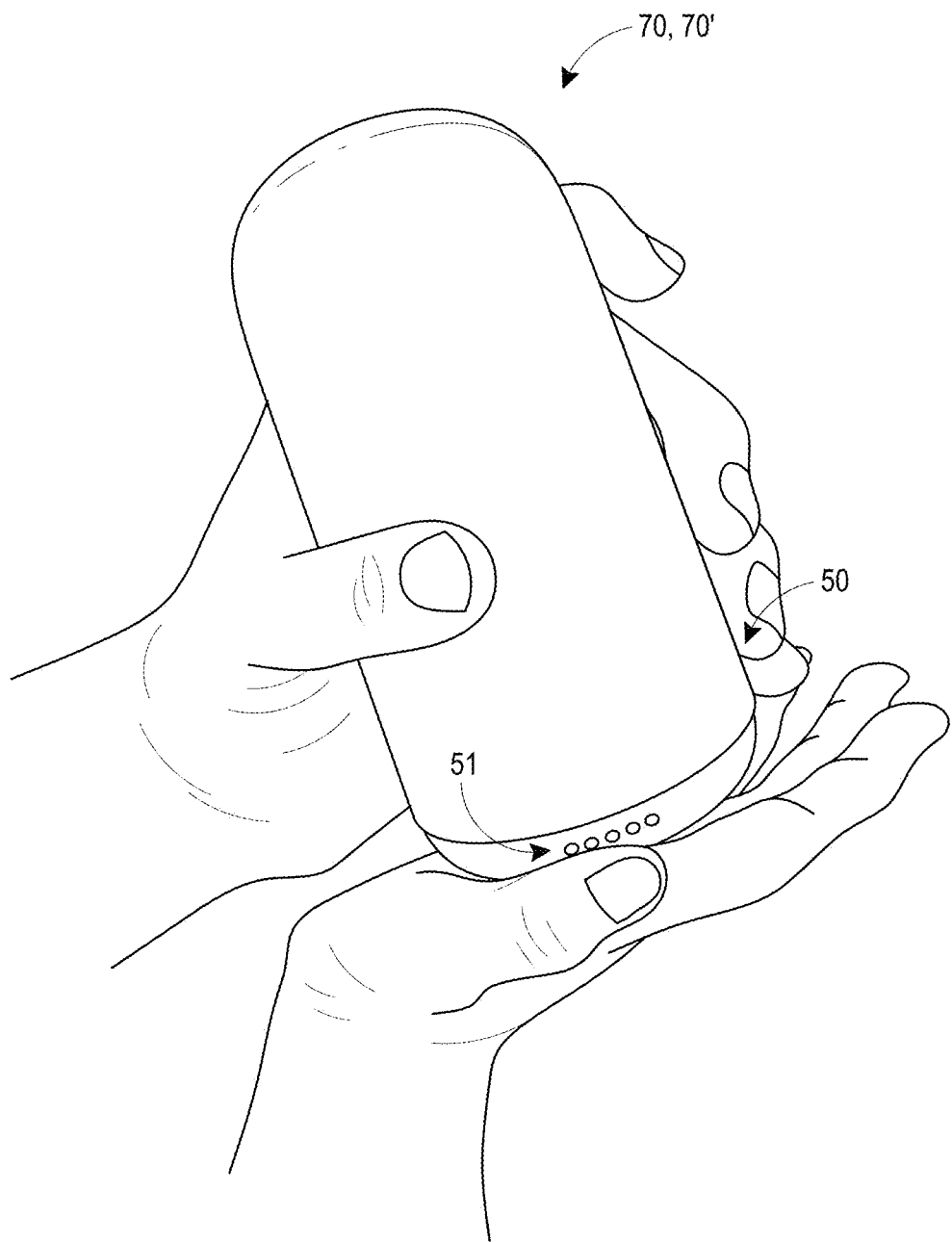
FIG. 13B is a schematic view of another example of actuating one or both of a power/smart base and an actively heated or cooled drinkware container.
Figure 13C:
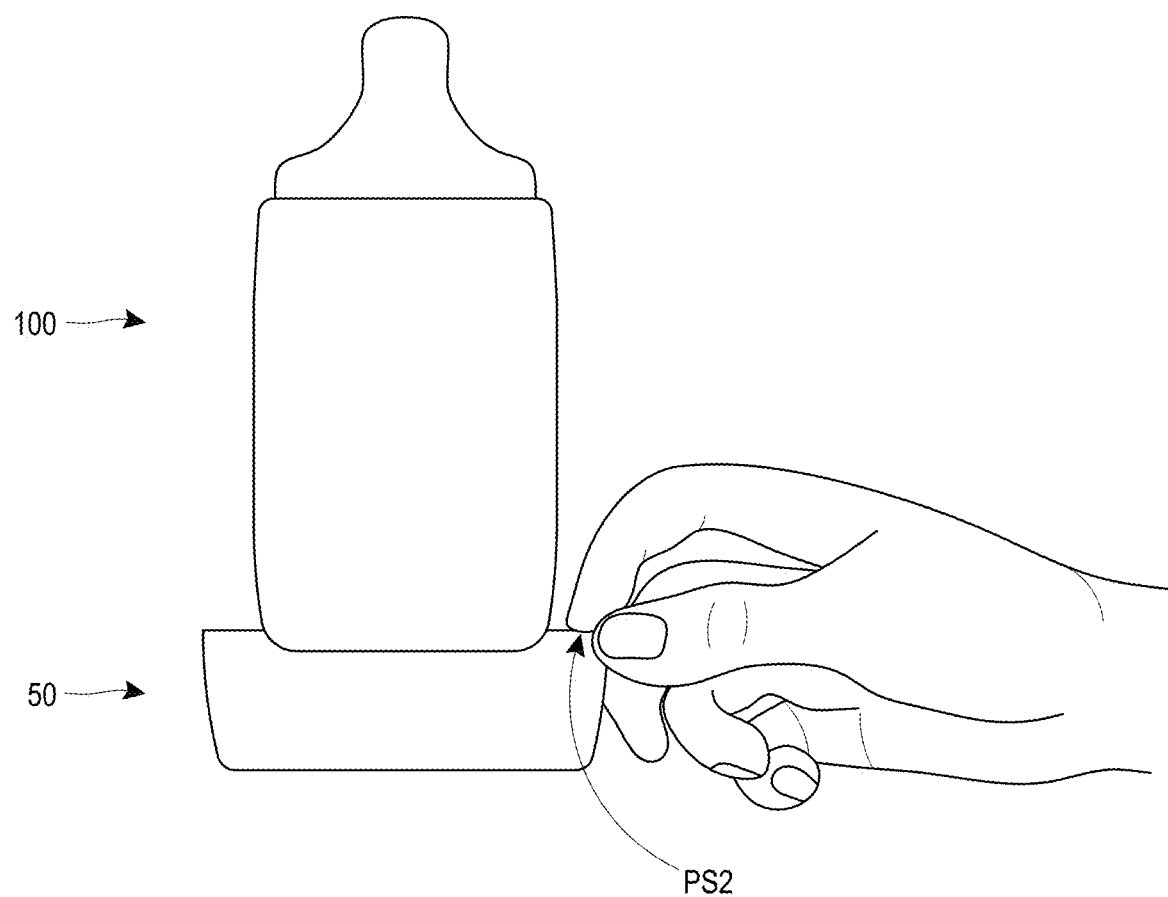
FIG. 13C is a schematic view of another example of actuating one or both of a power/smart base and an actively heated or cooled drinkware container.

FIGS. 13A-13C show examples of actuating one or both of a power/smart base and an actively heated or cooled drinkware container that can optionally be implemented in any of the drinkware containers 100, 100A, 100B, 100C, 100C', 100D, 100E, 100F and power/smart base systems 50, 50', 50'', 50''', 50C, 50C', 50D, 50E, 50F disclosed herein.

With reference to FIG. 13A, the power base or smart base 50, 50', 50'', 50''' can include a mechanical switch on the bottom surface 58 that can be activated when the uses pushes down on the power base or smart base 50, 50', 50'', 50''' (e.g., when the user pushes down on the cover 70, 70' when it's disposed thereon) against a surface, such as a table. For example, the power button PS1 (see FIGS. 11A, 11B, 11D, 11E) can be such a mechanical switch. In operation, the user can, for example, push down on the cover 70, 70' for a predetermined amount of time (e.g., 2 seconds, 3 seconds, 5 seconds) until an indication (e.g., visual, aural) is provided by the power base or smart base 50, 50', 50'', 50'''. For example, one or more indicator lights 51 can illuminate and/or illuminate in a certain color (e.g., green) once the predetermined period of time has passed to indicate the heating cycle for the drinkware container disposed between the cover 70, 70' and the power base or smart base 50, 50', 50'', 50''' has been activated. In another implementation, the power base or smart base 50, 50', 50'', 50''' can additionally or alternatively provide an audio signal (e.g., beep) once the predetermined period of time has passed. Advantageously, this allows the user to easily activate/initiate the heating of the contents in the drinkware container 100, without having to press a button or activate the power base or smart base 50, 50', 50", 50'" via a remote electronic device 150 (e.g., a smartphone). Therefore, the user can easily initiate the heating process for the contents (e.g., breast milk, infant formula, milk) in the drinkware container 100, even if the user is away from their smartphone or tablet computer.

With reference to FIG. 13B, the power base or smart base 50, 50', 50", 50'" can be pressed against the user's hand to initiate the heating process (e.g., if not near a desk, table or other flat surface). For example, the user can grab the sides of the cover 70, 70' and press the power base or smart base 50, 50', 50", 50'" against the palm of their hand. As with the implementation in FIG. 13A, the user can, for example, push down on the cover 70, 70' for a predetermined amount of time (e.g., 2 seconds, 3 seconds, 5 seconds) until an indication (e.g., visual, aural) is provided by the power base or smart base 50, 50', 50", 50'". For example, one or more indicator lights 51 can illuminate and/or illuminate in a certain color (e.g., green) once the predetermined period of time has passed to indicate the heating cycle for the drinkware container disposed between the cover 70, 70' and the power base or smart base 50, 50', 50", 50'" has been activated. In another implementation, the power base or smart base 50, 50', 50", 50'" can additionally or alternatively provide an audio signal (e.g., beep) once the predetermined period of time has passed.

With reference to FIG. 13B, if the cover 70, 70' is not on the power base or smart base 50, 50', 50", 50'", the use can activate/initiate the heating process to heat the contents (e.g., breast milk, infant formula, milk, etc.) in the drinkware container 100 by touching and/or pressing on the button PS2 of the power base or smart base 50, 50', 50", 50'". As with the implementations in FIGS. 13A-13B, the user can, for example, push down on the button PS2 for a predetermined amount of time (e.g., 2 seconds, 3 seconds, 5 seconds) until an indication (e.g., visual, aural) is provided by the power base or smart base 50, 50', 50", 50'". For example, one or more indicator lights 51 can illuminate and/or illuminate in a certain color (e.g., green) once the predetermined period of time has passed to indicate the heating cycle for the drinkware container 100 has been activated. In another implementation, the power base or smart base 50, 50', 50", 50'" can additionally or alternatively provide an audio signal (e.g., beep) once the predetermined period of time has passed.

Method of Operation

In one implementation, there is no power source in the drinkware container 100 (e.g., in the module 30 of the drinkware container 100). Instead, power is transmitted to the drinkware container 100 (e.g., to the circuitry 22, one or more heating elements 42, one or more sensors 80) from the power base 50, for example when the drinkware container 100 (e.g., when the module 30 of the drinkware container 100) is proximate to (e.g., disposed upon, adjacent to, in contact with or supported on) the power base 50. Accordingly, the electronics in the drinkware container 100 (e.g., circuitry 22, one or more sensors 80, one or more heating elements 42) are not operable while the drinkware container 100 is detached from the power base 50, such as during consumption of the contents (e.g. liquid) in the drinkware container 100. For example, where the drinkware container 100 is an infant bottle (or sippy cup), electronics in the drinkware container 100 are advantageously not operable while the child consumes the liquid in the infant bottle (or sippy cup). Optionally, the circuitry 22 in the drinkware container 100 can require low power (e.g., a low power processor 22A, low power antenna 22B, 25B).

In use, a user can pour liquid (e.g., cold milk) in the chamber C of the drinkware container 100 and cover the container 100 with the cover 70 and couple the container 100 and/or cover 70 (e.g., via a threaded connection, via magnets such as electromagnets) to the power base 50. The cover 70 advantageously thermally insulates the drinkware container 100, allowing the liquid in the chamber C to substantially retain its cooled temperature for an extended period of time (e.g., 8 hours or less, 6 hours or less, 4 hours or less, 2 hours or less).

The user can actuate the heating of the contents in the chamber C by providing a "start heating" instruction to the power base 50. For example, the user can actuate (e.g., touch, press, push, gesture at) a user interface (such as user interface 64) of the power base 50 to deliver power to the one or more heating elements 42 in the drinkware container 100 (e.g., via the electrical contacts 53A, 53B in the power base 50 and electrical contacts 33A, 33B in the module 30). Further, the user can optionally select a temperature setpoint or temperature range to which the contents of the chamber C are to be heated via the user interface of the power base 50. Where the power base 50 includes a transceiver 62, the user can additionally (or alternatively) provide the "start heating" instruction and user selected temperature setpoint or temperature range to the power base 50 wirelessly (e.g., via a remote electronic device 150).

The remote electronic device 150 can optionally be a mobile electronic device, such as smartphone or tablet computer, which can communicate with the power base 50 via, for example WiFi or BLUETOOTH®. The remote electronic device 150 can optionally be a voice activated intelligent personal assistant (e.g., ALEXA™ by AMAZON®) device that can communicate with the power base 50, for example via WiFi. Accordingly, in an additional or alternative implementation, the operation of the power base 50, and therefore the operation of the heating or cooling of the contents of the drinkware container 100, can be effected via wireless instructions received from the remote electronic device 150 (e.g., received via voice activation of an intelligent personal assistant that communicates with the power base 50).

In an additional or alternative implementation, the temperature setpoint or temperature range is not communicated by the use but is instead preset and stored in the power base 50 (e.g., in the computer readable medium 61), for example during manufacturing. In this implementation, the power base 50 operates the delivery of power to the drinkware container 100 to operate the one or more heating elements 42 to achieve said preset temperature during the heating process.

Advantageously, the cover 70 remains over the drinkware container 100 during the heating operation, making the heating process more efficient as the cover 70 inhibits loss of heat through the walls of the vessel 10, module 30 or lid 200. The one or more sensors 80 sense one or more parameters of the contents in the chamber C. For example, the one or more sensors 80 sense temperature in the chamber C, liquid level in the chamber C, etc. and communicate the sensed information to the power base 50 in the manners disclosed above. Circuitry 56 in the power base 50 optionally determines when the contents in the chamber C have reached the temperature setpoint, for example via the sensed data communicated by the one or more sensors 80 to the power base 50. In one optional implementation, the circuitry 56 automatically ends the heating process (e.g., by disallowing transfer of power from the power base 50 to the drinkware container 100) when the temperature setpoint or temperature range is reached.

The power base 50 optionally communicates a signal (e.g., visual signal, audio signal) to the user indicating the heating process is complete and the contents (e.g., liquid) in the chamber C are ready for consumption. Said signal can optionally include a color light (e.g., green) of the indicator light 51, or can optionally include a text message displayed on a user interface (e.g., user interface 64) of the power base 50, or can optionally include a signal communicated wirelessly by the power base 50 to the mobile electronic device 150. In another optional implementation, the power base 50 ends the heating process upon receiving a "stop heating" instruction from the user (e.g., via a user interface on the power base 50, or wirelessly via the mobile electronic device 150).

Upon disallowing transfer of power from the power base 50 to the drinkware container 100 (when the heating process has completed), the cover 70 can be decoupled from the power base 50 and the drinkware container 100 can be detached from the power base 50. For example, where electromagnetic coupling is used between the power base 50 and the cover 70, disallowing transfer of power from the power base 50 to the drinkware container 100 optionally automatically switches off the electromagnets 59, allowing the cover 70 to be decoupled from the power base 50. Where the power base 50 includes one or more power storage elements 55, the power base 50 can be connected to power source to recharge the one or more power storage elements 55, in the manner discussed above.

In implementations where the power base 50 includes a transceiver 62 (see FIG. 11C), as discussed above, the power base 50 can wirelessly communicate with a remote electronic device, such as the mobile electronic device 150 (e.g., smartphone, tablet computer, laptop computer, desktop computer) or voice activated intelligent personal assistant (e.g., ALEXA™ by AMAZON®). Such wireless communication with the remote electronic device 150 advantageously allows, for example, easy operation of the infant bottle feeding system and collection of information associated with the consumption of milk from the bottle (e.g., time of day of feeding, number of feedings a day, volume of liquid, such as milk, consumed per feeding, etc.), thereby providing a smart infant bottle system. The infant bottle system can optionally be programmed (via the processor 60 and computer readable medium 61 in the circuitry 56 of the power base 50) to heat (e.g., automatically without user actuation) the milk at specific time(s) of day (e.g., based on collected data of feeding patterns of infant). For example, a user can program future heating times for the infant bottle (e.g., drinkware container) using their smartphone via the wireless communication between the power base 50 and the mobile electronic device 150. The power base 50 can then deliver power to the drinkware container 100 at the programmed time so long as the drinkware container 100 is on the power base 50 (e.g., a proximity sensor signals the circuitry 56 in the power base 50 that the drinkware container 100 is on the power base) and so long as the one or more sensors 80 communicate a signal indicating the presence of liquid in the chamber C to the power base 50.

In one implementation, at least one of the one or more sensors 80 can optionally be operated to sense a level of liquid in the chamber C and to communicate the sensed information to the power base 50 (e.g., to the circuitry 56 of the power base 50), as discussed above. The circuitry 56 can optionally calculate a volume of liquid based on the sensed liquid level (e.g., using information stored on the computer readable medium (e.g., memory) 61 on the size of the chamber C in the drinkware container 100). Alternatively, at least one of the one or more sensors 80 can sense a volume of liquid in the chamber C and communicate the sensed volume data to the power base 50 (e.g., to the circuitry 56 of the power base 50).

Advantageously, the power base 50 can log information on the volume of liquid consumed in any feeding (e.g., save it on the computer readable medium 61), as well as the time the feeding began and the duration of the feeding period (e.g., via time information provided by the timer 69 to the MCU 60). For example, when a heating operation of the liquid (e.g., milk) in the drinkware container 100 is started, the power base 50 can log the start volume (e.g., sensed volume, calculated volume) of the liquid. Once the heating process is completed, the drinkware container 100 is removed from the power base 50 and the infant is fed the contents of the drinkware container 100. Upon completion of the feeding session, the user can place the drinkware container 100 back onto the power base 50, at which point the power base 50 can again log the end volume (e.g., sensed volume, calculated volume) of the liquid in the drinkware container 100 and the circuitry 56 can calculate the volume consumed by the infant (e.g., by subtracting the end volume from the start volume).

Optionally, the power base 50 can communicate data associated with the feeding, such as one or more of feeding start time, feeding end time, feeding duration, and volume consumed to a user. For example, the power base 50 can communicate such data wirelessly to a mobile electronic device (e.g., via an app in the mobile electronic device), which can log feeding data over a period of time (e.g., per day, per week, per month) that the user can access to view the consumption history by the infant. Additionally, or alternatively, the power base 50 can optionally save data in the computer readable medium 61, and provide it to the user when requested by the user via the remote electronic device 150 (e.g., via a smartphone or via a voice activated intelligent personal assistant).

Additional Embodiments

In embodiments of the present invention, an infant bottle feeding system may be in accordance with any of the following clauses:

Clause 1. An infant bottle feeding system, comprising:
an electronic base configured to removably support an infant bottle on an upper surface thereof, the electronic base comprising:
one or more sensors, at least one of the one or more sensors configured to sense a weight of the infant bottle when placed on the electronic base,
a transceiver, and
circuitry configured to communicate with the one or more sensors and the transceiver, the circuitry operable to:
record one or both of a start time and start weight of the infant bottle prior to an infant feeding event,
record one or both of an end time and end weight of the infant bottle following an infant feeding event,
calculate one or both of an elapsed time between the start time and end time and a consumption amount based on a difference between the start weight and end weight, and
one or both of store the elapsed time and consumption amount in a memory of the electronic base and wirelessly communicate via the transceiver the elapsed time and consumption amount to one or both of a remote electronic device and a to the cloud-based data storage system for storage and from which data is accessible via a dashboard interface on an electronic device; and a thermal cover configured to fit over the infant bottle and to releasably couple to the electronic base to completely enclose the infant bottle between the thermal cover and the electronic base, the thermal cover configured to insulate the infant bottle and inhibit heat loss of liquid in the infant bottle.

Clause 2. The infant bottle feeding system of clause 1, wherein the infant bottle, thermal cover and electronic base define a single travel pack unit when coupled together.

Clause 3. The infant bottle feeding system of any preceding clause, wherein the thermal cover extends between a closed distal end and an open proximal end through which the thermal cover receives the infant bottle, the thermal cover comprising an outer wall and an inner wall spaced apart from the outer wall to define a gap therebetween, the gap being under vacuum.

Clause 4. The infant bottle feeding system of any preceding clause, wherein the thermal cover further comprises a phase change material in thermal communication with the inner wall, the phase change material configured to absorb heat from the infant bottle to thereby cool the contents of the infant bottle.

Clause 5. The infant bottle feeding system of any preceding clause, wherein the electronic base comprises one or more batteries in communication with the circuitry.

Clause 6. The infant bottle feeding system of any preceding clause, wherein the infant bottle comprises
  a body with a chamber configured to receive a liquid therein,
  one or more heating or cooling elements housed in the body and in thermal communication with the chamber, the one or more heating or cooling elements being operable to heat or cool a liquid in the chamber, and
  one or more sensors in communication with the chamber and operable to sense one or more parameters of the liquid in the chamber.

Clause 7. The infant bottle feeding system of any preceding clause, wherein the electronic base further comprises one or more electrical contacts on a proximal surface thereof configured to contact one or more electrical contacts on a distal surface of the infant bottle configured to communicate with one or both of the one or more heating or cooling elements and one or more sensors, the electronic base configured to deliver power to one or both of the one or more heating or cooling elements and one or more sensors in the infant bottle via the one or more electrical contacts in the electronic base and in the infant bottle.

Clause 8. The infant bottle feeding system of any preceding clause, wherein the one or more electrical contacts in the infant bottle are one or more rings radially spaced apart from each other along and centered on an axis of the infant bottle, and wherein the one or more electrical contacts in the electronic base are one or more electrical pin contacts.

Clause 9. The infant bottle feeding system of any preceding clause, wherein the electronic base comprises one or more proximity sensors operable to communicate a signal to the circuitry in the electronic base when the infant bottle is on the electronic base, the circuitry configured to disallow transfer of power to the infant bottle unless said signal indicating the infant bottle is on the electronic base is received from the one or more proximity sensors.

Clause 10. The infant bottle feeding system of any preceding clause, wherein the transceiver is operable to wirelessly transmit information to an electronic device and to receive instructions from the electronic device, the circuitry in the electronic base configured to operate the one or more heating or cooling elements in the infant bottle based at least in part on the received instructions when the infant bottle is on the electronic base.

Clause 11. The infant bottle feeding system of any preceding clause, wherein the thermal cover removably couples to the electronic base via one or more electromagnets in the electronic base actuatable by the circuitry in the electronic base to releasably couple to one or more permanent magnets in the thermal cover.

Clause 12. The infant bottle feeding system of any preceding clause, wherein the infant bottle further comprises circuitry configured to communicate with one or both of the one or more heating or cooling elements and the one or more sensors.

Clause 13. The infant bottle feeding system of any preceding clause, wherein the one or more electrical contacts in the electronic base and in the infant bottle are operable to transmit power from the electronic base to the infant bottle as well as to transmit data from the one or more sensors in the infant bottle to the electronic base.

Clause 14. The infant bottle feeding system of any preceding clause, wherein the thermal cover comprises one or more thermoelectric elements operable to cool at least a portion of an inner wall of the thermal cover to thereby actively cool or heat one or both of the infant bottle and a liquid in the infant bottle when the infant bottle is disposed in the thermal cover, the electronic base configured to transmit power to the one or more thermoelectric elements in the thermal cover when the thermal cover is coupled to the electronic base.

Clause 15. The infant bottle system of any preceding clause, wherein the circuitry in the electronic base is operable to receive data from the one or more sensors in the infant bottle indicative of one or more of a temperature, a level, and a volume of liquid in the chamber, the circuitry configured to operate the one or more heating elements based on said data.

Clause 16. The infant bottle system of any preceding clause, wherein the circuitry is operable to measure a volume of liquid consumed during a feeding period based on the sensed data from the one or more sensors in the infant bottle and to wirelessly communicate said measured volume to one or both of the remote electronic device and the cloud-based data storage system from which the measured volume is accessible by a user via an electronic device.

Clause 17. An infant bottle feeding system, comprising:
  an infant bottle having a body with a chamber configured to receive a liquid therein, the infant bottle comprising:
    one or more heating elements housed in the body and in thermal communication with the chamber and operable to heat a liquid in the chamber, and one or more sensors in communication with the chamber and operable to sense one or more parameters of the liquid in the chamber;

an electronic base removably attached to a bottom surface of the infant bottle and configured to deliver power to electronics in the infant bottle; and a thermal cover configured to fit over the infant bottle and to releasably couple to the electronic base to completely enclose the infant bottle, the thermal cover configured to insulate the infant bottle and inhibit heat loss of liquid in the chamber, wherein the electronic base is configured to deliver power to one or both of the one or more heating elements and the one or more sensors in the infant bottle only when the infant bottle is on the electronic base, and wherein the infant bottle, thermal cover and electronic base define a single travel pack unit when coupled together.

Clause 18. The infant bottle feeding system of any preceding clause, wherein the electronic base comprises one or more batteries and circuitry in communication with the one or more batteries.

Clause 19. The infant bottle feeding system of any preceding clause, wherein the electronic base further comprises one or more electrical contacts on a proximal surface configured to contact one or more electrical contacts on a distal surface of the infant bottle, the electronic base configured to deliver power to one or both of the one or more heating elements and the one or more sensors in the infant bottle via the one or more electrical contacts in the electronic base and in the infant bottle.

Clause 20. The infant bottle feeding system of any preceding clause, wherein the thermal cover extends between a closed distal end and an open proximal end through which the thermal cover receives the infant bottle, the thermal cover comprising an outer wall and an inner wall spaced apart from the outer wall to define a gap therebetween, the gap being under vacuum, the thermal cover further comprising a phase change material in thermal communication with the inner wall, the phase change material configured to absorb heat from the infant bottle to thereby cool the liquid in the infant bottle.

Clause 21. The infant bottle feeding system of any preceding clause, wherein the electronic base comprises a transceiver operable to wirelessly transmit information to one or both of a remote electronic device and a cloud-based data storage system and to receive instructions therefrom, the circuitry in the electronic base configured to operate the one or more heating elements in the infant bottle based at least in part on the received instructions when the infant bottle is on the electronic base.

Clause 22. The infant bottle feeding system of any preceding clause, wherein the one or more electrical contacts in the electronic base and in the infant bottle are operable to transmit power from the electronic base to the infant bottle as well as to transmit data from the one or more sensors in the infant bottle to the electronic base.

Clause 23. The infant bottle system of any preceding clause, wherein the circuitry in the electronic base is operable to receive data from the one or more sensors in the infant bottle indicative of one or more of a temperature, a level, and a volume of liquid in the chamber, the circuitry configured to operate the one or more heating elements based on said data.

Clause 24. The infant bottle system of any preceding clause, wherein the circuitry is operable to measure an amount of liquid consumed during a feeding period based on one or both of the sensed data from the one or more sensors in the infant bottle and a sensed weight of the infant bottle measured by one or more weight sensors in the electronic base that communicate with the circuitry in the electronic base, the circuitry operable to one or both of store the measured amount in a memory of the electronic base and wirelessly communicate via the transceiver said measured amount to one or both of a remote electronic device and a cloud-based data storage system from which the measured amount is accessible by a user via an electronic device.

While certain embodiments of the inventions have been described, these embodiments have been presented by way of example only, and are not intended to limit the scope of the disclosure. Indeed, the novel methods and systems described herein may be embodied in a variety of other forms. For example, though the features disclosed herein are described in connection with infant bottles (e.g., baby bottles, sippy cups), the features are applicable to other drinkware containers and other containers (e.g., dishware, such as plates and bowls, serverware such as serving dishes and hot plates, food storage containers such as tortilla warmers, bread baskets) and the invention is understood to extend to such other containers. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An infant bottle feeding system, comprising:
   an infant bottle having a chamber configured to receive a liquid therein;
   a single piece thermal cover having a closed first end and an open second end, the single piece thermal cover configured to extend over at least a portion of the infant bottle, the single piece thermal cover comprising an outer wall and an inner wall spaced apart from the outer wall, a gap between the inner wall and the outer wall being under vacuum so that the inner wall is thermally insulated relative to the outer wall; and
   a bottom cover configured to removably couple to the single piece thermal cover to close the open second end of the single piece thermal cover so that the infant bottle is enclosed between the single piece thermal cover and the bottom cover.

2. The system of claim 1, wherein the single piece thermal cover extends along at least a majority of a length of the infant bottle when the single piece thermal cover is disposed over the infant bottle.

3. The system of claim 1, wherein the single piece thermal cover extends along substantially an entire length of the infant bottle when the single piece thermal cover is disposed over the infant bottle.

4. The system of claim 1, wherein the bottom cover includes a cavity configured to receive at least a portion of the infant bottle therein.

5. The system of claim 1, wherein the infant bottle comprises one or more sensors configured to sense one or more parameters of the liquid in the chamber.

6. The system of claim 5, wherein at least one of the one or more sensors is a temperature sensor configured to sense a temperature of the liquid in the chamber.

7. The system of claim 1, wherein the single piece thermal cover further comprises a phase change material in thermal communication with the inner wall, the phase change material configured to absorb heat from the infant bottle to thereby cool the liquid in the infant bottle.

8. The system of claim 7, wherein the single piece thermal cover further comprises an intermediate wall between the inner wall and the outer wall, the intermediate wall spaced from the inner wall to define a second gap therebetween, the gap defined between the outer wall and the intermediate wall, the phase change material disposed in the second gap.

9. An infant bottle feeding system, comprising:
   an infant bottle having a chamber configured to receive a liquid therein;
   a single piece thermal cover having a closed first end and an open second end, the single piece thermal cover configured to extend over at least a portion of the infant bottle, the single piece thermal cover comprising an outer wall and an inner wall spaced apart from the outer wall, a gap between the inner wall and the outer wall being thermally insulated relative to the outer wall; and
   a bottom cover configured to removably couple to the single piece thermal cover to close the open second end of the single piece thermal cover so that the infant bottle is enclosed between the single piece thermal cover and the bottom cover.

10. The system of claim 9, further comprising a thermally insulative material disposed in at least a portion of the gap.

11. The system of claim 9, wherein at least a portion of the gap is filled with air.

12. The system of claim 9, wherein the single piece thermal cover extends along at least a majority of a length of the infant bottle when the single piece thermal cover is disposed over the infant bottle.

13. The system of claim 12, wherein the single piece thermal cover extends along substantially an entire length of the infant bottle when the single piece thermal cover is disposed over the infant bottle.

14. The system of claim 9, wherein the bottom cover includes a cavity configured to receive at least a portion of the infant bottle therein.

15. The system of claim 9, wherein the infant bottle comprises one or more sensors configured to sense one or more parameters of the liquid in the chamber.

16. The system of claim 15, wherein at least one of the one or more sensors is a temperature sensor configured to sense a temperature of the liquid in the chamber.

17. The system of claim 9, wherein the single piece thermal cover further comprises a phase change material in thermal communication with the inner wall, the phase change material configured to absorb heat from the infant bottle to thereby cool the liquid in the infant bottle.

18. The system of claim 17, wherein the single piece thermal cover further comprises an intermediate wall between the inner wall and the outer wall, the intermediate wall spaced from the inner wall to define a second gap therebetween, the gap defined between the outer wall and the intermediate wall, the phase change material disposed in the second gap.

19. The system of claim 9, wherein the single piece thermal cover includes one or more magnets.

20. An infant bottle feeding system, comprising:
a single piece thermal cover having a closed first end and an open second end, the single piece thermal cover configured to extend over at least a portion of the infant bottle, the single piece thermal cover comprising an outer wall and an inner wall spaced apart from the outer wall, a gap between the inner wall and the outer wall being thermally insulated relative to the outer wall; and
a bottom cover configured to removably couple to the single piece thermal cover to close the open second end of the single piece thermal cover so that the infant bottle is enclosed between the single piece thermal cover and the bottom cover.

* * * * *

UNITED STATES PATENT AND TRADEMARK OFFICE
CERTIFICATE OF CORRECTION

PATENT NO. : 11,395,559 B2
APPLICATION NO. : 16/540955
DATED : July 26, 2022
INVENTOR(S) : Clayton Alexander It is certified that error appears in the above-identified patent and that said Letters Patent is hereby corrected as shown below:

On the Title Page

On Page 5, Column 2, (item (56) Other Publications), Line 11: Delete "PCT/US2011059014," and insert -- PCT/US2011/059014, --.

In the Specification

On Column 3, Line 36: Delete "the a" and insert -- the --.

On Column 7, Line 38: Delete "and or" and insert -- and/or --.

On Column 19, Line 64: Delete "computer readable" and insert -- computer-readable --.

On Column 23, Line 5: Delete "50'." and insert -- 50'''. --.

On Column 23, Line 7: Delete "50'" and insert -- 50''' --.

On Column 23, Line 33: Delete "56')" and insert -- 56''') --.

On Column 23, Line 35: Delete "50'" and insert -- 50''' --.

Signed and Sealed this
First Day of November, 2022

*Katherine Kelly Vidal*

Katherine Kelly Vidal
*Director of the United States Patent and Trademark Office*